United States Patent [19]
Masuda et al.

[11] Patent Number: 5,933,651
[45] Date of Patent: Aug. 3, 1999

[54] PROGRAMMABLE CONTROLLER

[75] Inventors: Tatsuo Masuda; Hiroshi Sakai; Akira Yabuta, all of Osaka, Japan

[73] Assignee: Matsushita Electric Works, Ltd., Japan

[21] Appl. No.: 08/721,181

[22] Filed: Sep. 27, 1996

[30] Foreign Application Priority Data

| Sep. 29, 1995 | [JP] | Japan | 7-253398 |
| Oct. 31, 1995 | [JP] | Japan | 7-282826 |
| Oct. 31, 1995 | [JP] | Japan | 7-283777 |
| Feb. 26, 1996 | [JP] | Japan | 8-038072 |
| Feb. 26, 1996 | [JP] | Japan | 8-038485 |
| Apr. 12, 1996 | [JP] | Japan | 8-091282 |
| Apr. 12, 1996 | [JP] | Japan | 8-091283 |

[51] Int. Cl.$^6$ ............................................. G06F 15/78
[52] U.S. Cl. ............................ 395/800.42; 395/376
[58] Field of Search ............................ 395/842, 595, 395/733, 800.42, 281, 598, 573, 376

[56] References Cited

U.S. PATENT DOCUMENTS

| 4,270,184 | 5/1981 | Shimokawa | 395/598 |
| 4,307,447 | 12/1981 | Provanzano et al. | 364/130 |
| 4,521,851 | 6/1985 | Trubisky et al. | 395/394 |
| 4,648,068 | 3/1987 | Ninnemann et al. | 395/281 |
| 4,870,614 | 9/1989 | Quatse | 395/733 |
| 5,148,529 | 9/1992 | Ueda et al. | 395/394 |
| 5,333,284 | 7/1994 | Nugent | 395/394 |
| 5,371,860 | 12/1994 | Mura et al. | 395/842 |
| 5,504,930 | 4/1996 | Kobayashi et al. | 395/595 |
| 5,594,917 | 1/1997 | Palermo et al. | 395/842 |
| 5,613,143 | 3/1997 | Shimokawa | 395/800.42 |

FOREIGN PATENT DOCUMENTS

| 0 381 470 | 8/1990 | European Pat. Off. . |
| 0 465 320 | 1/1992 | European Pat. Off. . |
| 0 496 407 | 7/1992 | European Pat. Off. . |
| 0 649 084 | 4/1995 | European Pat. Off. . |
| 0 661 625 | 7/1995 | European Pat. Off. . |
| 8076996 | 3/1996 | Japan . |
| 2 250 616 | 6/1992 | United Kingdom . |
| WO 94/09416 | 4/1994 | WIPO . |

OTHER PUBLICATIONS

William Stallings, Ph.D., Computer Organization and Architecture Principles of Structure and Function, 2nd ed., MacMillan Pub. Co., pp. 374–381, Dec. 1990.

*Primary Examiner*—Zarni Maung
*Assistant Examiner*—Patrice L. Winder
*Attorney, Agent, or Firm*—David B. Abel, Esq.; Graham & James LLP

[57] ABSTRACT

A programmable controller includes a pipeline stage having a first stage IF for executing instruction fetching operations, a second stage ID/RF for decoding the instruction and for fetching data from a general-purpose register, a third stage EX for executing arithmetic and logic operations, data address calculations, or calculation of the effective address of a target branch, a fourth stage MEM for accessing to data memory, and a fifth stage WB/BPU for executing bit operations, writing operations with respect to the general-purpose register, or branching operations, are executed in a pipelined manner. Simplification of hardware and control, and facilitation of formation of a pipeline into multiple stages are realized as a result of a pipeline structure being formed into a unified instruction structure.

41 Claims, 67 Drawing Sheets

FIG. 3

| TYPE | INSTRUCTION | OP-CODE | OPERATION |
|---|---|---|---|
| M | LOAD<br>STORE | 000000<br>000100 | LOAD<br>STORE |
| R | AND<br>OR<br>XOR<br>ADD<br>SUB<br>SL<br>SR | 010000<br>010001<br>010010<br>010011<br>010100<br>010110<br>010111 | AND<br>OR<br>EXCLUSIVE OR<br>ADD<br>SUBTRACT<br>SHIFT LEFT<br>SHIFT RIGHT |
| I | ANDI<br>ORI<br>XORI<br>ADDI<br>SUBI<br>SLI<br>SRI | 100000<br>100001<br>100010<br>100011<br>100100<br>100110<br>100111 | AND IMMEDIATE<br>OR IMMEDIATE<br>EXCLUSIVE OR IMMEDIATE<br>ADD IMMEDIATE<br>SUB IMMEDIATE<br>SHIFT LEFT IMMEDIATE<br>SHIFT RIGHT IMMEDIATE |
| J | BE<br>BNE<br>BGE<br>BG<br>BLE<br>BL<br>NOP | 110000<br>110001<br>110010<br>110011<br>110100<br>110110<br>110111 | BRANCH ON EQUAL<br>BRANCH ON NOT EQUAL<br>BRANCH ON GREATER THAN OR EQUAL<br>BRANCH ON GREATER THAN<br>BRANCH ON LESS THAN OR EQUAL<br>BRANCH ON LESS THAN<br>NO OPERATION |
| B | BPU | 111110 | BIT PROCESSING UNIT INSTRUCTION |

FIG. 5

SEQUENCE OF PROCESSING INSTRUCTION

M TYPE INSTRUCTION:
- FIRST STAGE     : FETCHING OF INSTRUCTION
- SECOND STAGE : DECODING OF INSTRUCTION AND FETCHING REGISTER
- THIRD STAGE   : DATA ADDRESS CALCULATION
- FOURTH STAGE : ACCESS TO MEMORY (READ/WRITE)
- FIFTH STAGE    : WRITING OPERATION WITH RESPECT TO REGISTER (LOAD ONLY)

R, I TYPE INSTRUCTION:
- FIRST STAGE     : FETCHING OF INSTRUCTION
- SECOND STAGE : DECODING OF INSTRUCTION AND FETCHING REGISTER
- THIRD STAGE   : ARITHMETIC AND LOGIC OPERATION
- FOURTH STAGE :
- FIFTH STAGE    : WRITING OPERATION WITH RESPECT TO REGISTER

J TYPE INSTRUCTION:
- FIRST STAGE     : FETCHING OF INSTRUCTION
- SECOND STAGE : DECODING OF INSTRUCTION AND FETCHING REGISTER
- THIRD STAGE   : ARITHMETIC AND LOGIC OPERATION (COMPARISON)
- FOURTH STAGE :
- FIFTH STAGE    : BRANCHING OPERATION

B TYPE INSTRUCTION:
- FIRST STAGE     : FETCHING OF INSTRUCTION
- SECOND STAGE : DECODING INSTRUCTION
- THIRD STAGE   :
- FOURTH STAGE : ACCESS TO MEMORY (READ/WRITE)
- FIFTH STAGE    : BIT PROCESSING

FIG. 6

| op-code | ALUOP | EXECUTION SPECIFICATION OF OPERATION |
|---|---|---|
| AND | 0 0 0 | And |
| OR  | 0 0 1 | Or |
| XOR | 0 1 0 | Exclusive Or |
| ADD | 0 1 1 | Add |
| SUB | 1 0 0 | Subtract |
| SL  | 1 1 0 | Shift Left |
| SR  | 1 1 1 | Shift Right |

FIG. 15
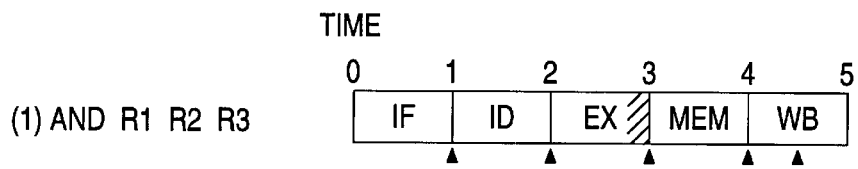
(1) AND R1 R2 R3
TIME 1 : FETCHING OF INSTRUCTION
TIME 2 : SRC1 = R1  ⎫ ARGUMENT OF ALV
         SRC2 = R2  ⎭
TIME 3 : EX / MEM / ALURSLT = R3
TIME 4 : MEM / WB / ALURSLT = R3
TIME 4, 5: WRITTEN IN REG3 (R3) (PHI3)
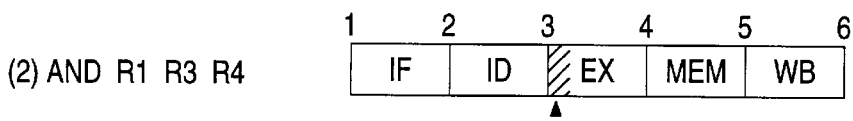
(2) AND R1 R3 R4
SRC1 = R1
SRC2 = R3
INPUT VALUE OF EX / MEM / ALURSLT
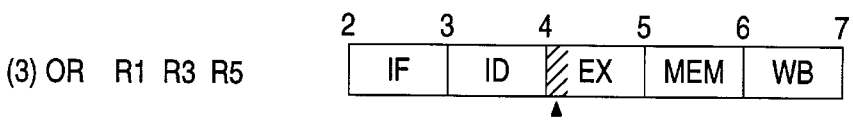
(3) OR R1 R3 R5
SRC1 = R1
SRC2 = R3
INPUT VALUE OF MEM / WB / ALURSLT FIG. 20
① BE R1 R2 10
② ADD R3 R4 R5
  .
  .
  .
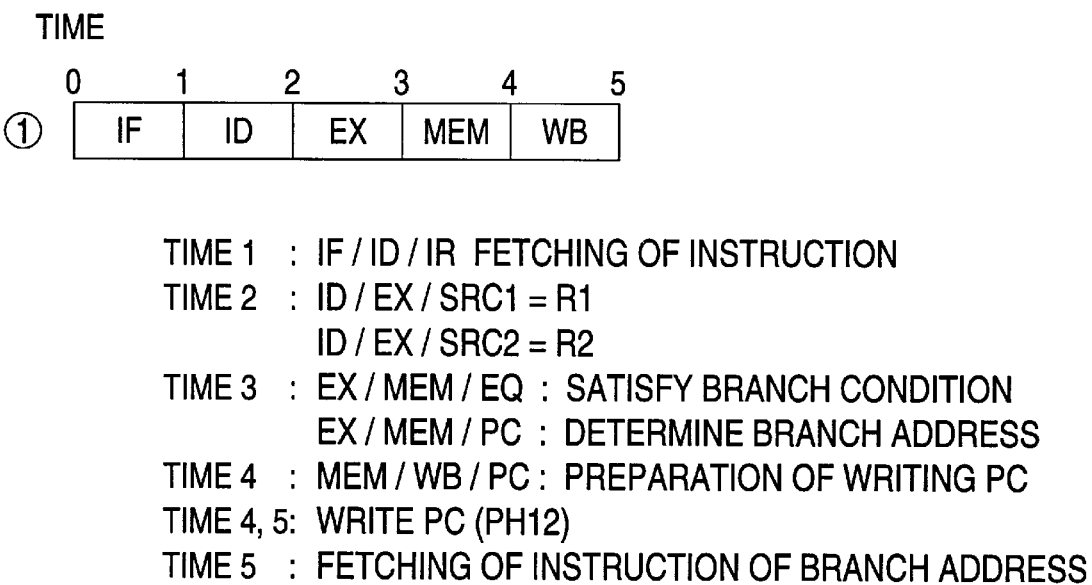
TIME 1 : IF / ID / IR  FETCHING OF INSTRUCTION
TIME 2 : ID / EX / SRC1 = R1
         ID / EX / SRC2 = R2
TIME 3 : EX / MEM / EQ : SATISFY BRANCH CONDITION
         EX / MEM / PC : DETERMINE BRANCH ADDRESS
TIME 4 : MEM / WB / PC : PREPARATION OF WRITING PC
TIME 4, 5: WRITE PC (PH12)
TIME 5 : FETCHING OF INSTRUCTION OF BRANCH ADDRESS
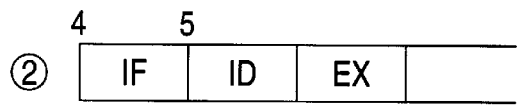

FIG. 36 (a)

| IF | ID | EX | MEM | WB |

FIG. 36 (b)

| IF | ID | EX | MEM | BPU |

FIG. 36 (c)

| IF | ID | EX | MEM | BPU1 | BPU2 | BPU3 |

PROGRAMMABLE CONTROLLER

BACKGROUND OF THE INVENTION

1. Field of the Invention

The present invention relates to a programmable controller which executes a basic instruction primarily for bit operations and an application instruction for processing data comprising a plurality of bits and, more particularly, to a programmable controller equipped with hardware (a processor) specifically designed so as to be able to process both the basic and application instructions.

2. Related Art

Programmable controllers are widely used in the control of industrial apparatus, machines, and factory automation equipment. There has been a demand for higher-speed processing of a larger number of input/output signals associated with the increased complexity of an object apparatus and a demand for higher-speed operations. For this reason, high-speed processing is implemented by hardware (a processor) specifically designed so as to be able to process a basic instruction primarily for bit operations and an application instruction for processing data which comprises a plurality of bits. A programmable controller is constructed by combination of the hardware and a general-purpose microprocessor which carries out communication processing and peripheral processing.

That specifically designed hardware (i.e., processor) of a conventional example has a three-stage pipeline structure, and an instruction is executed through this pipeline structure. In this case, processing executed in the execution stage comprises the following details.

First Stage

Instruction fetch for fetching an instruction to be subsequently executed from instruction Second Stage Various arithmetic and logic operations, data address calculations for calculating an address of data memory, or target branch operation processing following instruction decode and register fetch processing Third Stage Memory access processing (i.e., read/write processing) for carrying out reading/writing operations with respect to the data memory, branching operations, bit operations, or writing operations with respect to the general-purpose register.

In the pipeline structure, the overall speed of execution of instructions depends on a processing rate of the slowest instruction execution stage among all the stages. To speed up such pipeline processing, it is necessary to provide each instruction execution stage with uniform speed. However, in the previously described three-stage pipeline structure, if memory which takes the same access time is used for the instruction memory and the data memory, the overall speed of execution becomes slower and a much longer processing time is required, because the second or third stage carries out processing such as a bit operation which takes a much longer processing time than the processing executed in the first stage.

SUMMARY OF THE INVENTION

The present invention has been conceived in view of the foregoing drawbacks in the prior art, and the object of the present invention is to provide the structure of a programmable controller which is capable of being easily implemented and speeding up the execution of an instruction.

Another object of the present invention is to provide the structure of a programmable controller which is capable of speeding up processing without increasing the program size as a result of insertion of NOP instructions to cope with a pipeline hazard.

Another object of the present invention is to provide a programmable controller having a five-stage pipeline structure capable of executing processing at higher speed without use of high-speed memory.

Another object of the present invention is to provide a programmable controller with a five-stage pipeline structure which is capable of easily executing an instruction whose operations cannot be completed within the time period of one pipeline stage.

Another object of the present invention is to provide a programmable controller having a five-stage pipeline structure capable of speedily executing both a bit processing instruction which requires a plurality of memory access cycles and the other instructions, the programmable controller comprising a data path for sending and receiving data necessary to access memory from a bit processing instruction operation block, and a control circuit for suspending the execution of an instruction following the bit processing instruction during the execution of the bit processing operation as required, in addition to a memory address calculation block and a pipeline register specifically provided for use with the bit processing instruction. Further, another object of the present invention is to provide a programmable controller having a five-stage pipeline structure which is capable of consistently executing every instruction and is provided with a control circuit for suspending the execution of the instruction, as required, when memory for use with a differential instruction is rewritten.

Another object of the present invention is to provide a programmable controller having a five-stage pipeline structure capable of executing an instruction while consistently controlling a determination as to whether the instruction is executed or invalidated by providing a control signal in a pipeline register, the control signal showing that the current instruction is a bit operation instruction for updating a flag BITACC which constitutes instruction execution conditions, and by suspending the execution of an instruction as required until the instruction execution conditions are determined when that instruction, which is determined to be executed or invalidated on the basis of the value of the control signal according to the instruction execution conditions, is executed.

Another object of the present invention is to provide a programmable controller which has a five-stage pipeline structure and is capable of executing suspending operations based on various stop conditions in such a manner as desired in specifications without inconsistency.

Another object of the present invention is to provide a programmable controller capable of executing an indexed instruction at high speed by suppressing a program size.

To this end, a programmable controller of the present invention, executes basic bit processing operations and application processing consisting of a plurality of bits, comprising the steps of:

forming an instruction execution stage from five stages, namely, a first stage for executing instruction fetching operations in order to fetch an instruction from instruction memory, a second stage for decoding the instruction and for fetching a value from a general-purpose register, a third stage for executing arithmetic and logic operations, data address calculations, or calculation of the effective address of a target branch, a fourth stage for accessing to data memory, and a fifth stage for executing bit operations, writing operations with respect to the general-purpose register, or branching operations; and executing the instruction execution stage in a pipelined manner.

A programmable controller of the present invention comprises the following sections as hardware for each of instruction execution stages of pipeline processing; namely, an IF section equipped with instruction memory and a program counter;

an ID section equipped with an instruction decoder and a general-purpose register;

an EX section equipped with an arithmetic and logic unit;

a MEM section equipped with data memory and a memory access interface for controlling an access to the data memory; and a BPU for executing bit operation processing.

According to the programmable controller of the present invention, there is provided execution specification information of each instruction execution stage which is changed to a predetermined value on the basis the result of a bit operation instruction which is one of basic processing operations of the programmable controller, and an instruction following the bit operation instruction is made invalid.

According to the programmable controller of the present invention, a plurality of pipeline registers are provided between the hardware corresponding to the instruction execution stages, and the result of execution of the instruction execution stage is stored in each of the pipeline registers.

According to the programmable controller of the present invention, the execution specification information of each instruction execution stage is stored in each of the plurality of pipeline registers, and the execution specification information is fed to the pipeline register of the next instruction execution stage every time one instruction execution stage is executed.

According to the programmable controller of the present invention, a reduced instruction set structure is provided which is capable of being executed in the instruction execution stage and comprises a memory access instruction, a register-to-register operation instruction, an immediate value instruction, a branching instruction, and a bit operation instruction.

According to the programmable controller of the present invention, a reduced instruction set structure is provided which comprises a memory access instruction that carries out calculation of an effective address of the data memory to be accessed in the third stage, the reading and writing of data from and into the data memory in the fourth stage, and the writing of data in the fifth stage if the instruction requires the writing of data into the general-purpose register from the data memory;

the register-to-register operation instruction which carries out arithmetic and logic operations between the general-purpose registers in the third stage, and the writing of data into the general-purpose register in the fifth stage;

an immediate value operation instruction which carries out arithmetic and logic operation using immediate value included in the instruction and a value stored in a predetermined general-purpose register;

a branching instruction which carries out comparison in the third stage and a branching operation on the basis of a comparison result in the fifth stage; and a bit operation instruction which carries out fetching of data from the data memory to the general-purpose register in the fourth stage and operation processing, and operation processing with respect to each bit of the data in the fifth stage.

To this end, there is provided a programmable controller of the present invention which executes the following first to fifth stages in a pipelined manner, namely, a first stage for executing an instruction fetching operation in order to fetch an instruction from instruction memory, a second stage for decoding the instruction and for fetching a value from a general-purpose register, a third stage for executing arithmetic and logic operations, a data address calculation, calculation of the effective address of a target branch, or determination of branch conditions, a fourth stage for accessing to data memory or for executing a branching operation, and a fifth stage for executing a bit operation, a writing operation to the general-purpose register, or a branching operation, the programmable controller comprising:

selecting means provided in the second stage for selecting one of the inputs of an ALU of the third stage from among an output of the general-purpose register, an output of the ALU of the third stage, and the output of the ALU supplied to the fourth stage.

A programmable controller of the present invention executes the following first to fifth stages in a pipelined manner, namely, a first stage for executing an instruction fetching operation in order to fetch an instruction from instruction memory, a second stage for decoding the instruction and for fetching a value from a general-purpose register, a third stage for executing arithmetic and logic operations, a data address calculation, calculation of the effective address of a target branch, or determination of branch conditions, a fourth stage for accessing to data memory or for executing a branching operation, and a fifth stage for executing a bit operation, a writing operation with respect to the general-purpose register, or a branching operation, the programmable controller comprising:

selecting means provided in the third stage for selecting one of the inputs of an ALU of the third stage from among a value output from the second stage to one of the inputs of an ALU, an output of the ALU supplied to the fourth stage, and an output of the ALU supplied to the fifth stage.

A programmable controller of the present invention executes the following first to fifth stages in a pipelined manner, namely, a first stage for executing an instruction fetching operation in order to fetch an instruction from instruction memory, a second stage for decoding the instruction and for fetching a value from a general-purpose register, a third stage for executing arithmetic and logic operations, a data address calculation, calculation of the effective address of a target branch, or determination of branch conditions, a fourth stage for accessing to data memory or for executing a branching operation, and a fifth stage for executing a bit operation, a writing operation with respect to the general-purpose register, or a branching operation, the programmable controller comprising:

the function of suspending the execution of an instruction following a LOAD instruction until data acquired according to the LOAD instruction are written into the general-purpose register if that data are necessary for the instruction following the LOAD instruction.

Provided that a value to be written into the general-purpose register is calculated by the ALU as in a register-to-register operation or an argument operation, the value exists somewhere in the pipeline even if it has not been written into the general-purpose register. Similarly to the programmable controller, it is possible to cope with the pipeline hazard by providing a data path for acquiring a value required as an argument of the ALU from a predetermined location in the pipeline. However, if a value to be written into the general-purpose register is acquired from the data memory according to a preceding LOAD instruction, that value appears in the pipeline for the first time in the fourth stage in which the memory access operation is executed. If the following instruction refers to the general-purpose register, whose value is updated by the LOAD instruction, as an argument, it would be difficult to solve the problem using the data path provided in the programmable controller.

To solve this problem, it is necessary to suspend the execution of the following instruction until a necessary value is written into the general-purpose register. This method corresponds to the insertion of NOP instructions. However if the NOP instructions are actually inserted into the program, a program size increases. In order to prevent this problem, a preceding instruction on the pipeline is checked when the current instruction is decoded on the second stage. It is further checked whether or not a value of the general-purpose register required by the instruction being currently decoded is updated by the preceding instruction. If this is the case, the execution of the instruction being currently decoded is suspended until that value is actually written into the general-purpose register. At the same time, a program counter is also prevented from being incremented. As a result, operations equivalent to the insertion of the NOP instructions are effected.

According to the programmable controller of the present invention, the programmable controller is characterized by the fact that if an instruction following the LOAD instruction is a STORE instruction, and if the general-purpose register which holds a value required by the STORE instruction is updated by the LOAD instruction, the data which are stored in the general-purpose register in the fifth stage according to the LOAD instruction are taken in the fourth stage and are written into the data memory.

As has been previously described, if the value of the general-purpose register necessary to execute an operation in the third stage is updated by the LOAD instruction, it is necessary to suspend the execution of the instruction until it becomes possible to fetch a required value from the general-purpose register. However, in the case of the STORE instruction, a value acquired from the general-purpose register is directly moved through the pipeline register without processing, and the thus moved value is written into the data memory in the fourth stage. Therefore, there is no need to wait for the value supplied to the general-purpose register according to the LOAD instruction to be written into the general-purpose register and, subsequently, to write a value fetched from the general-purpose register into the data memory according to the STORE instruction. In the case where the STORE instruction for writing a value of the general-purpose register updated by the LOAD instruction into the data memory follows the LOAD instruction, if the pipeline hazard operation is carried out by the programmable controller, a wasteful stop time is expended.

To prevent this problem, the programmable controller is provided with a data path. In the case where the STORE instruction for writing a value of the general-purpose register updated by the LOAD instruction into the data memory follows the LOAD instruction, the value which is fetched from the data memory according to the preceding LOAD instruction (in the fifth stage) is supplied to the fourth stage as the data for the following STORE instruction through the data path instead of suspending the execution of the STORE instruction. In short, in the case where the STORE instruction for writing a value of the general-purpose register updated by the LOAD instruction into the data memory follows the LOAD instruction, it is possible to continue the processing without suspending the execution of the STORE instruction.

A programmable controller of the present invention is provided with a data path. In the case where the STORE instruction, for writing a value of the general-purpose register updated by the LOAD instruction into the data memory follows next but one behind the LOAD instruction, the value which is fetched from the data memory according to the preceding LOAD instruction (in the fifth stage) is taken in the third stage as the data for the following STORE instruction through the data path instead of suspending the execution of the STORE instruction. In short, in the case where the STORE instruction for writing a value of the general-purpose register updated by the LOAD instruction into the data memory follows next but one behind the LOAD instruction, it is possible to continue the processing without suspending the execution of the STORE instruction.

A programmable controller of the present invention executes the following first to fifth stages in a pipelined manner, namely, a first stage for executing an instruction fetching operation in order to fetch an instruction from instruction memory, a second stage for decoding the instruction and for fetching a value from a general-purpose register, a third stage for executing arithmetic and logic operations, a data address calculation, calculation of the effective address of a target branch, or determination of branch conditions, a fourth stage for accessing to data memory or for executing a branching operation, and a fifth stage for executing a bit operation, a writing operation with respect to the general-purpose register, or a branching operation, the programmable controller being characterized by comprising:

the function of inhibiting the execution of an invalid instruction already included in the pipeline when the branch conditions are satisfied.

A programmable controller of the present invention executes the following first to fifth stages in a pipelined manner, namely, a first stage for executing an instruction fetching operation in order to fetch an instruction from instruction memory, a second stage for decoding the instruction and for fetching a value from a general-purpose register, a third stage for executing arithmetic and logic operations, a data address calculation, calculation of the effective address of a target branch, or determination of branch conditions, a fourth stage for accessing to data memory or for executing a branching operation, and a fifth stage for executing a bit operation, a writing operation with respect to the general-purpose register, or a branching operation, the programmable controller being characterized by comprising:

the function of inhibiting the execution of an invalid instruction already included in the pipeline when the branch conditions are satisfied.

When a RISC programmable controller having a five-stage pipeline structure, according the present invention, executes a branch instruction, the calculation of a branch address and the determination of the branch conditions are carried out in the third stage. All of the values necessary for branch can be prepared in the third stage, and therefore a branching operation can be executed in the following fourth stage. However, the branching operation is not executed in the fourth stage but in the fifth stage in some circuit configurations because of constraints of a physical circuit. In any event, if the branch conditions are satisfied, the branch address obtained in the third stage is written into the program counter in the stage for executing the branching operation. An instruction is fetched according to the value of the program counter, whereby the branching operation is completed. At this time, the pipeline already includes the instruction which is to be executed if the branch conditions are not satisfied. Such an instruction must not be executed if the branch conditions are satisfied. To prevent the execution of such an instruction, the execution of the instruction taken in the pipeline is inhibited until an instruction is fetched from the branch address if the branch condition is satisfied. Specifically, if the branch conditions are satisfied, the data memory or the general-purpose register is inhibited from being rewritten by the instruction already taken in the pipeline. The programmable controller executes the branch instruction in the fifth stage and carries out the previously described processing. The programmable controller executes the branch instruction in the fourth stage.

According to the present invention, a programmable controller which carries out five stages in a pipelined manner, that is, a first stage for executing an instruction fetching operation to fetch an instruction from instruction memory, a second stage for executing an instruction decoding operation and a register fetching operation for fetching a value from a general-purpose register, a third stage for executing an arithmetic and logic operation, a data address calculation, calculation of the effective address of a target branch, or determination of a branch condition, a fourth stage for carrying out an access to data memory or executing a branching operation, and a fifth stage for executing bit operation processing, writing of data to the general-purpose register, or the branching operation, the programmable controller comprising the function of latching a value, obtained by adding one to a value of a program counter, into a register actuated by a clock signal which changes at faster timing than a clock signal for actuating the program counter, irrespective of a value of a control signal for suspending the increment of the program counter, and fetching an instruction using the value of the register as an address of the instruction memory in lieu of the value of the program counter.

To solve the previously described drawbacks, the programmable controller of the present invention is provided with a register actuated on a clock signal which changes at higher timing than a clock signal for actuating the program counter. As a result of fetching the value stored in the register as an address of the instruction memory, the address of the instruction memory is determined at an earlier time, whereby lead time necessary for the access time of the instruction memory is ensured.

According to the present invention, the programmable controller is characterized by such an arrangement that, if the control signal for suspending the increment of the program counter is a signal for suspending an increment operation, the value read from the instruction memory is not loaded into the instruction register which fetches an instruction, but a value of that instruction register is retained in itself.

According to the present invention, the programmable controller having the five-stage pipeline structure is characterized by the fact that if the branching conditions are satisfied when the branch instruction is executed, the address of a target branch calculated during the course of the execution of the branch instruction is used as the address of the instruction memory, which makes it possible to fetch an instruction.

According to the present invention, the programmable controller having the five-stage pipeline structure is provided that bit memory can be rewritten by use of the address of the bit memory calculated when a differential instruction is executed.

According to the present invention, the programmable controller having the five-stage pipeline structure is provided that, when the programmable controller starts up, an instruction can be fetched from a correct address of the instruction memory on the basis of an initial value of the program counter set from outside before the programmable controller starts up.

To this end, a programmable controller with a five-stage pipeline structure of the present invention is provided by the fact that when an instruction whose operations cannot be completed within the time period of one pipeline stage is executed, the pipeline is suspended by interrupting the increment of a program counter during only the period of time required to complete the operations of the instruction, and invalidating control signals for writing a value back into a register or writing data into data memory, whereby the instruction is executed.

According to the present invention, a programmable controller having a five-stage pipeline structure is provided by the fact that when an instruction, whose operations cannot be completed within the time period of one pipeline stage and which requires an indefinite operation time, is executed, the pipeline is suspended until an operation complete signal is received from an operation block which executes the instruction by interrupting the increment of a program counter, and invalidating control signals for writing a value back into a register or writing data into data memory, whereby the instruction is executed.

According to the present invention, a programmable controller having a five-stage pipeline structure is provided by the fact that when a plurality of types of instructions whose operations cannot be completed within the time period of one pipeline stage are executed, the pipeline is suspended by interrupting the increment of a program counter, and invalidating control signals for writing a value back into a register or writing data into data memory, with use of a method of determining the completion of operations suitable for the type of instruction, whereby the instructions are executed.

According to the present invention, a programmable controller having a five-stage pipeline structure is provided by comprising a flag for determining whether an instruction whose operations cannot be completed within the time period of one pipeline stage is executed or not executed, wherein the initiation of execution of the instruction is prevented if that instruction has been determined as not to be executed, so that the wasteful suspension of the operation of the pipeline is prevented.

According to the present invention, a programmable controller having a five-stage pipeline structure is characterized by comprising an operation block for executing an instruction whose operations cannot be completed with the time period of one pipeline stage, the operation block being arranged so as to be able to cope with operations of the width of a plurality types of data, as well as being arranged so as to receive an input having a value set in a predetermined bit position and to clear the value in an unused bit position as required.

According to the present invention, a programmable controller having a five-stage pipeline structure is characterized by the fact that when an instruction whose operations cannot be executed within the time period of one pipeline stage is executed, predetermined information is retained until operations for writing an operation result back into a plurality of general-purpose registers are all completed if the instruction stores the operation result to the registers.

According to the present invention, a programmable controller having a five-stage pipeline structure is provided by the fact that when an instruction whose operations cannot be executed within the time period of one pipeline stage is executed, an argument or a control signal of the instruction in a pipeline register provided between a stage of decoding the instruction and a stage for executing that instruction is retained for as long a period of time as required.

The programmable controller having the five-stage pipeline structure of the present invention is provided with an operation block specifically designed so as to execute an operation of all the operations necessary for the programmable controller, such as multiplication or division, which takes a long time, at expense in time of a plurality of pipeline stages, and an instruction execution control block for controlling the required portions of the operation block and the pipeline structure.

To solve the previously described drawbacks in the art, a programmable controller of the present invention carries out five stages in a pipelined manner, that is, a first stage IF for executing an instruction fetching operation, that is, fetching an instruction from instruction memory IM, a second stage ID for executing an instruction decoding operation and a register fetching operation for fetching a value from a general-purpose register, a third stage EX for executing an arithmetic and logic operation, a data address calculation, calculation of the effective address of a target branch, and determination of a branch condition, a fourth stage MEM for carrying out an access to data memory DM or executing a branching operation, and a fifth stage WB for executing a bit operation, writing of data to the general-purpose register, or the branching operation. The programmable controller is provided by comprising a memory address calculation block BPUADR specifically designed for use with a bit processing instruction in order to execute the bit processing instruction aside from a load instruction, a store instruction, and a memory access instruction. The memory address calculation block BPUADR specifically designed for use with the bit processing instruction calculates the address of the data memory DM over a plurality of pipeline cycles, so that a memory access request signal is issued. As a result, it is possible to make an access to the memory in the plurality of contiguous pipeline stages. Further, the programmable controller is provided with a circuit block BPU specifically designed for executing the bit processing instruction. A memory address and a memory read request signal are output from this circuit block, whereby the reading of data from the data memory DM is executed. Alternatively, a memory address, data to be written into the memory, and a memory write request signal are output from the circuit block, whereby the writing of data into the data memory DM is executed.

A control signal showing that the following instruction is a bit processing instruction is provided in the pipeline register depending on a result of the decoding of the instruction. If it is necessary to suspend the execution of an instruction following the bit processing instruction, the increment of the program counter PC is suspended. Even if it is impossible to suspend the execution of the instruction by only suspending the increment of the program counter PC, the result of the decoding of the instruction is further rewritten, whereby the instruction following the bit processing instruction is suspended.

The programmable controller is provided with data memory BM specifically designed for use with a differential instruction to be executed only when an input changes. An address bus of that memory is shared between the data memory PM and the instruction memory IM. In this case, the address of the instruction memory at the time of the fetching of an instruction is taken into the pipeline register, and the thus fetched address is sequentially transferred to the circuit block specifically designed for use with the bit processing instruction through the pipeline register. When the differential instruction is written back into the data memory BM specifically designed for use with the differential instruction, the transferred address of the instruction memory BM is used as an address for use in writing data into the memory. The increment of the program counter is suspended when the differential instruction is written back into the data memory specifically designed for use with the differential instruction in order to ensure the fetching of the instruction. Further, the instruction acquired from the instruction memory is rewritten with an instruction which does not have any influence on the following operations when the differential instruction is written back into the data memory specifically designed for use with the differential instruction. Moreover, the fetching of an instruction is ensured by suspending the execution of an instruction, as required, if the operations occur at the same time.

A programmable controller of the present invention is designed so as to solve the previously described problems in the art and to carry out five stages in a pipelined manner, that is, a first stage IF for executing an instruction fetching operation to fetch an instruction from instruction memory IM, a second stage ID for executing an instruction decoding operation and a register fetching operation for fetching a value from a general-purpose register, a third stage EX for executing an arithmetic and logic operation, a data address calculation, calculation of the effective address of a target branch, or determination of a branch condition, a fourth stage MEM for carrying out an access to data memory DM or executing a branching operation, and a fifth stage WB for executing bit operation processing, writing of data to the general-purpose register, or the branching operation, the programmable controller comprising:

instruction execution conditions comprising a plurality of flag values are determined, and a specific instruction is executed only when the instruction execution conditions are satisfied in an instruction execution stage.

Further, the programmable controller is characterized by comprising a structure which makes it possible for a flag set instruction to have finished updating the flags constituting the instruction execution condition when an instruction execution stage for an instruction immediately after the flag set instruction is initiated, and which makes it possible to execute the instruction while consistently controlling a determination as to whether the instruction is executed or invalidated. Still further, the programmable controller is characterized by comprising a structure which makes it possible for various types of arithmetic operation instructions to have finished updating the flags constituting the instruction execution condition when an instruction execution stage for an instruction immediately after the arithmetic operation instructions is initiated, and which makes it possible to execute the instruction while consistently controlling a determination as to whether the instruction is executed or invalidated.

The programmable controller is characterized by comprising the structure which makes it possible to form a bit processing instruction from flags updated by the bit processing instruction for carrying out bit operation processing in the fifth stage, to provide a control signal in the pipeline register, which control signal shows that the current instruction is the bit processing instruction for updating the flags relevant to the instruction execution conditions, to suspend execution of the instruction on the basis of the control signal while the instruction execution conditions are not determined, and to execute the instruction while consistently controlling a determination as to whether the instruction is executed or invalidated.

To solve the above-described drawback, a programmable controller of the present invention carries out five stages in a pipelined manner, namely, a first stage IF for executing an instruction fetching operation to fetch an instruction from instruction memory, a second stage ID for executing an instruction decoding operation and a register fetching operation for fetching a value from a general-purpose register, a third stage EX for executing an arithmetic and logic operation, a data address calculation, calculation of the effective address of a target branch, or determination of a branch condition, a fourth stage MEM for carrying out an access to data memory or executing a branching operation, and a fifth stage WB for executing bit operation processing, writing of data to the general-purpose register, or the branching operation, the programmable controller comprising a state machine for carrying out start/stop control operations. The value of the program counter obtained when an instruction is fetched is input to the pipeline register, and that value is transferred through the pipeline register just as it is. On the basis of the value of the program counter existing in the pipeline register, the state machine for start/stop control purposes calculates a value to be written into the program counter while the programmable controller is in suspending mode. After the programmable controller has changed to suspend mode as a result of the detection of fulfillment of the stop conditions by the state machine for start/stop control purposes, another instruction following the instruction that satisfied the stop conditions is prevented from being executed even if the following instruction has already been introduced into the pipeline stage. In this way, an invalid instruction is prevented from being executed. As a result of adoption of such a structure, it becomes possible to provide a programmable controller with a five-stage pipeline structure which is capable of executing suspending operations based on various stop conditions according to specifications without inconsistency.

To solve the previously described problem, a programmable controller of the present invention, having a processor, which processor executes a bit processing operation and application processing comprised of words, each word consisting of a plurality of bits, as an object to be calculated, on the basis of an instruction code of an input program, and the processor further including a general-purpose register for reading and writing data, an address calculation section for calculating the address of an instruction to be executed, and a memory access section for reading and writing data from and into external memory, the programmable controller comprising:

a selector which is connected to the general-purpose register and executes an indexed instruction using hardware by performing operations on the contents of the general-purpose register on the basis of the result of identification of a display flag for displaying the presence or absence of the indexed instruction which indirectly specifies the object to be operated provided in the instruction code.

The programmable controller as defined of the present invention is provided by the fact that the instruction code is a sequence instruction addressed by the object to be operated.

The programmable controller of the present invention is provided by the fact that the selector is provided in the address calculation section.

The programmable controller of the present invention is provided by the fact that the instruction code is a timer or counter instruction which uses the object to be calculated as preset data.

The programmable controller of the present invention is provided by the fact that the selector is provided in a data path for reading data from the external memory.

According to the programmable controller of the present invention, there is provided the improved overall speed of processing. This is realized by dividing an instruction execution stage of specifically designed hardware (i.e., a processor) into five stages so as to provide an instruction set and an instruction structure, and by improving the availability factor of constituent elements of the specifically designed hardware (i.e., the processor). In general, if the instruction execution stage is divided into multiple stages, which in turn complicates the control of execution of the instruction. The programmable controller of the present invention is arranged so as to become easy to be configured in multiple stages by simplifying the specifically designed hardware and control as a result of unification of the instruction structure to a much greater extent. As a result, it becomes possible to implement the control of the five-stage pipeline structure using simple hardware. Further, the programmable controller is arranged so as to be able to change the execution specification information of each instruction execution stage to a predetermined value on the basis of the result of a bit processing instruction which is one of the basic processing operations of the programmable controller. Consequently, it is possible to invalidate (not to execute) the following application instruction by means of bit operation processing particular to the programmable controller without interrupting the pipeline processing.

BRIEF DESCRIPTION OF THE DRAWINGS.

FIG. 3 is a table for an example of the configuration an operation code of the programmable controller of the present invention;

FIG. 5 is a list which shows a sequence for processing instructions of the programmable (controller of the present invention;

FIG. 6 is a table which shows one example of allocation of an operation code ALUOP of the programmable controller of the present invention;

FIG. 15 is an illustration for explaining the operation of the programmable controller of the present invention;

FIG. 20 is an illustration for explaining the operation programmable controller of the present invention;

FIGS. 36(a)–36(c) are explanatory illustrations which show a five-stage pipeline structure of a programmable controller of the present invention;

DETAILED DESCRIPTION OF THE PREFERRED EMBODIMENTS

First Embodiment

Figure 1:
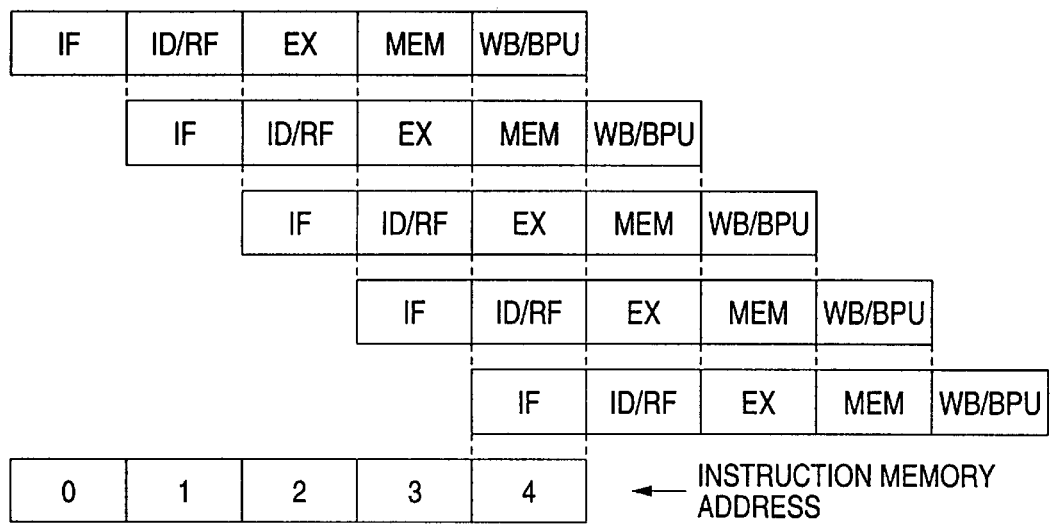
FIG. 1 is an explanatory illustration which shows a five-stage pipeline structure of a programmable controller of the present invention.

FIG. 1 shows a five-stage pipeline structure of a programmable controller of the present invention. FIG. 1 is a schematic representation showing the details of the pipeline processing in each execution stage. In the drawing, a first stage designated by IF (Instruction Fetch) is a stage in which an instruction to be executed next is fetched by an instruction register from instruction memory. A second stage designated by ID/RF is a stage in which the decoding of an instruction and the fetching of a value from a general-purpose register are carried out. A third stage designated by EX is a stage in which arithmetic and logic operations, data address calculations, or branching operations for calculating an effective address of a target branch are carried out. A fourth stage designated by MEM is a stage in which an access is made to data memory. Finally, a fifth stage designated by WB/BPU is a stage in which bit operations, writing operations with respect to the general-purpose register, or branching operations are carried out.

Figure 2:
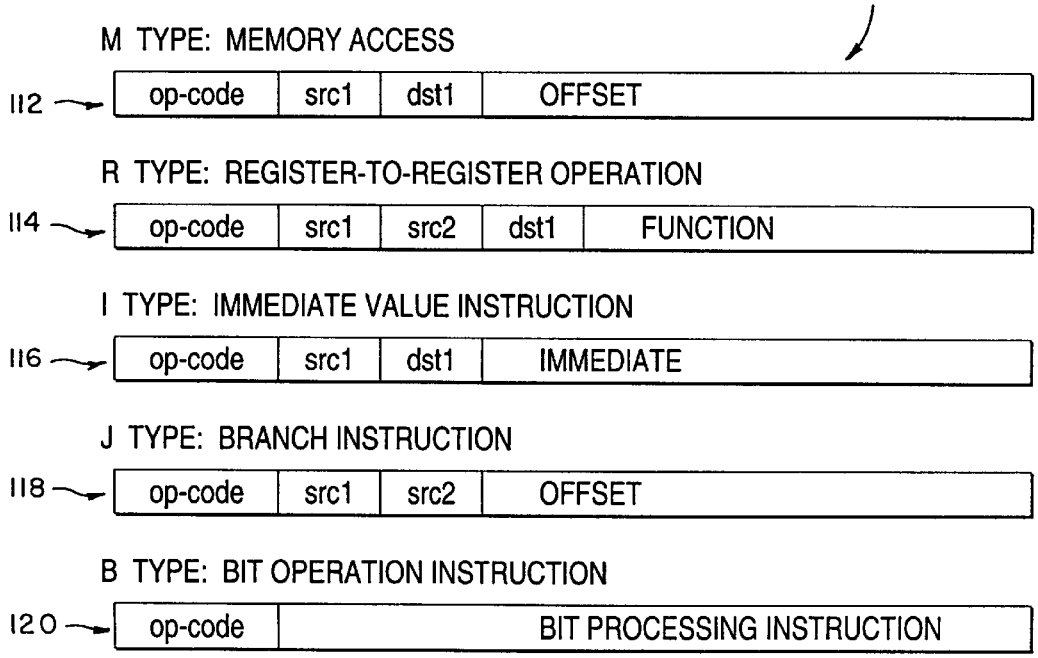
FIG. 2 is a schematic representation which shows one embodiment of an instruction set and an instruction structure of the programmable controller of the present invention.

With reference to FIG. 2, one example of the instruction set and instruction structure of the present invention will be described. As shown in FIG. 2, an instruction set 100 comprises a memory access instruction 112 (an M type instruction) for accessing to memory, a register-to-register operation instruction 114 (an R type instruction) for executing register-to-register operations, an immediate value instruction 116 (I type instruction) for executing operations of immediate value data included in the instruction and a value stored in the general-purpose register, a branch instruction 118 (J type instruction) which carries out comparison and executes branching operations in response to a comparison result, and a bit operation instruction 120 (B type instruction) for executing bit operation processing.

The M type instruction 112 comprises an operation code field followed by a src1 field, a dst1 field, and an offset field. For example, the M type instruction carries out the following processing (i.e., a load instruction). That is, an effective address is obtained by adding together an address value stored in the general-purpose register specified by the src1 field and an offset value stored in the offset field. A value stored in the data memory at that effective address is loaded into the general-purpose register specified by the dst1 field.

The R type instruction 114 comprises an operation code field followed by the src1 field, src2 field, dst1 field and a function field. For example, the R type instruction 114 has the function of loading the result of operations of a value stored in the general-purpose register specified by the src1 field and a value stored in the general-purpose register specified by the src2 field into the general-purpose register specified by the dst1 field. For example, the function field is used to specify the details of specification of an operation method.

The I type instruction 116 comprises the operation code field followed by the src1 field, the dst1 field, and an immediate field. For example, this I type instruction 116 has the function of loading the result of operations of a value stored in the general-purpose register designated by the src1 field and a value stored in the immediate field into the general-purpose register specified by the dst1 field.

The J type instruction 118 comprises the operation code field followed by the src1 field, the scr2 field, and the offset field. For example, the J type instruction 118 has the function of adding an offset value stored in the offset field to the program counter and executing branching operations according to the result of comparison between a value stored in the general-purpose register specified by the src1 field and a value stored in the general-purpose register specified by the src2 field.

The B type instruction 120 comprises the operation code field followed by a Bit Processing Instruction field. For example, this B type instruction 120 has the function of setting a specific bit of the data to one.

For the instruction of the programmable controller of the present invention, the bit width of the operation code field is unified, and two fields for specifying a general-purpose register follow the operation code field of the instructions other than the B type instruction. The positions of the fields are unified in order to specify two general-purpose registers. As a result, it becomes possible to simplify the structure of the specifically designed hardware and pipeline control in such a way as will be described later.

FIG. 3 shows one embodiment of the instruction set 100 of a programmable controller of the present invention. FIG. 3 is a table showing one embodiment of the instruction set 100 which has the operation code field comprised of six bits. In the table, Type designates the type of an instruction, Instruction designates the name of the instruction, and Operation designates the function of the instruction.

Figure 4:
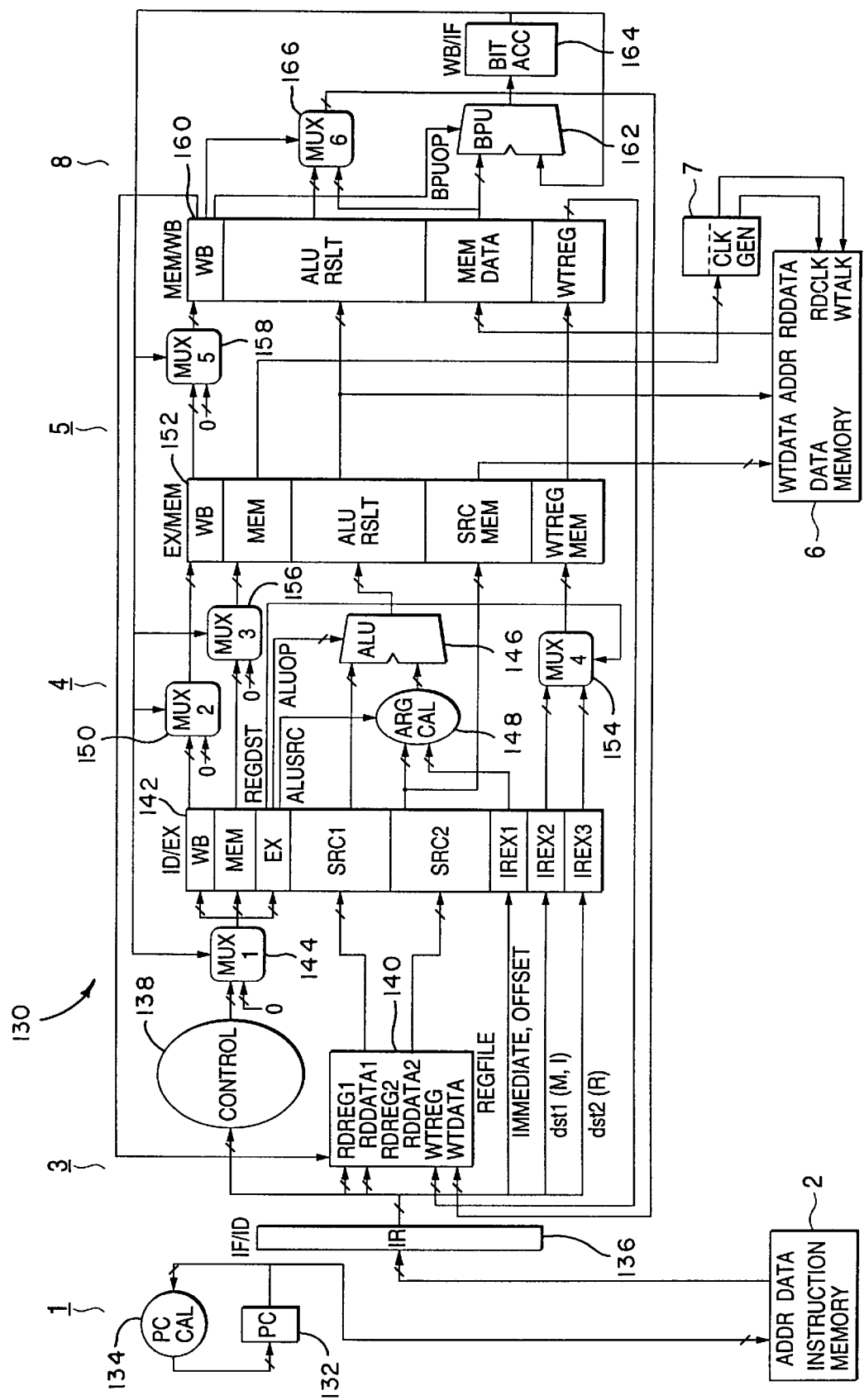
FIG. 4 is a block diagram which shows the programmable controller according to one embodiment of the present invention.

With reference to FIG. 4, the programmable controller according to one embodiment of the present invention will now be described. FIG. 4 is a block diagram showing a hardware structure specifically designed for use with a programmable controller 130 of the present invention. In the drawing, an IF section 1 comprises instruction memory 2 for storing instructions, and a program counter 132 (PC) which counts the address of the instruction memory 2 at which the instruction to be executed next is stored upon receipt of a signal from a program counter control circuit 134 (PCCAL).

An instruction register 136 (IR) which holds the instruction read from the instruction memory 2 according to the address counted by the program counter 132 doubles as a pipeline register IF/ID which holds the result of operation of the IF section 1 and sends that result to an ID section 3 in the next stage.

The ID section 3 comprises an instruction decoder control 138 primarily for decoding the operation code section of the instruction, a general-purpose register block 140 (REGFILE) made up of a plurality of general-purpose registers, and a multiplexer MUX1 144 which is connected to a subsequent stage of the instruction decoder CONTROL 138 so as to switch signals output to a pipeline register ID/EX 142. In the general-purpose register block REGFILE 140, RDREG1 designates a terminal for receiving a signal that specifies which of the general-purpose registers outputs a value from RDDATA1. RDREG2 designates an input terminal for receiving a signal that specifies which of the general-purpose registers outputs a value from RDDATA2. WTREG designates an input terminal for receiving a signal that specifies which of the general-purpose registers a value input from WTDATA is written into. Outputs from the instruction decoder CONTROL 138 are stored in WI, MEM, and EX stages of the pipeline register ID/EX 142. Values output from the RDDATA1 and RDDATA2 are stored in the src1 and src2 fields of the pipeline register ID/EX 142. Immediate value data included in the instruction are stored in IREX1 of the pipeline register ID/EX 142, and values of the dst1 field of the M and I type instructions are stored in IREX2. A value of the dst2 field of the R type instruction is stored in IREX3 of the pipeline register ID/EX 142.

An EX section 4 comprises an arithmetic and logic unit ALU 146 (hereinafter referred to as ALU) for executing arithmetic and logic operations, a switch control section ARGCAL 148 (hereinafter referred to as ARGCAL) for switching one of the inputs of the ALU 146 to the output of the src2 field or the output of the IREX1 of the pipeline register ID/EX 142, a multiplexer MUX2 150 which is interposed between WB of the pipeline register ID/EX 142 and WB of a pipeline register EX/MEM 152 and switches an output to the WB of the pipeline register EX/MEM 152, a multiplexer MUX3 156 which is interposed between MEM of the pipeline register ID/EX 142 and MEM of the pipeline register EX/MEM 152 and switches an output to WB of the pipeline register EX/MEM 152, and a multiplexer MUX4 154 for switching between a value stored in the IREX2 and a value stored in the IREX3 as an output to WTREGMEM of the pipeline register EX/MEM 152. The output from the ALU 146 is stored in AULRSLT of the pipeline register EX/MEM 152. The output of the src2 of the pipeline register ID/EX 142 is also maintained in SRCMEM of the pipeline register EX/MEM 152.

A MEM section 5 comprises a memory access interface 7 for controlling an access to the data memory 6, and a multiplexer MUX5 158 which is interposed the WB of the pipeline register EX/MEM 152 and the WB of the pipeline register MEM/WB 160 and switches an output to the WB of the pipeline register MEM/WB 160. An output from the ALURSLT of the pipeline register EX/MEM 152 is held in ALURSLT of the pipeline register MEM/WB 160, and that output is used for addressing the data memory 6. An output from the MEM of the pipeline register EX/MEM 152 is input to the memory access interface 7. An output from the SRCMEM of the pipeline register EX/MEM is written into the data memory 6. The output of the WTREGMEM of the pipeline register EX/MEM 152 is output to the WTREGMEM of the pipeline register MEM/WB 160. An output of the RDDATA of the data memory 6 is held in the MEMDATA of the pipeline register MEM/WB 160.

A WB section 8 comprises a bit operation unit BPU 162 (hereinafter referred to as BPU) for executing bit operations, a bit accumulator BITACC 164 (hereinafter referred to as BITACC) for invalidating (i.e., not executing) the following application instruction according to an output of the BPU 162, and a multiplexer MUX6 166 for switching a value to be written into the general-purpose register block REGFILE 140 to either the output from the ALURSLT of the pipeline register MEM/WB 160 or the output of the MEMDATA of the pipeline register MEM/WB 160.

In the case where the specifically designed hardware is configured in such a way as shown FIG. 4, a sequence for processing each type of instruction shown in FIG. 5 becomes necessary. In the case of the M type instruction, the fetching of an instruction is carried out in the first stage, and the decoding of the instruction and the fetching of data from the register are carried out in the second stage. The data address calculation is carried out in the third stage, and an access to the memory is made in the fourth stage. Writing operations with respect to the register are carried out in the fifth stage.

In the case of the R type and I type instructions, the fetching of an instruction is carried out in the first stage, and the decoding of the instruction and the fetching of a value from the register are carried out in the second stage. An arithmetic and logic operation is carried out in the third stage, and the writing operations with respect to the register are carried out in the fifth stage.

In the case of the J type instruction, the fetching of an instruction is carried out in the first stage, and the decoding of an instruction and the fetching of a value from the register are carried out in the second stage. Arithmetic and logic operations for comparison purposes are carried out in the third stage, and branching operations are carried out in the fifth stage.

In the case of the B type instruction, the fetching of an instruction is carried out in the first stage, and the decoding of an instruction is carried out in the second stage. The reading of data from the data memory 6 is carried out in the fourth stage, and bit operation processing is carried out in the fifth stage.

The operation of each instruction processing stage of the programmable controller 130 of the present invention, shown in FIG. 4, with regard to one pipeline stage will be described. To begin with, the value of an updated program counter PC 132 is used as the address of instruction memory 2, and a instruction read from the instruction memory 2 is loaded into the pipeline register IF/ID 136. Except for the case where the address of the instruction is changed by the J type instruction, a value incremented by one at the rising edge of the next clock signal is stored as the value of the program counter PC 132. Similarly, new instructions are loaded into the program counter 132 one after another.

The operation code section of the loaded instruction is primarily decoded by means of a combinational circuit of the instruction decoder CONTROL 138 in the instruction decoding operation of the second stage 3. The thus decoded signal includes all of the instruction execution specifications for use in the following third, fourth, and fifth stages. The instruction execution specifications are loaded into the EX, MEM, and WB stages of the pipeline register ID/EX 142 at the next rising edge of the clock. Simultaneously, data are read from the registers specified by the src1 and src2 fields included in the instruction. The thus read data are also stored in the src1 and src2 fields of the pipeline register ID/EX 142. Further, the immediate (offset) field includes in the instruction, the dst1 field of the M and I type instructions, and the dst1 field of the R type instruction are also held in the IREXI, IREX2, and IREX3 of the pipeline register ID/EX 142.

In the third stage, the ALU 146 executes arithmetic and logic operations of the data held in the pipeline register ID/EX 142. The combination of data to be operated is as follows:

(1) One of the data to be loaded into and to be subjected to arithmetic and logic operations in the ALU 146 is the src1 field.

(2) The other of the data to be loaded into and to be subjected to the arithmetic and logic operations in the ALU 146 is selected by the value of ARGCAL 148 in the following manner. The data item is also subjected to bit expansion as required.
  (a) For the R and J type instructions . . . src2
  (b) For the M and I type instructions . . . IREX1

In the case of the R and I type instructions, the execution specification of the operation designated by ALUOP is subjected to a desired operation by issuing a corresponding operation code to the ALU 146. For example, an Example of assignment of the operation code ALUOP is shown in FIG. 6.

In the case of the M type instruction, the address of the data to be accessed is calculated by the ALU 146. As a result, the ALUOP instructs the ALU to perform processing on Add. In other words, the effective address of the data memory 6 is obtained by adding the address included in the offset field stored in IREX1 and the value of the register of the src1, which means an indexing operation. So long as the general-purpose register which received an input of 0 is specified as the scr1 field, it is possible to specify the address included in the offset field as the absolute address.

In the case of the J type instruction, branching conditions are determined by comparison in the ALU 146. For this reason, the ALUOP instructs the ALU 146 to process Sub in this example. In other words, the value of the register specified by the src2 field is subtracted from the value of the register specified by the src1 field, and the result of the subtraction and the branching conditions are compared to each other. For the J type instruction, circuitry other than the circuits for carrying out the comparison for branching purposes is omitted from the block diagram shown in FIG. 4 for brevity.

The result of the operation of the ALU 146 is held in the ALURSLT of the pipeline register EX/MEM 152 at the rising edge of the next clock signal. Simultaneously, the src2 field is held in the SRCMEM of the pipeline register EX/MEM 152, just as it is. Either the IREX2 for holding the dst1 field for the M and I type instructions or the IREX3 for holding the dst2 field for the R type instruction is selected by the multiplexer MUX4 154. The thus selected one is held in WTRGMEM of the pipeline register EX/MEM 152. A select control signal REGDST becomes 0 in the case of the M and I type instructions but 1 in the case of the R type instruction.

In the memory access processing of the fourth stage, an access to the data memory 6 is carried out on the basis of the value retained in the pipeline register EX/MEM 152. In other words, the ALURSLT is used for addressing the data memory 6, and the SRCMEM is used for writing data to the data memory 6. The ordinary bit processing instruction involves the reading of data from the data memory 6, and hence an access to the data memory 6 is carried out in this stage in the same manner as in the case of the processing of a plurality of bits (words).

The reading/writing operations with respect to the data memory 6 are controlled by the MEM of the pipeline register EX/MEM 152. An actual memory real/write clock is generated by the memory access interface 7, and the thus generated clock is output to the data memory 6.

For the bit processing instruction, the BPU 162 executes the bit processing designated by BPUOP in the fifth stage. The result of the bit processing is retained by the BITACC 164 at the rising edge of the next clock signal. For the R and I type instructions, the value of the ALURSLT is written into the general-purpose register block REGFILE 140. For the M type load instruction, the value of the MEMDATA is written into the general-purpose register block REGFILE 140. At this time, if the value of the BITACC 164 is one, the following application instruction (word processing) is executed. On the other hand, if the value of the BITACC 164 is 0, it is necessary to invalidate the following application instruction (word processing). As a result, it becomes possible to realize the feedback of the data of the BITACC 164 as a control signal for the pipeline following the current stage. In other words, the programmable controller is additionally provided with a circuit for canceling execution specification information of the following pipeline stage. Such a circuit is exemplified in the form of a circuit for logical multiply (AND) of the execution specification information and the BITACC 164, or a multiplexer (MUX1, MUX2, MUX3 or MUX4) which uses the BITACC 164 as a select signal as shown in FIG. 4 and selects either a control signal retained in the pipeline register on the previous stage or the execution specification information (0 in the example of the configuration shown in FIG. 5) for invalidating the following application instruction (i.e., the word processing), as an input to the area of each pipeline register that holds execution specification information (e.g., the WB of the pipeline register ID/EX 142).

As can be seen from the previously described circuit operation, the execution specification information of the instruction is transmitted by shifting the EX, M, and WB of the pipeline register ID/EX 142 to a subsequent stage for each clock. Therefore, simple but efficient control of the execution of an instruction can be realized. Further, the programmable controller of the present invention is arranged so as to execute consistent processing, that is, the retaining of the data processed in each stage in the following pipeline register after the completion of the processing of the current stage. For this reason, it is possible to make the data path of the specifically designed hardware simple but efficient.

The pipeline registers IF/ID 136, ID/EX 142, EX/MEM 152, MEM/WB 160, WB/IF 164, and PC 132 can be implemented by, e.g., a leading-edge type D flip-flop. Further, the general-purpose register block REGFILE 140 can be formed from, e.g., a flip-flop or memory. The other circuit elements can be formed by a combinational circuit.

Second Embodiment

Figure 7:
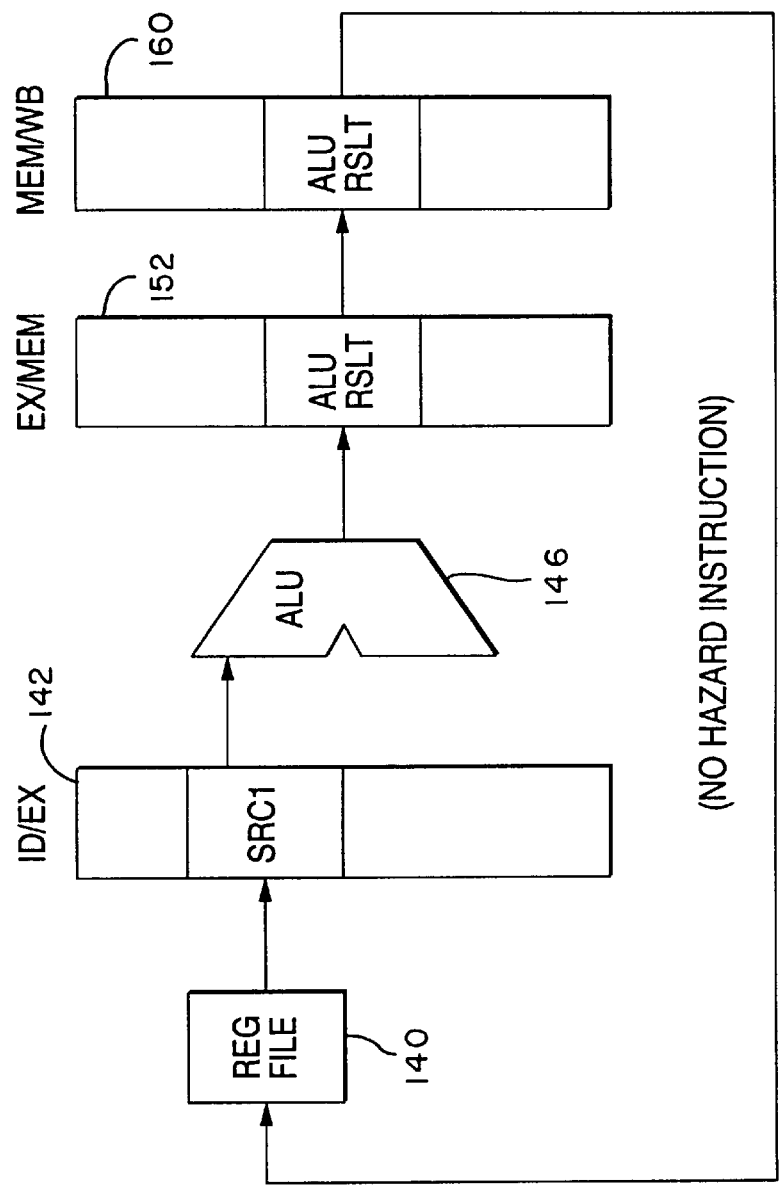
FIG. 7 is a block diagram showing a data path of the programmable controller shown in FIG. 4.

Of the five-stage pipeline structure shown in FIG. 4, a data path for use in executing a register-to-register operation will be described with reference to a block diagram shown in FIG. 7. A result of the operation carried out by the ALU 146 is written into any one of the general-purpose registers of the general-purpose register block REGFILE 140 via the ALURSLT of each of the two pipeline registers EX/MEM 152 and MEM/WB 160. If an instruction for writing a value into a certain general-purpose register is directly followed by an instruction for using the value of that general-purpose register as an argument, a value stored in a general-purpose register R 1 and a value stored in a general-purpose register R 2, for example, are in logical multiple (i.e., they are subjected to an AND operation). Further, if an instruction (AND R1 R2 R3) for writing a result of the AND operation into the general-purpose register R 3 is directly followed by an instruction (OR R3 R4 R5) for logical summation (OR) of a value stored in the general-purpose register R3 with a value stored in a general-purpose register R4 (i.e., the values are subjected to an OR operation) and for writing a result of the OR operation into the general-purpose register R5, an argument R3 used for executing the OR operation must be a result of the AND operation that is executed immediately before the OR operation. However, a value to be written into the general-purpose register R3 which is necessary to execute the OR operation is stored in the pipeline register EX/MEM 152 at the time of a register fetching operation for the OR operation. Because of this, a problem arises when the result of the operation becomes necessary for a subsequent instruction before that result is actually written into the general-purpose register.

To cope with such a pipeline hazard which arises when the general-purpose register is accessed, it is necessary to insert a required number of NOP instructions until the pipeline hazard is eliminated. The insertion of the NOP instructions does not require modifications to the circuit configuration and, therefore, can be easily carried out. However, the insertion of the NOP instructions results in a corresponding increase in the number of instructions, which in turn increases a program size.

With reference to FIGS. 8 through 12, a programmable controller according to second embodiment of the present invention will now be described. On the basis of the circuit of the programmable controller 130 shown in FIG. 4, the configuration particular to the present invention will be described. The illustration and explanation of the other part of the configuration will be omitted as required. To begin with, a data path for use in a register-to-register operation will be described with reference to FIG. 8. As previously described, the conventional data path shown in FIG. 7 has such a problem that if the following instruction refers to a general-purpose register of a general-purpose register block REGFILE before a result of the register-to-register operation is written into that general-purpose register, the data fetched from the register is not updated and hence becomes useless. Therefore, the programmable controller of the present invention is provided with an additional data path by disposing selecting means SRCFB 170 for selecting an argument for use with an ALU 146 in the second stage of the pipeline operation, as shown in the block diagram in FIG. 8.

Figure 8:
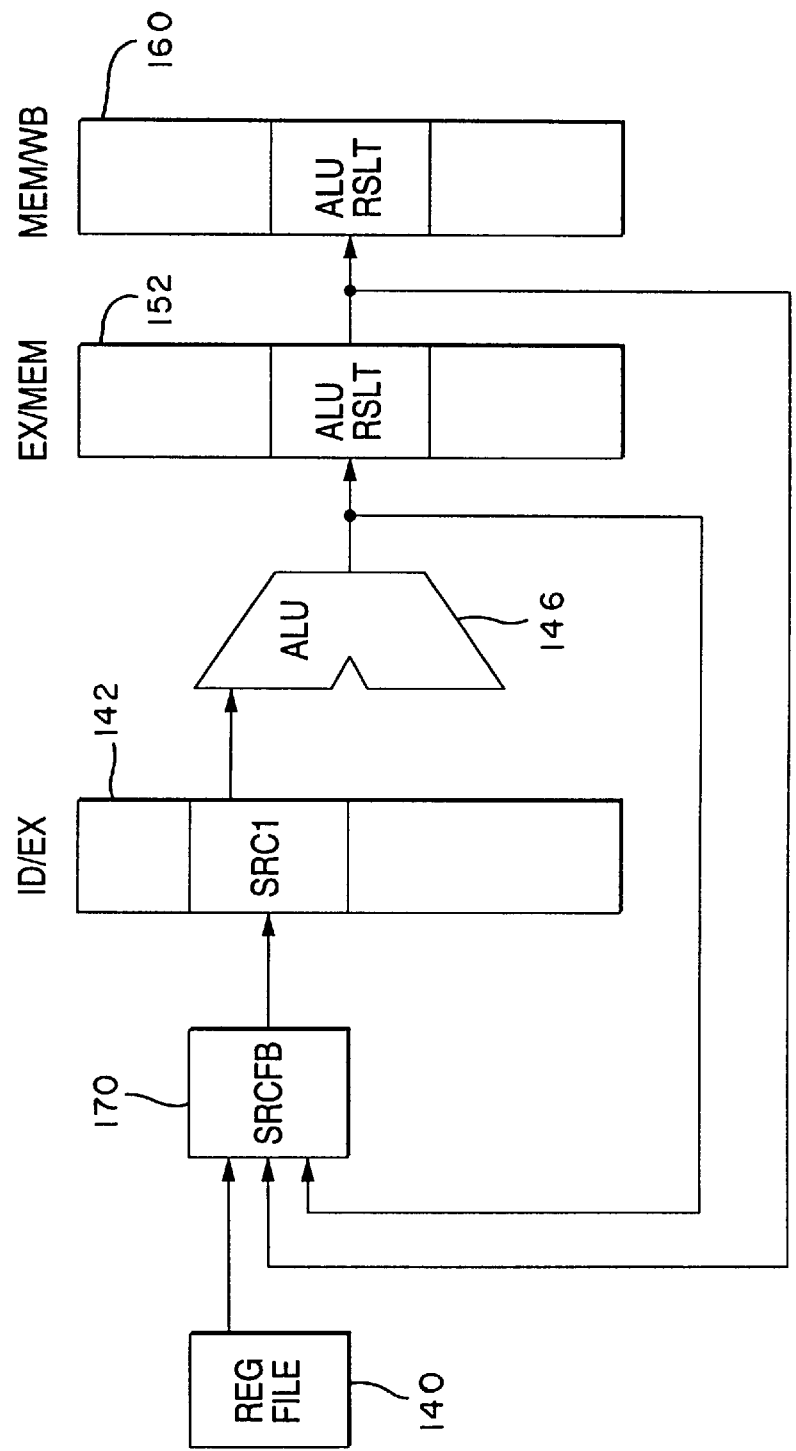
FIG. 8 is a block diagram showing a programmable controller according to one embodiment of the present invention.

As illustrated in FIG. 8, an output of a general-purpose register REGFILE 140 (i.e., an output of a general-purpose register), an output of the ALU 146 of a third stage, and an output of an ALURSLT of a pipeline register EX/MEM 152 (i.e., an output of the ALU 146 taken in the fourth stage) are connected to an input of the selecting means SRCFB 170. An output of the selecting means SRCFB 170 is connected to an input of SRC 1 of a pipeline register ID/EX 142. The selecting means SRCFB 170 is arranged so as to be able to select a value to be input to the SRC 1 of the pipeline register ID/EX 142 which holds an argument for use in the ALU 146 from among an output of the general-purpose register, an output of the ALU 146, and the ALURSLT of the pipeline register EX/MEM 152 (i.e., an output of the ALU 146 supplied to the fourth stage). FIG. 8 shows only a data path connected to one of the two arguments of the ALU 146 which is relevant to the fetching of data from the register carried out by the SRC 1.

Figure 9:
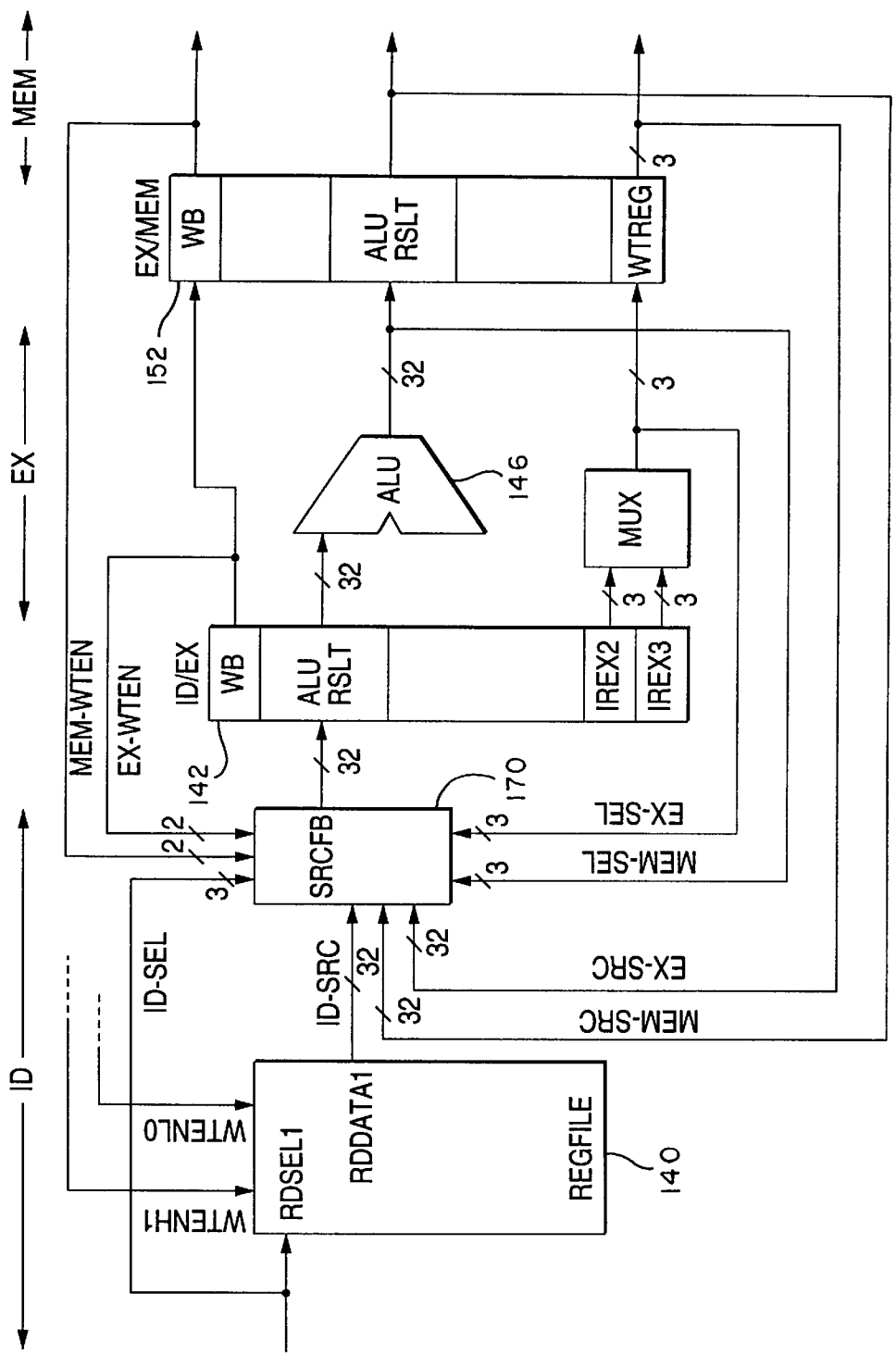
FIG. 9 is a block diagram showing a data path of the programmable controller shown in FIG. 8.

FIG. 9 is a block diagram showing a more specific configuration of the data path illustrated in FIG. 8. Only the portions pertinent to the present invention are shown in this drawing. As illustrated in the drawing, the selecting means SRCFB 170 is disposed in the second stage (hereinafter referred to as an ID stage). An output of the ALU 146 and an output of the ALURSLT of the pipeline register EX/MEM 152 are delivered to the selecting means SRCFB 170 as signals EX-SRC and MEM-SRC, respectively. A read register designation signal ID-SEL of the general-purpose register file REGFILE 140 is output to the selecting means SRCFB 170 (that read register designation signal is also fed to a terminal RDSEL 1 for receiving a signal for specifying a general-purpose register which outputs a value from RDDATA 1 of the general-purpose register file REGFILE 140).

An EX-SEL signal is a write register designation signal of the third stage (hereinafter referred to as an EX stage), whereas a MEM-SEL signal is a write register designation signal of the fourth stage (hereinafter referred to as a, MEM stage) A value of IREX 2 or IREX 3 of the pipeline register ID/EX 142 is output to the selecting means SRCFB 170 as the write register designation signal EX-SEL for the EX stage. Further, a value of WTREG of the pipeline register EX/MEM 152 is output to the selecting means SRCFB 170 as the write register designation signal MEM-SEL for the MEM stage.

A value stored in WB of the pipeline register ID/EX 142 is output to the selecting means SRCFB 170 as a register write effective signal EX-WTEN for the EX stage. A value stored in WB of the pipeline register EX/MEM 152 is output to the selecting means SRCFB 170 as a register write effective signal MEM-WTEN for the MEM stage. An output from TA 1 of the output terminal RDDATA 1 of the general-purpose register file REGFILE 140 is output to the selecting means SRCFB 170 as a signal ID-SRC. An output of the selecting means SRCFB 170 is connected to the SRC I of the pipeline register ID/EX 142. FIG. 9 shows a circuit in which a result of the operation of the preceding instruction is returned to the SRC 1 of the pipeline register ID/EX 142.

Figure 10:
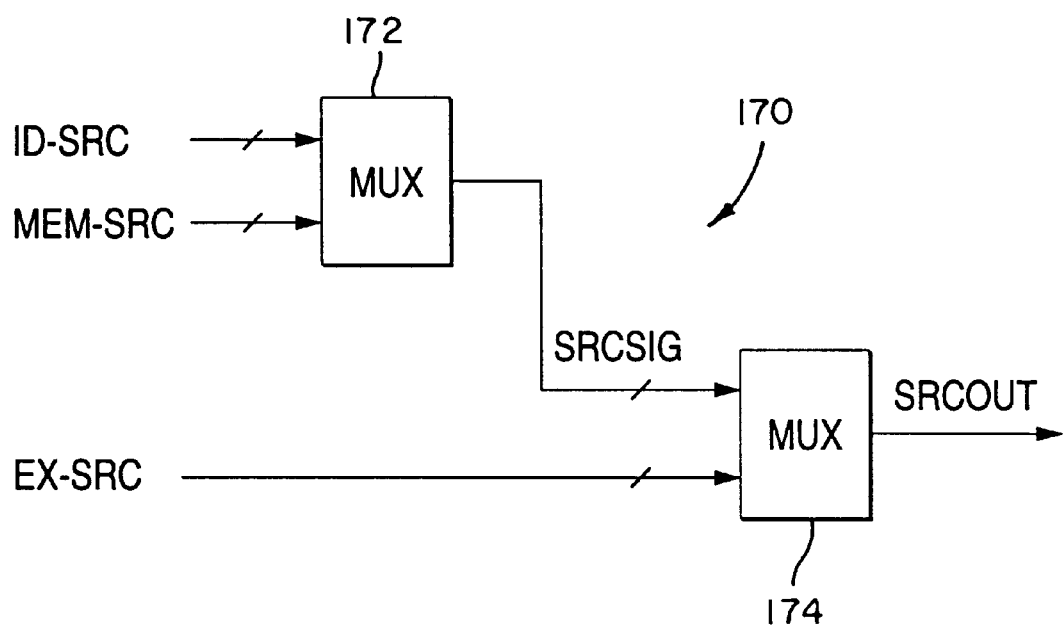
FIG. 10 is a block diagram showing some of a circuit of selecting means SRCFB of the programmable controller shown in FIG. 8.

For example, the selecting means SRCFB 170 is made by combination of two multiplexers, 172 and 174, as shown in FIG. 10, and is arranged so as to select data to be output to the SRC 1 of the pipeline register ID/EX 142. In FIG. 10, either the signal ID-SRC or the signal MEM-SRC is selected by the first multiplexer 172, and either of the thus selected signal or the signal EX-SRC is selected by the second multiplexer 174.

Figure 11:
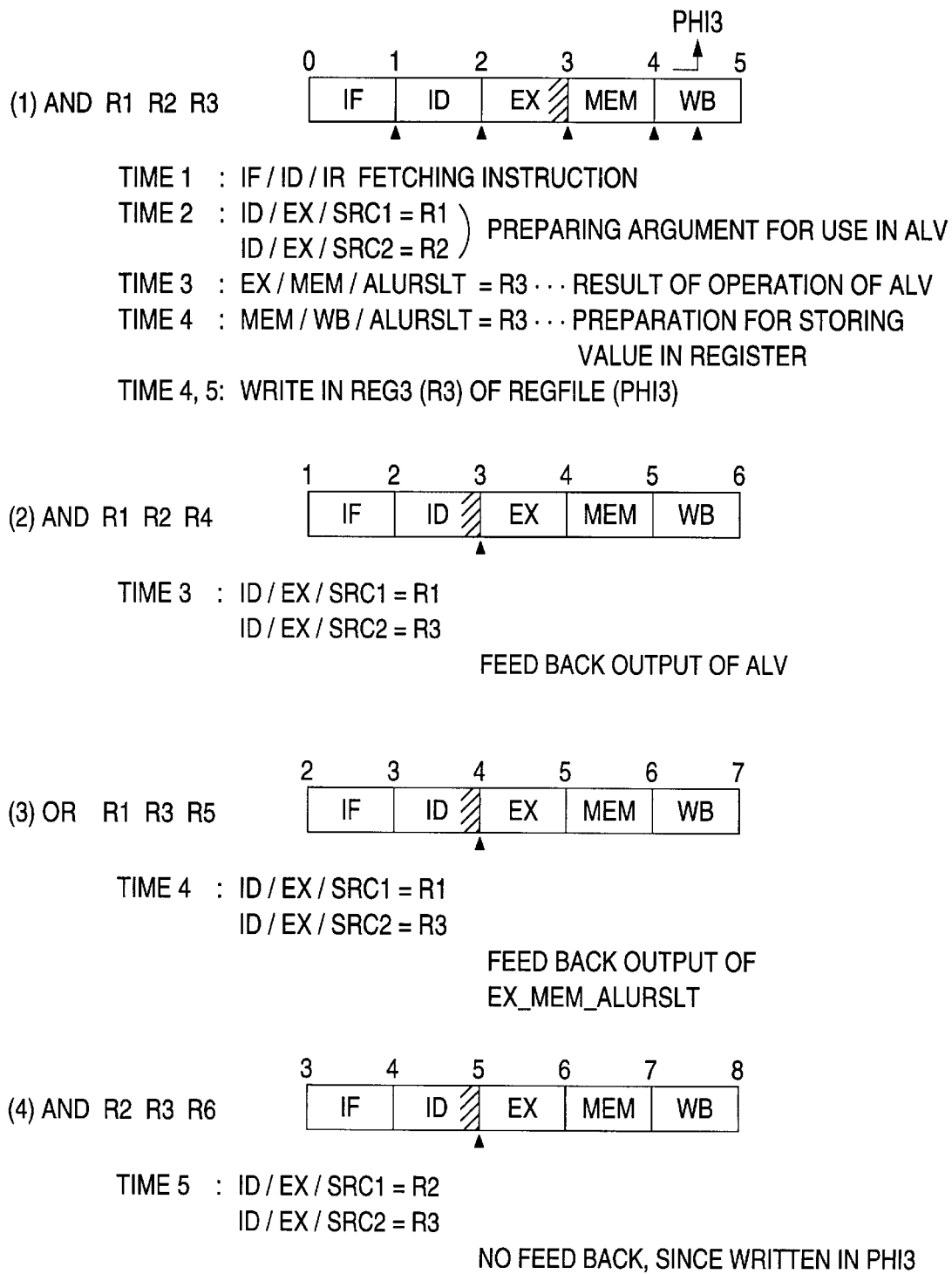
FIG. 11 is an illustration for explaining the operation of the programmable controller of the present invention.

With reference to FIG. 11, the operation of the circuit shown in FIG. 9 in the event of a pipeline hazard arising as a result of an access to the general-purpose register will now be described. In the processing shown in FIG. 11, three register-to-register instructions (i.e., AND R1 R3 R4, OR R1 R3 R5, and AND R2 R3 R6) are executed in which a value of a general-purpose register R3 is updated according to a first AND instruction (i.e., AND R1 R2 R3), and the updated value of the general-purpose register R3 is used as an argument. The following descriptions will be based on the assumption that processing time of one stage is one and has a length corresponding to one cycle of a reference clock signal PHI 1, and that the processing in each stage is executed in synchronism with the rise time of the reference clock PHI 1. The descriptions will be further based on the assumption that the starting time of the processing associated with the first instruction is time 0, and that the stop time of each of the stages is taken as time 1 to time 8, respectively.

To begin with, the processing of the first instruction (AND instruction) will be described. The first instruction is read from an instruction memory into an instruction register IR (IF/ID/IR) at time 1. Values of general-purpose registers R1 and R2 are stored in the SRC 1 (ID/EX/SRC1) and SRC 2 (ID/EX/SRC2) of the pipeline register ID/EX 142 at time 2, respectively, whereby arguments for use in the ALU are prepared. The ALU 146 executes an AND operation at time 3, and a result of the operation to be stored in the general-purpose register R3 is stored in the ALURSLT (EX/MEM/ALURSLT) of the pipeline register EX/MEM 152. The value stored in the ALURSLT (EX/MEM/ALURSLT) of the pipeline register EX/MEM 152 is stored in the ALURSLT (MEM/WB/ALURSLT) of the pipeline register MEM/WB 160 at time 4, in preparation for storing the value in the general-purpose register R3. The value stored in the ALURSLT (MEM/WB/ALURSLT) of the pipeline register MEM/WB 160 is written into the general-purpose register R3 of the general-purpose register file REGFILE 140 at the rising edge (i.e., time 4.5) of a clock signal PHI 3 which is 180 degrees out of phase with the reference clock signal PHI 1.

Next, the processing of the second instruction (AND instruction, AND RI R3 R4) will be described. The value of the general-purpose register R3 becomes necessary in the EX stage which gets started at time 3. In this case, the output of the ALU 146 is fed back to the EX stage via the selecting means SRCFB 170, and that output is stored in the SRC 2 (ID/EX/SRC2) of the pipeline register ID/EX 142 at time 3.

For the third instruction (OR instruction, OR RI R3 R5), the value of the general-purpose register 3 becomes necessary in the EX stage which gets started at time 4. In this case, the value stored in the ALURSLT (EX/MEM/ALURSLT) of the pipeline register EX/MEM 152 is fed back to the EX stage via the selecting means SRCFB 170, and that value is stored in the SRC 2 (ID/EX/SRC2) of the pipeline register ID/EX 142.

For the fourth instruction (AND instruction, AND R2 R3 R6), a result of the first AND instruction is written into the general-purpose register R3 at time 4.5. That value is fetched from the general-purpose register R3 and is supplied to the SRC 2 (ID/EX/SRC2) of the pipeline register ID/EX 142, whereby that value is processed.

As described above, the result of the operation of the first instruction is written into the general-purpose register R3 at time 4.5. Therefore, for the second and third instructions in which it is necessary to fetch values from the general-purpose register before time 4.5, it is impossible to read correct values from the general-purpose register R3. For this reason, in the case of the second instruction (i.e., when the value of the general-purpose register to be used as an argument is updated by the immediately preceding instruction), the output of the ALU is used as an argument in lieu of the output of the general-purpose register. Further, in the case of the third instruction (i.e., when the value of the general-purpose register to be used as an argument is updated by the instruction next but one before the current instruction), the value stored in the ALURSLT of the pipeline register EX/MEM 152 is used as an argument in lieu of the output from the general-purpose register.

A method of determining whether or not the value which is stored in the general-purpose register and is used as the argument of the ALU 146 is updated by the preceding instruction will now be described. It is possible to determine which of the general-purpose registers becomes an object register from the read register designation signal ID-SEL of the general-purpose register file REGFILE 140, the write register designation signal EX-SEL of the EX stage, and the write register designation signal MEM-SEL of the MEM stage.

It is also possible to determine whether or not a writing operation is carried out with respect to the general-purpose from the register write effective signal EX-WTEN of the EX stage and the register write effective signal MEM-WTEN of the MEM stage. In short, if there is a match between the read register number (i.e., the read register designation signal ID-SEL of the general-purpose register file REGFILE) required to fetch a value from the register and the write register number (i.e., the write register designation signal EX-SEL of the EX stage) of the EX stage, and if the register write effective signal EX-WTEN of the EX stage is "effective", the register write data (i.e., the output of the ALU 146) of the EX stage are used as a signal for use in fetching a value from the register, instead of the output from the general-purpose register. Further, if there is a match between the read register number (i.e., the read register designation signal ID-SEL of the general-purpose register file REGFILE 140) required to fetch a value from the register and the write register designation number MEM-SEL of the MEM stage, and if the register write effective signal MEM-WTEN of the MEM stage is "effective", the register write data (i.e., the output of the ALURSLT of the pipeline register EX/MEM) of the MEM stage are used as a signal for use in fetching a value from the register instead of the output from the general-purpose register.

Moreover, if there is a match between all of the read register numbers (i.e., the read register designation signal ID-SEL of the general-purpose register file REGFILE) required to fetch a value from the register, the write register number (i.e., the write register designation signal EX-SEL, of the EX stage) of the EX stage, and the write register designation number MEM-SEL of the MEM stage, and if the register write effective signal EX-WTEN of the EX stage and the register write effective signal MEM-WTEN of the MEM stage are "effective", the register write data (i.e., the output of the ALU 146) of the EX stage are used as a signal for use in fetching a value from the register. This is attributable to the fact that if a general-purpose register to be used as an argument of a certain instruction is updated by the instruction immediately before the current instruction and the instruction next but one before the current instruction, a result updated by the immediately preceding instruction must be used as an argument.

Figure 12:
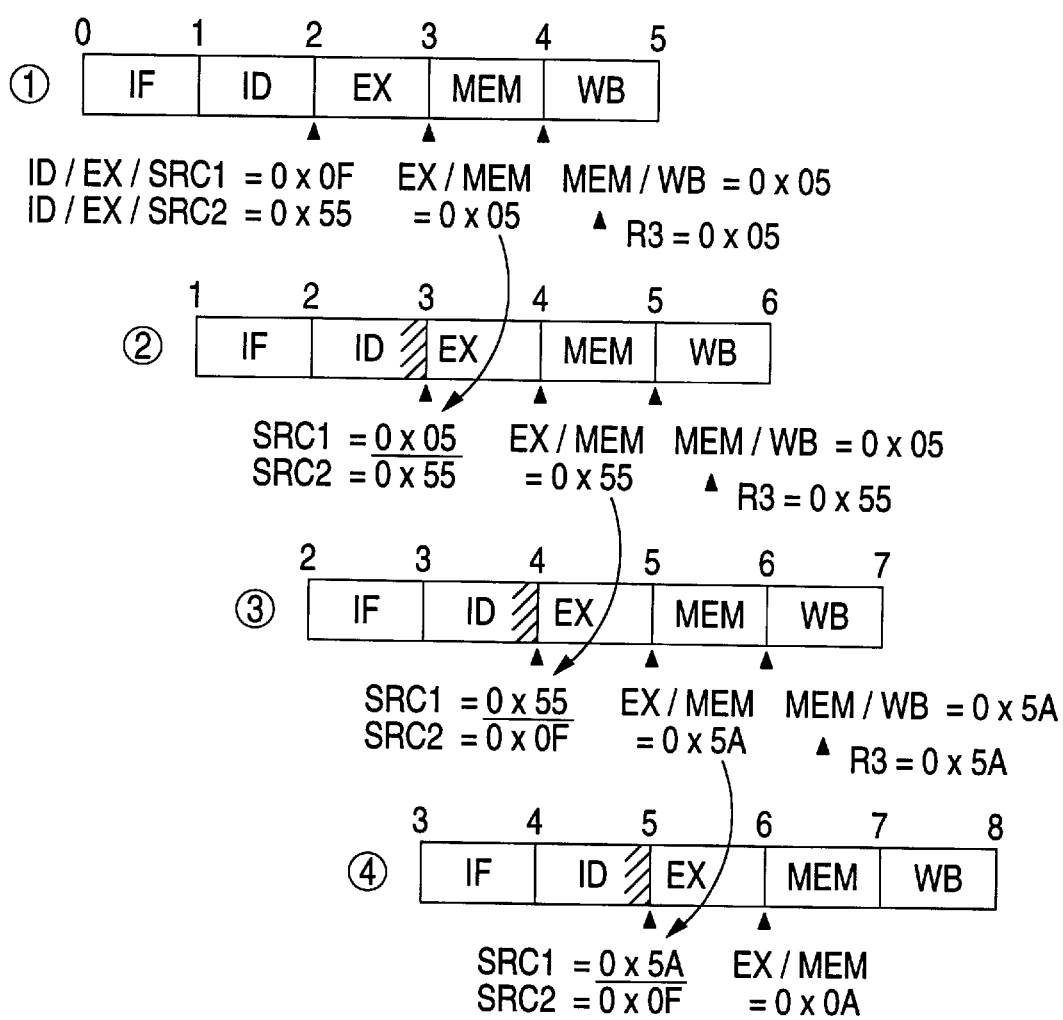
FIG. 12 is an illustration for explaining the operation of the programmable controller of the present invention.

A method of processing consecutive four instructions in which the value of the general-purpose register R3 is consecutively rewritten will be described with reference to FIG. 12. For brevity, the following descriptions will be based on the assumption that the general-purpose register is 8 bits long, and that 00001111(0x0F) and 01010101(0x55) are stored in the general-purpose registers R1 and R2, respectively. For the first instruction (AND R1 R2 R3), 0x0F and 0x55 are stored in the SRC 1 (ID/EX/SRC1) and SRC 2(ID/EX/SRC2) of the pipeline register ID/EX 142 at time 2, respectively. An operational result 0x0S is stored in the ALURSLT (EX/MEM/ALURSLT) of the pipeline register EX/MEM 152 at time 3. An operational result 0x55 is stored in the ALURSLT (EX/MEM/ALURSLT) of the pipeline register MEM/WB 160 at time 4. An operational result 0x05 is written into the general-purpose register R3 at time 4.5.

For the second instruction (OR R3 R2 R3), the operational result 0x05 stored in the ALURSLT (EX/MEM/ALURSLT) of the pipeline register EX/MEM 152 is fed back to the SRC1 (ID/EX/SRC1) of the pipeline register ID/EX 142 at time 3 via the SRCFB 170. The operational result (0x55) of this instruction is stored in the ALURSLT (EX/MEM/ALURSLT) of the pipeline register EX/MEM 152 at time 4.

For the third instruction (XOR R3 R1 R3), the operational result (0x55) stored in the ALURSLT (EX/MEM/ALURSLT) of the pipeline register EX/MEM 152 is fed back to the SRC 1 (ID/EX/SRC1) of the pipeline register ID/EX 142 at time 4.

A programmable controller of a different embodiment of the present invention will be described with reference to a block diagram shown in FIG. 13. In the programmable controller shown in FIG. 8, the data path for selecting an argument for use in the ALU 146 is provided in the second stage (i.e., ID stage) of the pipeline operation. On the contrary, according to the embodiment shown in FIG. 13, the data path is provided in the third stage (i.e., the EX stage) so as to perform the same function as in the embodiment shown in FIG. 8.

Figure 13:
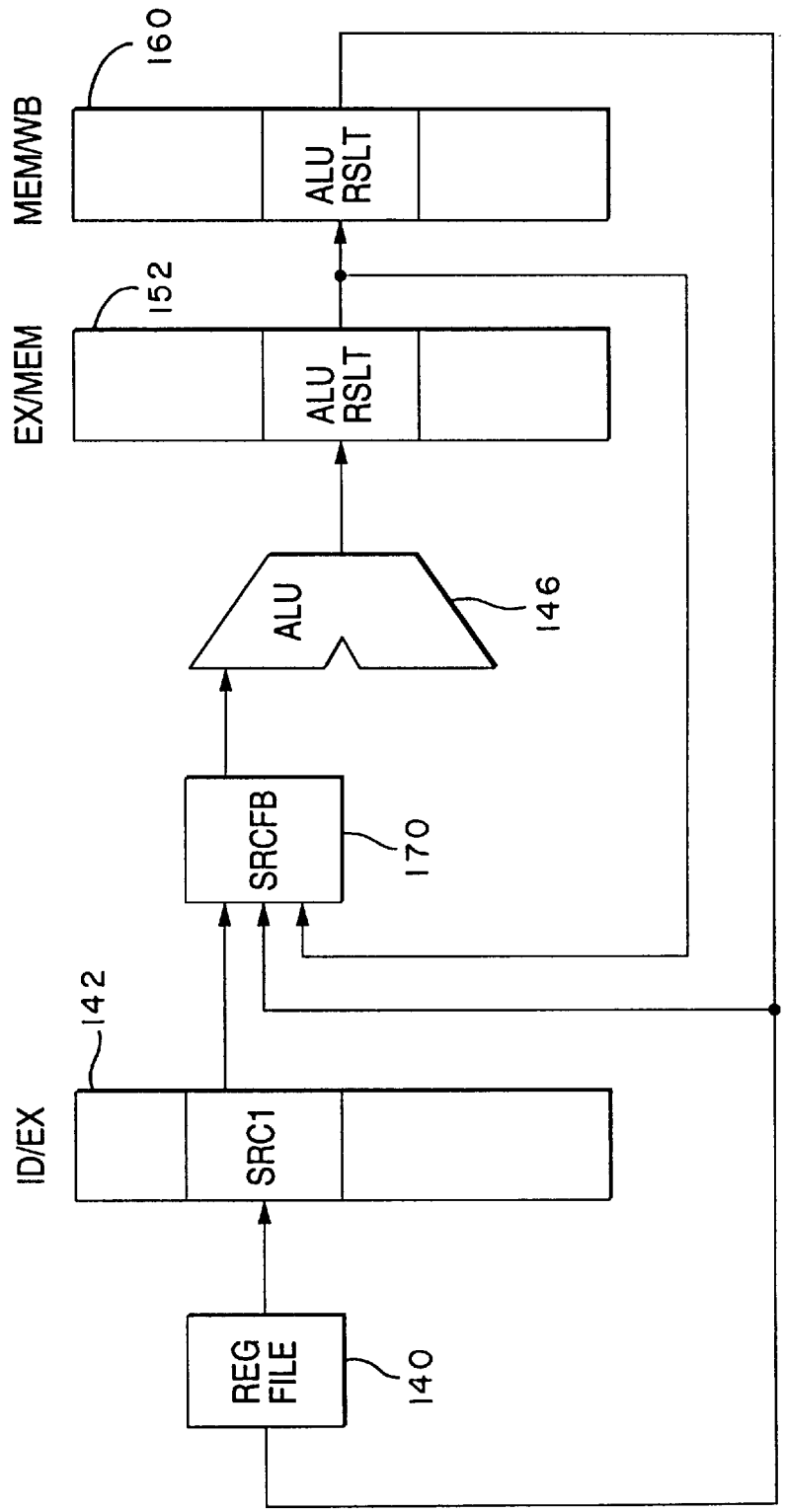
FIG. 13 is a block diagram showing another embodiment of the programmable controller of the present invention.

As illustrated in FIG. 13, the selecting means SRCFB 170 is provided in the third stage of the pipeline operation for selecting an argument for use in the ALU 146. The value output from the second stage to one of the input terminals of the ALU 146 (i.e., the output of the SRC 1 of the pipeline register ID/EX 142), the output of the ALU 146 supplied to the fourth stage (i.e., the output of the ALURSLT of the pipeline register EX/MEM 152), and the output of the ALU 146 supplied to the fifth stage (i.e., the output of the ALURSLT of the pipeline register MEM/WB 160) are connected to input terminals of the selecting means SRCFB 170, and the output of the SRCFB 170 is connected to one of the inputs of the ALU 146. The selecting means SRCFB 170 is arranged so as to be able to select a value to be input to one of the input terminals of the ALU 146, from among the value output from the second stage to one of the input terminals of the ALU 146 (i.e., the output of the SRC 1 of the pipeline register ID/EX 142), the output of the ALU 146 supplied to the fourth stage (i.e., the output of the ALURSLT of the pipeline register EX/MEM 152), and the output of the ALU 146 supplied to the fifth stage (i.e., the output of the ALURSLT of the pipeline register MEM/WB 160). FIG. 8 shows only the data path connected to one of the two arguments of the ALU 146 which is relevant to the fetching of data from the general-purpose register carried out by the SRC 1.

Figure 14:
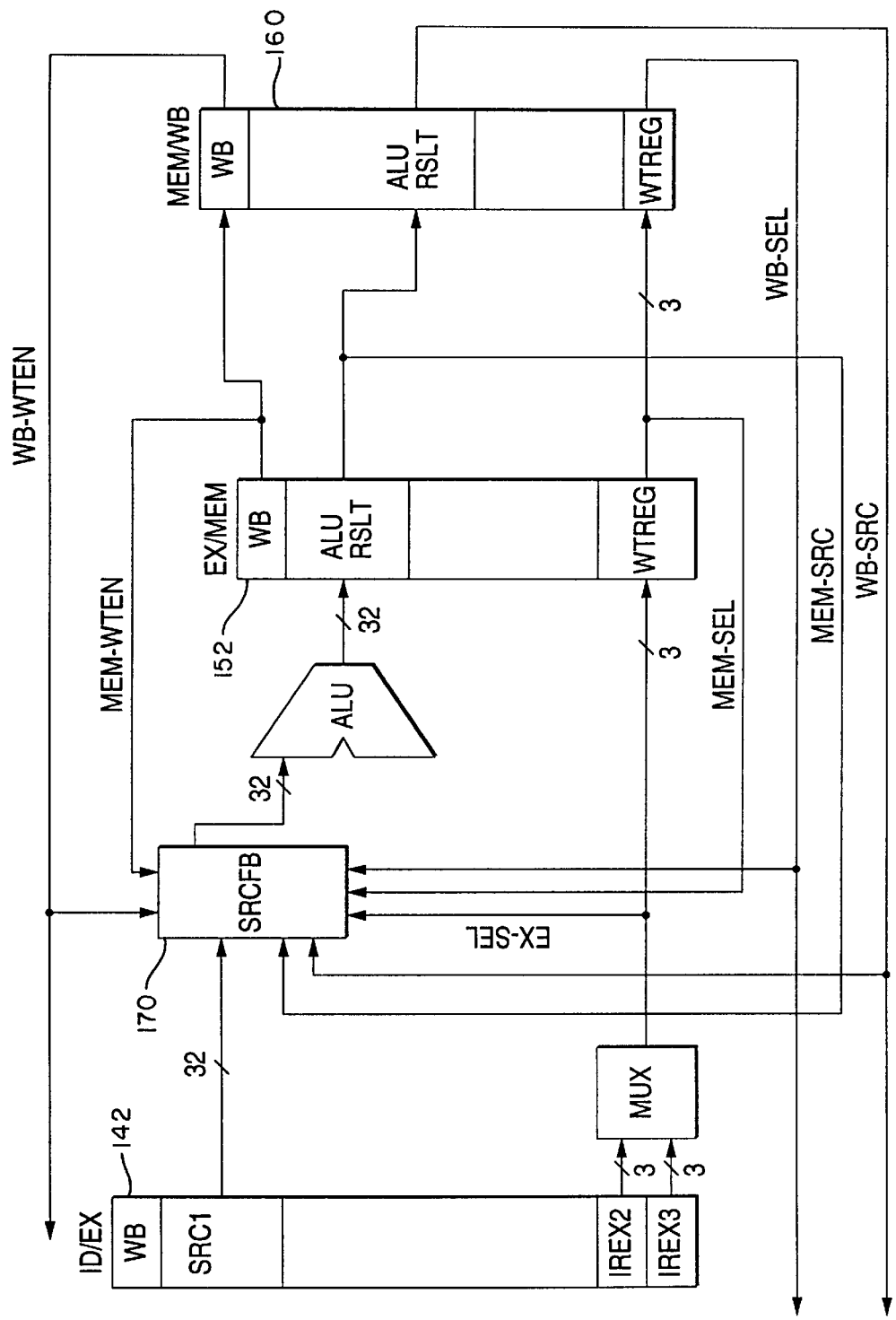
FIG. 14 is a block diagram showing a data path of the programmable controller shown in FIG. 13.

FIG. 14 is a block diagram showing a more specific configuration of the data path illustrated in FIG. 13. Only the portions pertinent to the present invention are shown in this drawing. As illustrated in the drawing, the selecting means SRCFB 170 is disposed in the third stage (hereinafter referred to as an EX stage). The output of the ALURSLT of the pipeline register EX/MEM 152 and the output of the ALURSLT of the pipeline register MEM/WB 160 are fed to the selecting means SRCFB 170 as signals MEM-SRC and WB-SRC, respectively. Further, an output of the SRC 1 of the pipeline register ID/EX 142 is output to the selecting means SRCFB 170.

A MEM-SEL signal is a write register designation signal of the MEM stage, and a WEB-SEL signal is a write register designation signal of the WB stage. An EX-SEL signal is a write register designation signal of the EX stage. The value of the WTREG of the pipeline register EX/MEM 152 is output to the selecting means SRCFB 170 as the write register designation signal MEM-SEL for the MEM stage. The output of the WTREG of the pipeline register MEM/WB 160 is output to the selecting means SRCFB as a write register resignation signal WB-SEL for the WB stage. The value of either the IREX 2 or IREX 3 of the pipeline register ID/EX 142 is output to the selecting means SRCFB 170 as a write register designation signal EX-SEL for the EX stage.

A value stored in the WB of the pipeline register EX/MEM 152 is output to the selecting means SRCFB 170 as a register write effective signal MEM-WTEN for the MEM stage, and a value stored in the WB of the pipeline register MEM/WB 160 is output to the selecting means SRCFB 170 as a register write effective signal WB-WTEN. The output of the selecting means SRCFB 170 is connected to one of the two input terminals of the ALU 146. FIG. 14 shows a circuit in which a result of the operation of the preceding instruction is returned to one of the two input terminals of the ALU 146.

With reference to FIG. 15, the operation of the circuit shown in FIG. 13 will be described. FIG. 15 shows the operation of the circuit in the event of a pipeline hazard arising as a result of an access to the general-purpose register will now be described. Two register-to-register instructions (i.e., AND R1 R3 R4, OR R1 R3 R5) are executed in which a value of the general-purpose register R3 is updated according to the first AND instruction (i.e., AND RI R2 R3), and the updated value of the general-purpose register R3 is used as an argument.

To begin with, the processing of the first instruction (AND instruction) will be described. The first instruction is read from the instruction memory into the instruction register IR (IF/ID/IR) at time 1. The values of general-purpose registers R1 and R2 are stored in the SRC 1 (ID/EX/SRC1) and SRC 2 (ID/EX/SRC2) of the pipeline register ID/EX 142 at time 2, respectively, whereby arguments for use in the ALU 146 are prepared. The ALU 146 executes ar AND operation at time 3, and an operation result to be stored in the general-purpose register R3 is stored in the ALURSLT (EX/MEM/ALURSLT) of the pipeline register EX/MEM 152. The value stored in the ALURSLT (EX/MEM/ALURSLT) of the pipeline register EX/MEM 152 is stored in the ALURSLT (MEM/WB/ALURSLT) of the pipeline register MEM/WB 160 at time 4, in preparation for storing the value in the general-purpose register R3. The value stored in the ALURSLT (MEM/WB/ALURSLT) of the pipeline register MEM/WB 160 is written into the general-purpose register R3 of the general-purpose register file REGFILE 140 at the rise time (i.e., time 4.5) of the clock signal PHI 3.

Next, the processing of the second instruction (AND instruction, AND RI R3 R4) will be described. The value of the general-purpose register R3 becomes necessary in the EX stage which gets started at time 3. In this case, the output of the ALURSLT (EX/MEM/ALURSLT) of the pipeline register EX/MEM 152 is fed back and input to one of the two inputs of the ALU 146 via the selecting means SRCFB 170 as the output from the SRC 2.

For the third instruction (OR instruction, OR R1 R3 R5), the value of the general-purpose register 3 becomes necessary in the EX stage which gets started at time 4. In this case, the value stored in the ALURSLT (EX/MEM/ALURSLT) of the pipeline register EX/MEM 152 is fed back and input to one of the two inputs of the ALU 146 via the selecting means SRCFB 170 as the output from the SRC 2.

Figure 16:
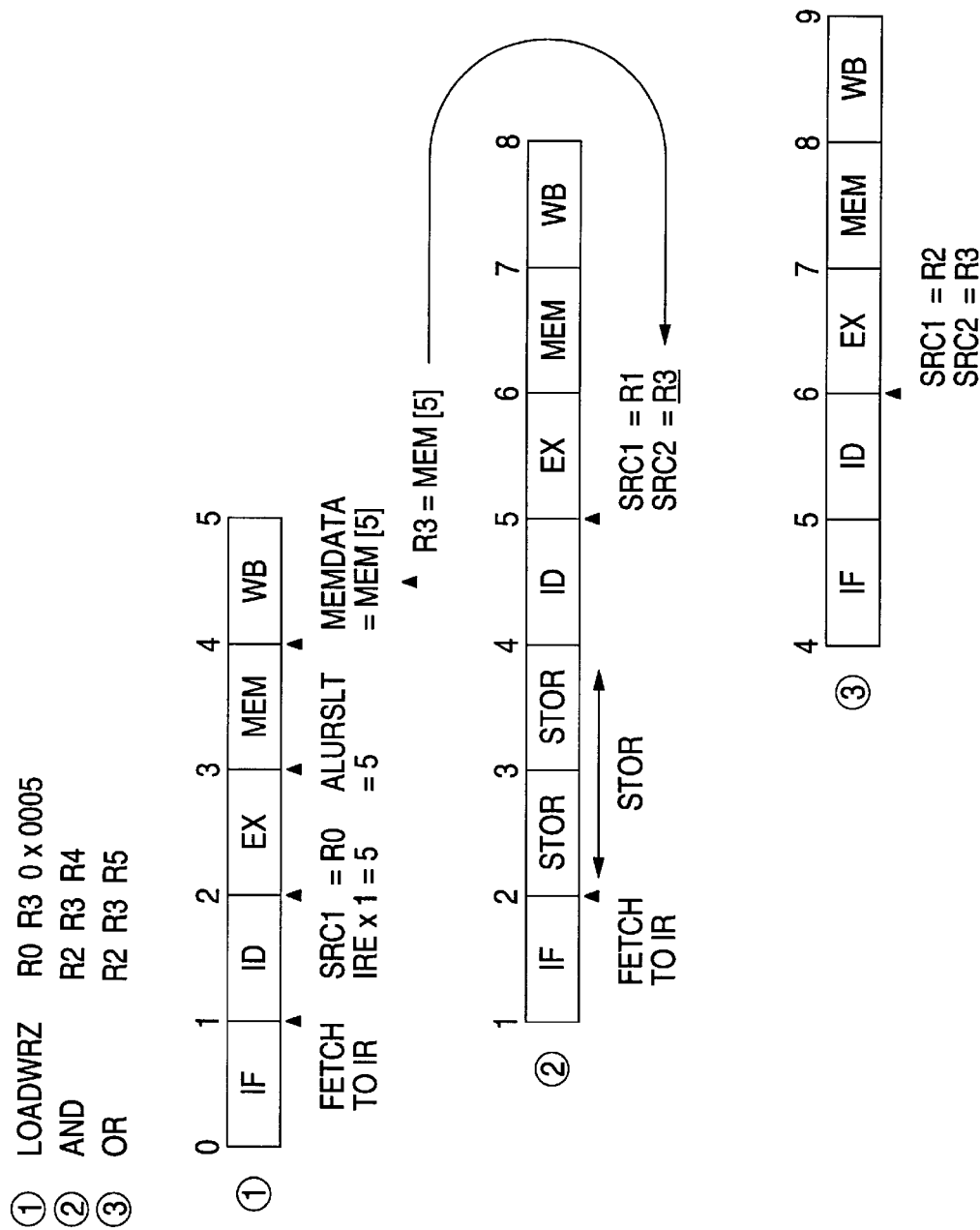
FIG. 16 is an illustration for explaining the operation of the programmable controller of the present invention.

In the programmable controller shown in FIGS. 8 and 13, where the general-purpose register for feeding an argument of a certain instruction is updated by the immediately preceding instruction or the instruction next but one before the current instruction, the data are not fetched from the general-purpose register but fed back from a certain location on the pipeline register. However, if the preceding instruction is a LOAD instruction, object data appear on the pipeline register only after access to the memory has been made in the MEM stage. The operation of the circuit in the case where a value of the general-purpose register to be updated by the LOAD instruction is used as an argument of the following instruction will now be described with reference to FIG. 16.

A first load instruction (LOADWRZ R0 R3 0x0005) instructs calculation of the address of memory from which data are to be read by adding 0x0005 to the value stored in a general-purpose register R0, and storage of the value, which is stored in the memory at that address, in the general-purpose register R3. The data associated with that LOAD instruction do not appear on the pipeline register before the stop point of the MEM stage (i.e., time 4). Therefore, it is impossible for the AND instruction immediately following the LOAD instruction to fetch the data from the pipeline register before time 4.

In other words, a value is written into the general-purpose register REGFILE in the course of the operation in the fifth stage (i.e. the WB stage). A value of the data memory appearing in the pipeline register MEM/WB (MEMDATA of the pipeline register MEM/WB) at time 4 is stored in the general-purpose register R3 at time 4.5. The value stored in the general-purpose register R3 is fetched at time 5 according to the following instruction.

Figure 17:
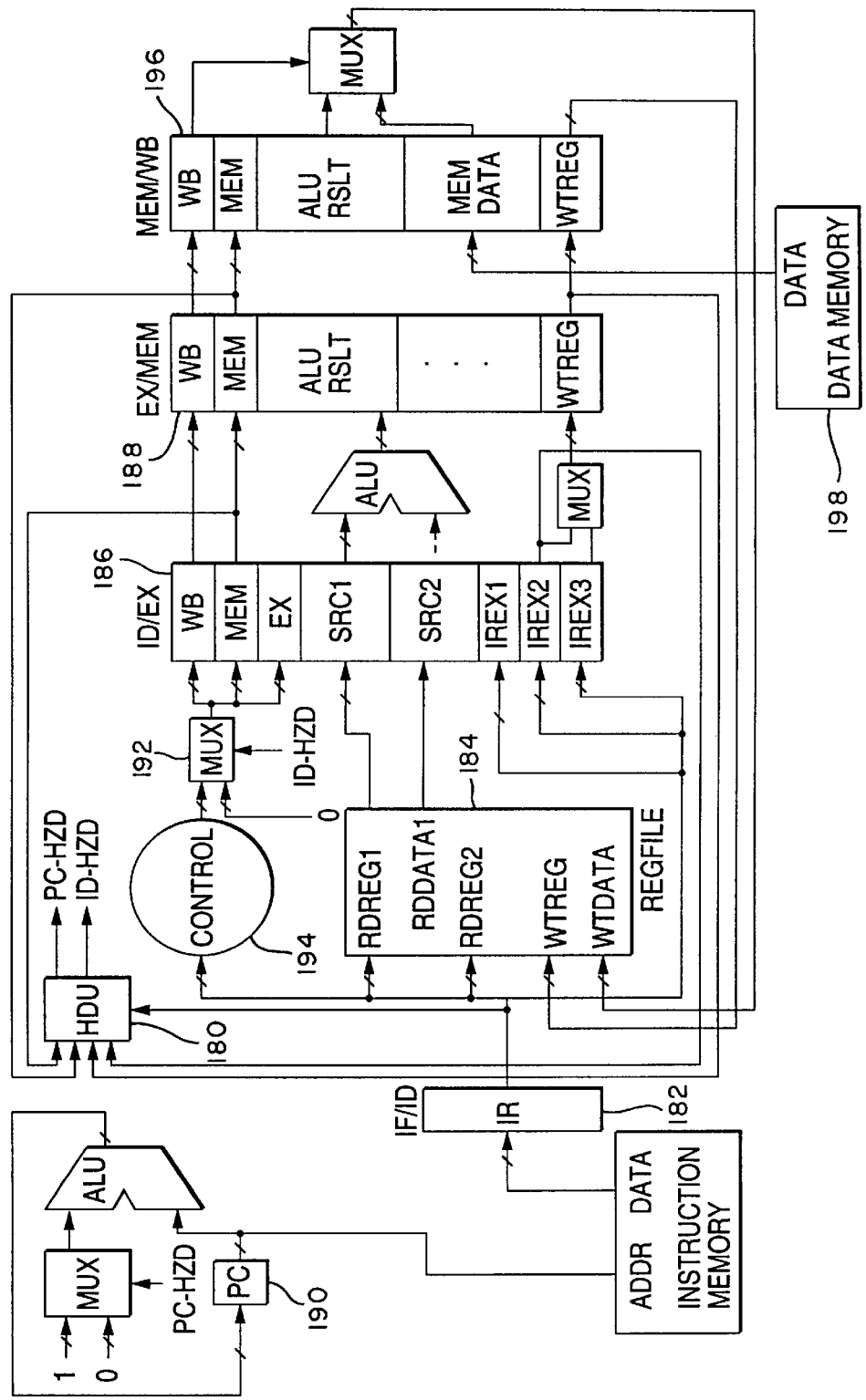
FIG. 17 is a block diagram showing still another embodiment of the programmable controller of the present invention.

If the preceding instruction requires the execution of the operation of the ALU like the register-to-register operation or an immediate operation, the data to be written into the general-purpose register exist on the pipeline register. However, in the case of the LOAD instruction, it is impossible to obtain the data until a value is read from the data memory in the fourth stage (i.e., the MEM stage). Therefore, it is necessary to suspend the execution of the following instruction until a correct value is supplied to the register. FIG. 17 shows one embodiment of the programmable controller which implements the above described function.

FIG. 17 shows a circuit in which an execution control block HDU 180 for controlling the execution of an instruction is provided in the second stage. The execution control block HDU 180 receives two read register designation signals fed from a pipeline register IF/ID 182 (the signals correspond to RDREG 1 and RDREG 2 of the general-purpose register file 184 (REGFILE), a write register designation signal IREX 2 and a data memory access control signal MEM fed from the pipeline register ID/EX 186, and a write register designation signal WTREG and the data memory access control signal MEM fed from the pipeline register EX/MEM 188.

It can be seen that the general-purpose register which requires the instruction currently being decoded in the ID stage is updated by the immediately preceding LOAD instruction under the following conditions: In other words, there is a match between the read register number (i.e., the read register) for the ID stage and the write register number for the EX stage (i.e., the write register designation signal IREX 2 of the pipeline register ID/EX 186), and data are read from the memory access of the EX stage (i.e., the data memory access control signal MEM of the pipeline register ID/EX 186). Similarly, if the same check is carried out using a corresponding signal of the MEM stage, it becomes possible to determine whether or not the general-purpose register which requires the instruction currently being decoded in the ID stage is updated by the LOAD instruction next but one before the current instruction. If it has been detected that the general-purpose register which requires the instruction currently being decoded is updated by the immediately preceding LOAD instruction or the LOAD instruction next but one before the current instruction, it is necessary to suspend the execution of the instruction currently being decoded. To this end, the execution control block HDU 180 outputs control signals PC-HZD and ID-HZD. If the PC-HZD signal is zero, the program counter 190 is incremented in the usual manner. However, if the PC-HZD signal is one, the program counter 190 is arranged so as not to change (i.e., the value added to the program counter PC is switched between 0 and 1 depending on the control signal PC-HZD). If the ID-HZD is one, a multiplexer 192 controlled by the control signal ID-HZD (i.e., a multiplexer which outputs either a value obtained as a result of decoding of an operation code of the instruction or zero to the WB of the pipeline register ID/EX 186, or the like) overwrites the control signal, which was decoded by the instruction decoder CONTROL 194 for decoding the operation code of the instruction, with zero. As a result, the data memory and the general-purpose register are inhibited from being written to. It is possible for the execution control block HDU 180 to suspend the execution of the instruction by outputting one as the PC-HZD and ID-HZD signals.

Figure 18:
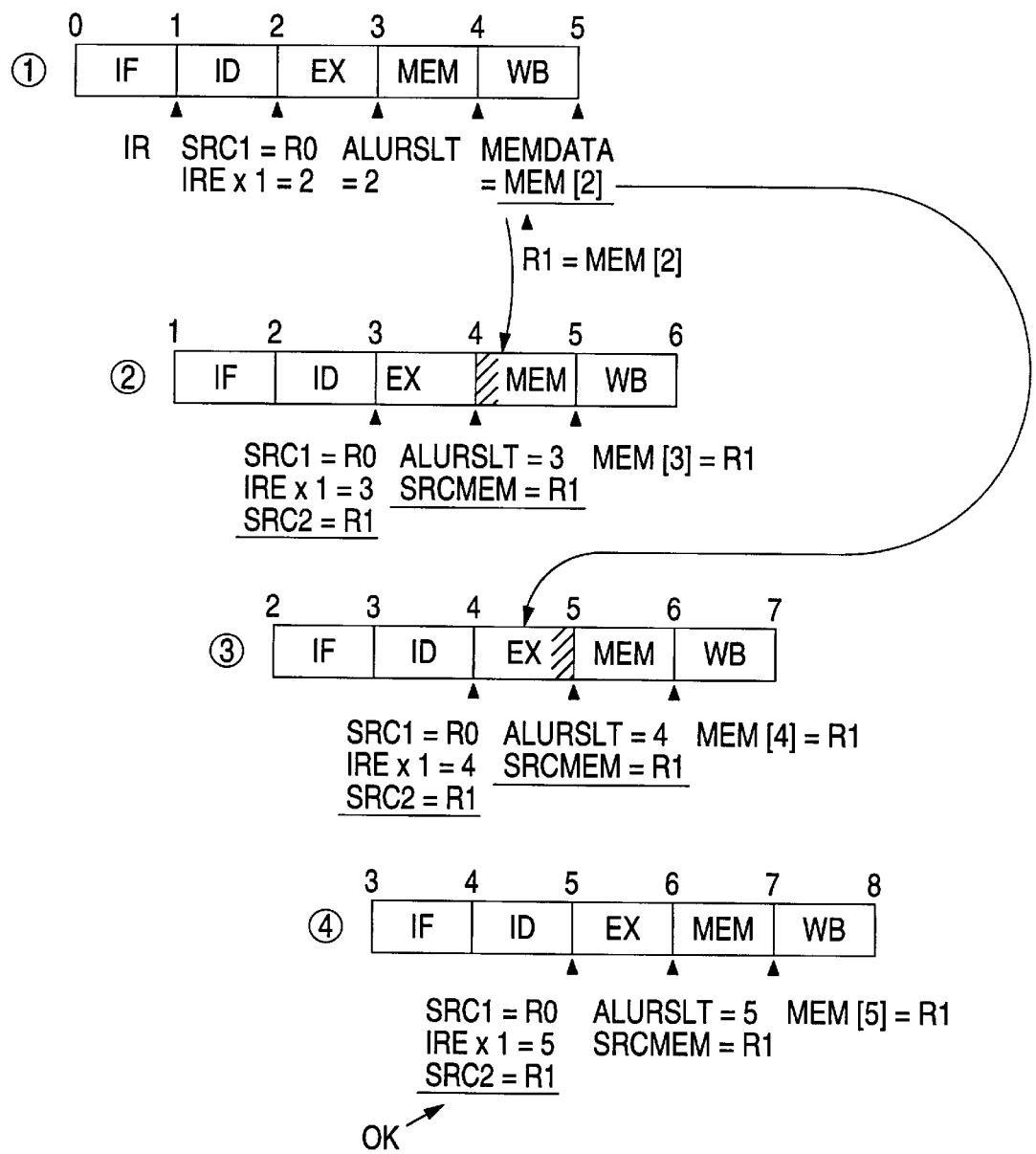
FIG. 18 is an illustration for explaining the operation of the programmable controller of the present invention.

As previously described, if the general-purpose register which requires the instruction currently being decoded is updated by the immediately preceding LOAD instruction or the LOAD instruction next but one before the current instruction, it is necessary to suspend the execution of the instruction currently being decoded until the updated value is written into the general-purpose register. However, if that instruction currently being decoded is a STORE instruction for storing the value of the general-purpose register to be updated by the LOAD instruction into the data memory, it is not necessary to suspend the execution of that instruction. With reference to FIG. 18, the operation of the circuit carried out when the STORE instruction for storing the value of the general-purpose register updated by the LOAD instruction into the data memory is executed after the LOAD instruction will be described.

The data acquired according to the first LOAD instruction (LOADWRZ R0 R1 0x0002) are supplied to MEMDATA of the pipeline register MEM/WB 196 at time 4. In order to write the data stored in the MEMDATA into the data memory 198 according to the second STORE instruction, it is necessary to set the value to be written on the data bus of the data memory 198 by a certain time between time 4 to time 5.

If a value is written into a certain general-purpose register according to the first LOAD instruction, and if the thus written value is written into the data memory 198 according to the immediately following STORE instruction, it is possible to acquire the data, which are to be written in the MEM stage according to the second STORE instruction, from the MEMDATA of the pipeline register MEM/WB 196, because the data are not modified at all. If the value of the WTREG of the pipeline register EX/MEM 188 and the value of the WTREG of the pipeline register MEM/WB 196 are equal to each other, and if the data of the MEM of the pipeline register MEM/WB 196 show the LOAD instruction, the value stored in the MEMDATA of the pipeline register MEM/WB 196 is written into the data memory 198. However, if this is not the case, data of SRCMEM of the pipeline register (i.e., the original data moved over the pipeline) are written into the data memory. With this arrangement, if the STORE instruction for storing the value of the general-purpose register updated by the LOAD instruction into the data memory appears immediately after the LOAD instruction, it is possible to write a correct value into the data memory 198 without suspending the execution of the STORE instruction. Further, in order to cope with the case where the general-purpose register to which a value is written according to the STORE instruction is updated by the LOAD instruction next but one before the current instruction, the value stored in the MEMDATA of the pipeline register MEM/WB 196 is written into the data memory 198, provided that the data of the IREX 2 of the pipeline register ID/EX 186 and the data of the WTREG of the pipeline register MEM/WB 196 are equal to each other, and that the data of the MEM of the pipeline register MEM/WB 196 designate the LOAD instruction. If this is not the case, all that need to be done is to write the data of the SRC 2 of the pipeline register ID/EX 186 (i.e., the original data moved over the pipeline) into the data memory 198.

Figure 19:
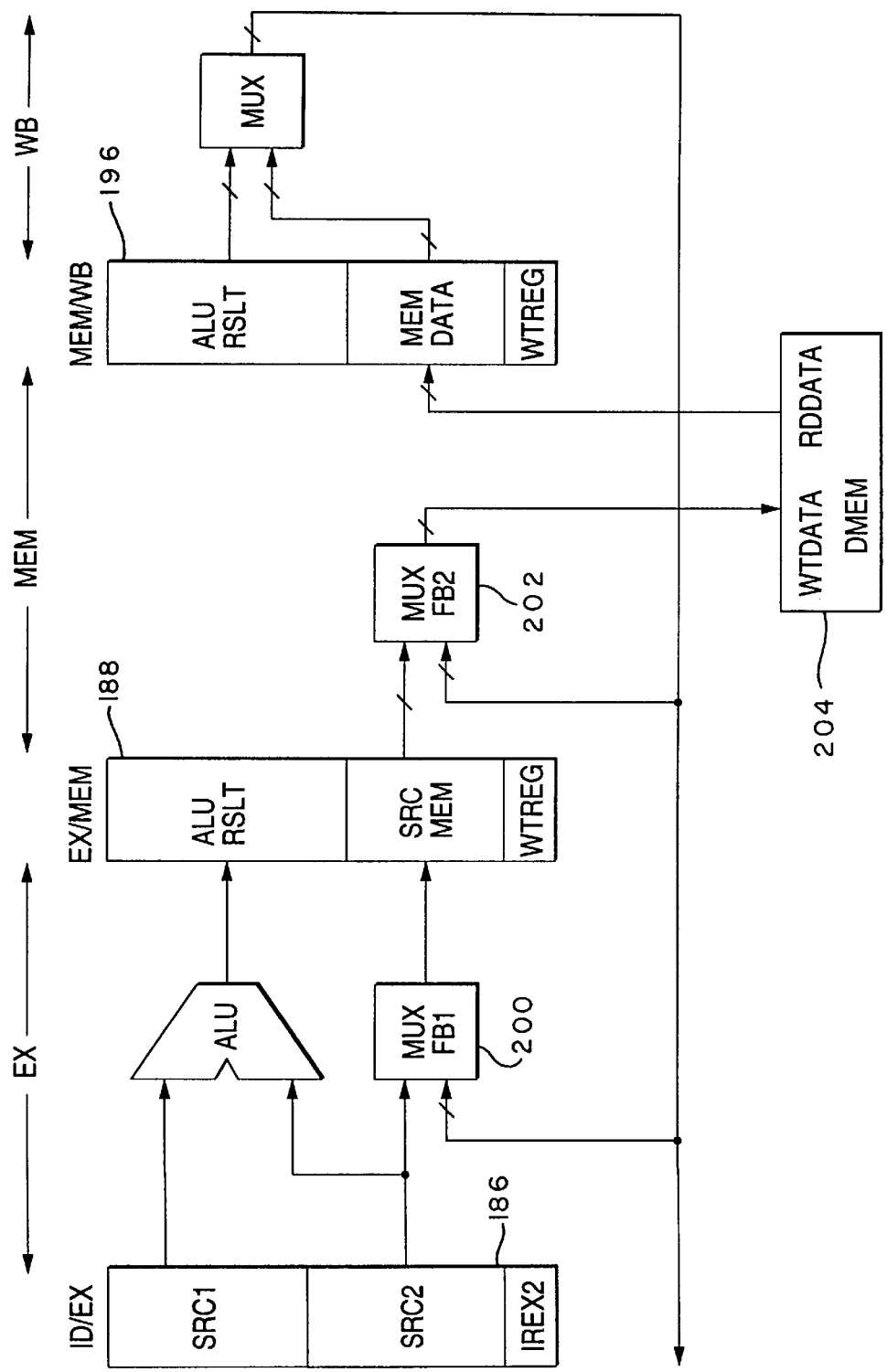
FIG. 19 is a block diagram showing yet another embodiment of the programmable controller of the present invention.

With reference to FIG. 19, one embodiment of the programmable controller having the above described function will be described. Only the portions pertinent to the present invention will be shown in the drawing. As shown in the drawing, data selecting blocks MUXFB1 200 and MUXFB2 202 are provided in the EX and MEM stages. The data selecting blocks MUXFB1 200 and MUXFB2 202 feed back the data, which are output from the WB stage and are stored in the general-purpose register, to the EX and the MEM stages, respectively. The data selecting block MUXFB1 200 receives a value output from the SRC 2 of the pipeline register ID/EX 186 and a value output from the MEM/WB 196 (ALURSLT or MEMDATA) pipeline register, and selectively outputs either of them to the SRCMEM of the pipeline resistor EX/MEM 188. The data selecting block MUXFB2 202 receives a value output from the SRCMEM of the pipeline register EX/MEM 188 and a value output from the MEM/WB (ALURSLT or MEMDATA) pipeline register 196, and selectively outputs either of them to the data memory DMEM 204.

Figure 21:
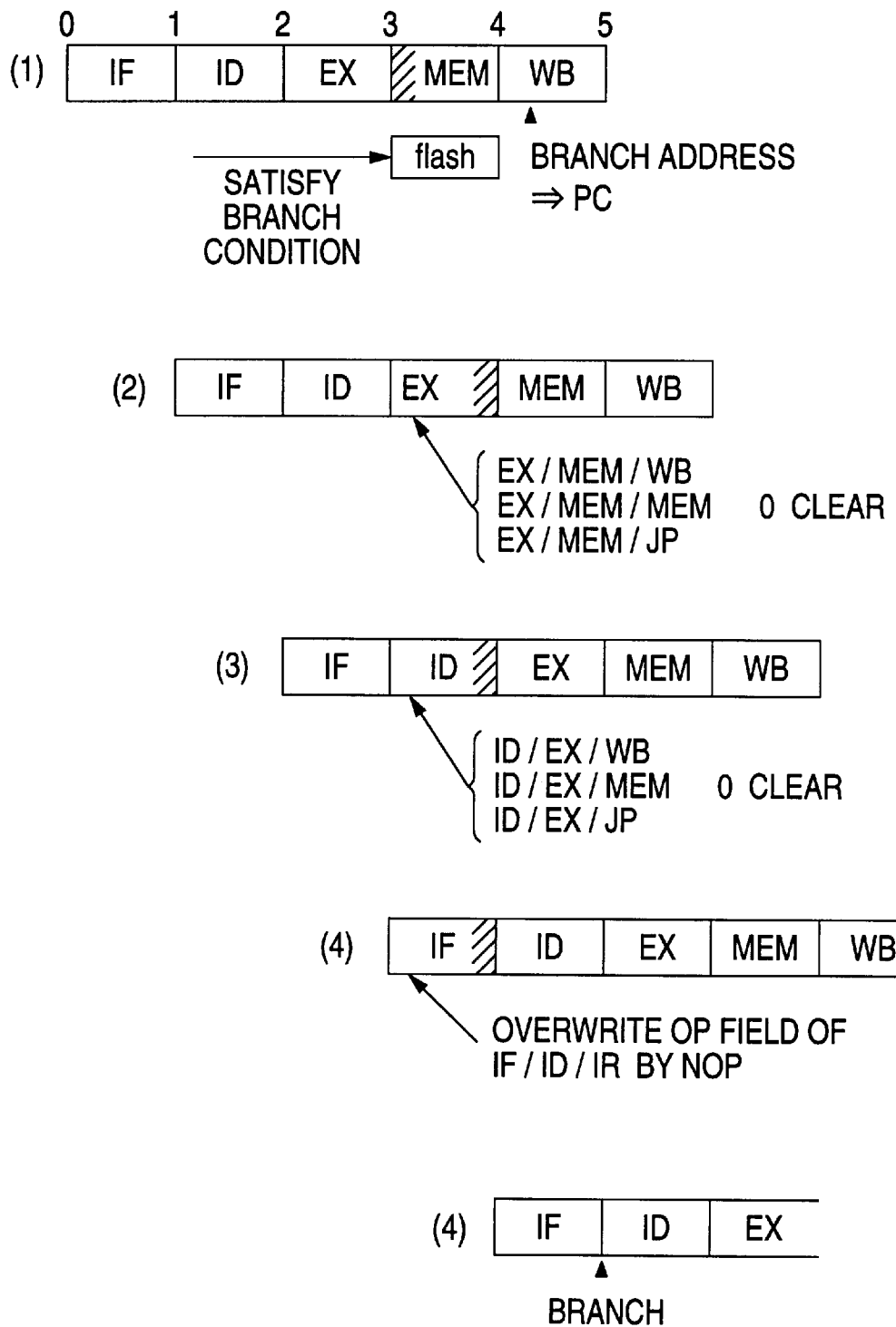
FIG. 21 is an illustration for explaining the operation programmable controller of the present invention.

The configuration of a circuit which branches the operation in the WB stage will be described. The operation of that circuit is shown in FIGS. 20 and 21, and an embodiment of that circuit is shown in a block diagram in FIG. 22. If branch conditions are satisfied, and if a branching operation is executed, the circuit shown in FIG. 22 operates in such a manner as will be described below.

As shown in FIG. 20, an instruction is first fetched from the instruction register IR of the pipeline register IF/ID 210 at time 1. The address of that instruction is stored in a PC stage of the pipeline register IF/ID 210. The value of the general-purpose register required to determine the branch condition is read in the following ID stage. The thus read value is stored in the SRC 1 and SRC 2 of the pipeline register ID/EX 212. The value of the PC of the pipeline register IF/ID 210 is stored in the PC stage of the pipeline register ID/EX 212. In the following EX stage, the two arguments are compared with each other using the ALU 214. A result of that comparison is stored in EQ, GT, and LT of the pipeline register EX/MEM 216. In the EX stage, a target address is calculated using an ADDER 218 differing from the ALU 214, and the thus obtained result is stored in the PC of the pipeline register EX/MEM 216. In the following MEM stage, it is determined whether or not the branch conditions are satisfied, from the comparison result and the type of branch instruction obtained in the EX stage. On the basis of a result of the determination, the execution control block HDU 220 disposed in the MEM stage produces various types of control signal. The value of the PC of the pipeline register EX/MEM 216 is stored in the PC stage of the pipeline register MEM/WB 222. If the branch conditions have been satisfied, the value of the program counter PC is updated with a value stored in the target address in the final WB stage.

On the other hand, if the branch condition is not satisfied, the following instruction is directly executed, which presents no problems. However, if the branch condition is satisfied, it is necessary to suspend the execution of the instruction taken in the pipeline before the instruction at the target address is fetched. In FIG. 21, if an instruction (1) is a branch instruction, and if branch conditions of the branch instruction (1) is satisfied, the address of the target branch is written into the program counter PC 224. The instruction is fetched on the basis of that address (i.e., a branching operation is executed) at time 5. Although instructions (2) to (4) have already been taken into the pipeline, these instructions are intended to be executed only when the branch condition is not satisfied. Therefore, if the branch condition is satisfied, these instructions must not be executed. To prevent the instructions from being executed, if the branch condition is satisfied as a result of the determination of the branch condition in the MEM stage, the execution of the instructions taken in the pipeline are prevented from being executed by use of various types of control signals generated by the execution control block HDU 220. The control signals used in preventing the execution of the instructions are PC-SEL, IF-HZD, ID-HZD, and EX-HZD signals. The PC-SEL signal is a selection signal for determining whether or not the branch address is written into the program counter PC 224. The IF-HZD, ID-HZD, and EX-HZD signals are control signals for rendering the instructions in the respective IF, ID, and EX stages invalid.

Figure 22:
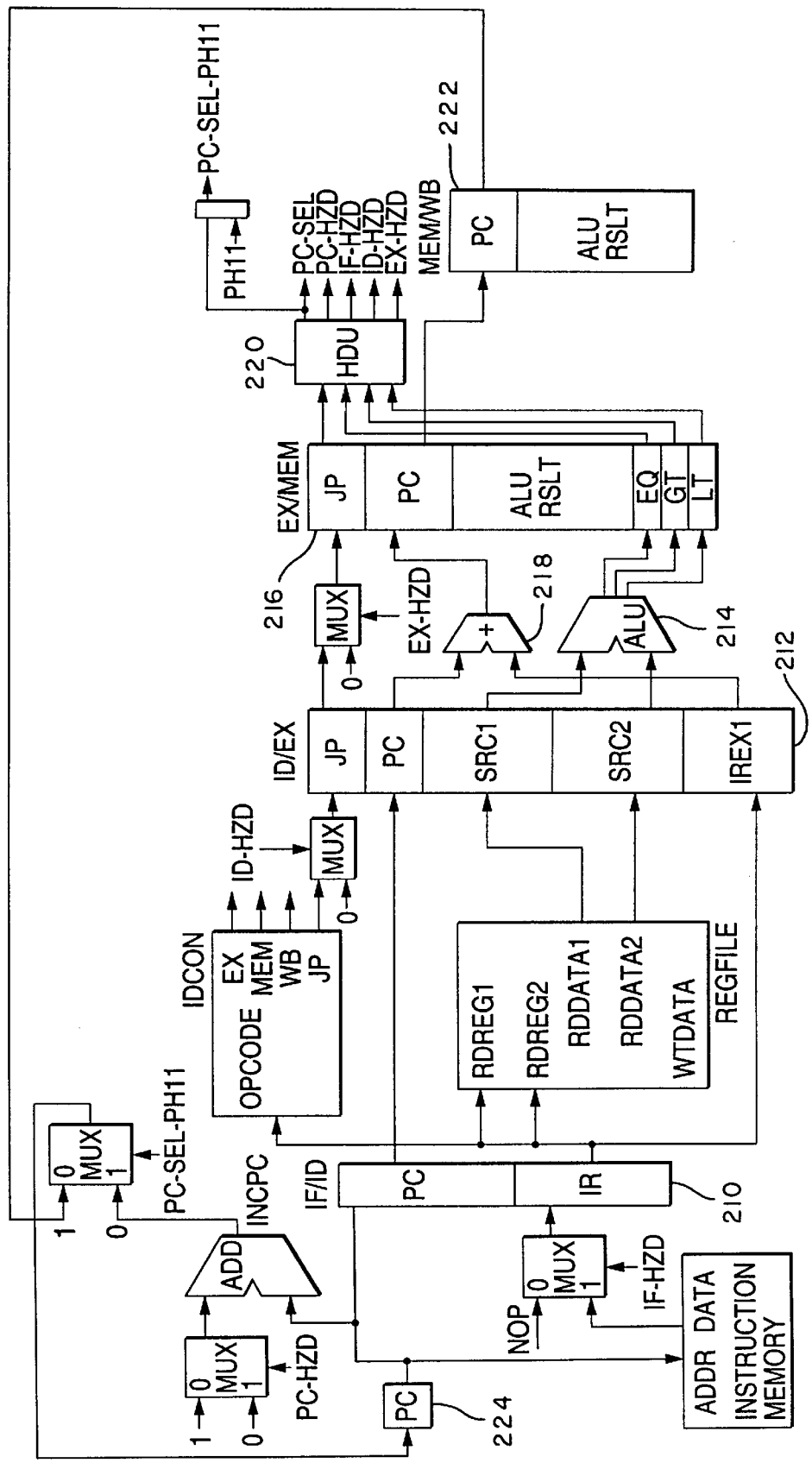
FIG. 22 is a block diagram showing a further embodiment of the programmable controller of the present invention.

If the IF-HZD control signal is one, the fetched instruction having the operation code overwritten with the NOP instruction code is rewritten into the NOP instruction. If the ID-HZD and EX-HZD control signals are one, the control signals decoded in the ID stage are all overwritten with zero, as a result of which the data memory or the general-purpose register are inhibited from being written to. Eventually, the instructions taken in the ID or EX stage become invalid. A circuit shown in FIG. 22 is an example of a circuit for carrying out a branching operation in the WB stage. In this circuit, the PC-SEL signal produced in the MEM stage is latched using the PHI 1 clock signal. The thus latched signal is then output to the program counter PC 224 at the same timing at which a value is output from the PC stage of the pipeline register MEM/WB 222, whereby a branching operation is controlled.

Figure 23:
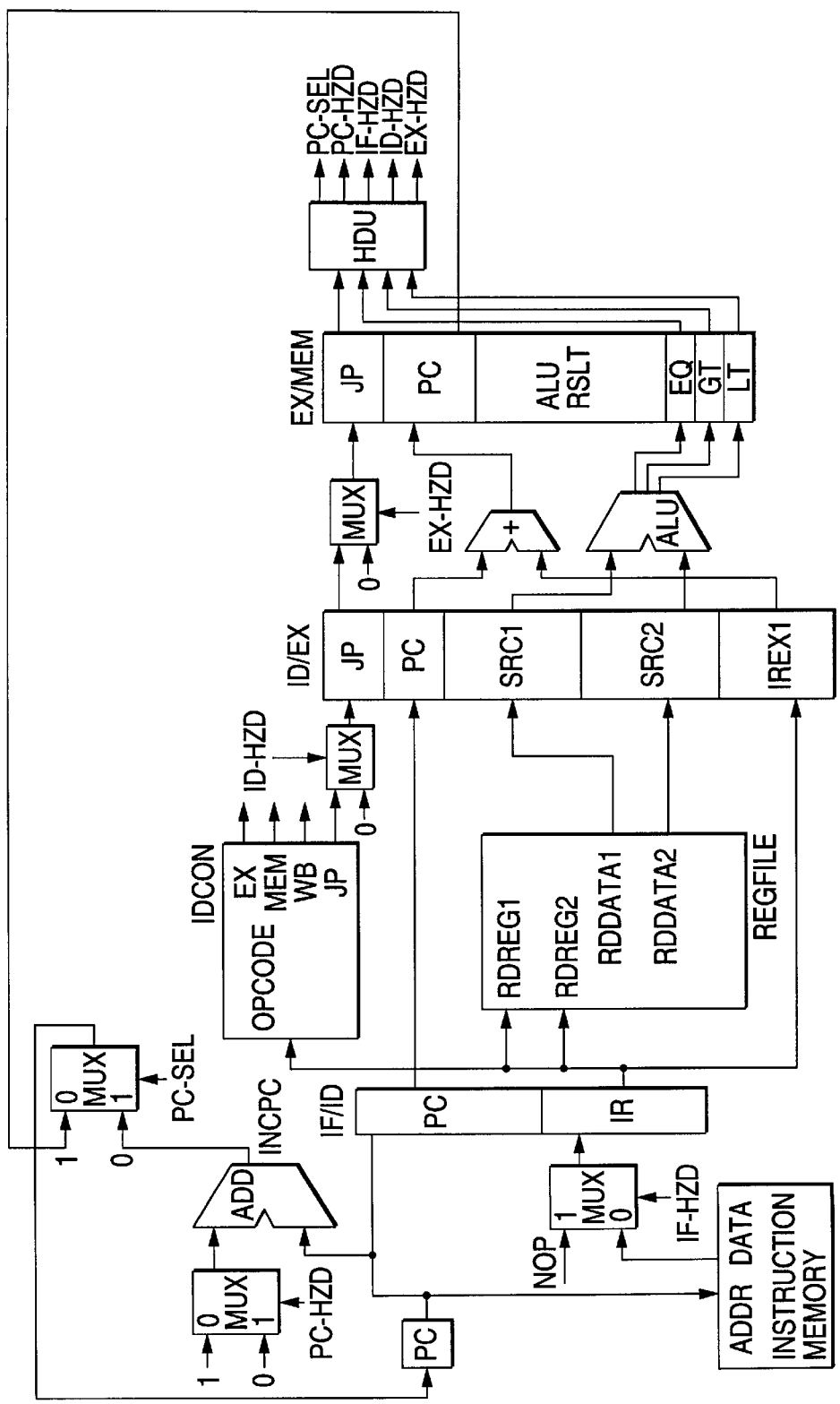
FIG. 23 is a block diagram showing a still further embodiment of the programmable controller of the present invention.

In the circuit shown in FIG. 22, the branching operation is executed in the WB stage. However, since the determination of the branch condition and the calculation of the address of the target branch necessary for the branching operation have already been completed in the EX stage, it is possible to execute the branching operation in the MEM stage so long as there is sufficient time to execute the branching operation. FIG. 23 shows one embodiment of a circuit which executes the branching operation in the MEM stage. In the case of this circuit, there is no need to provide the pipeline register MEM/WB with the PC stage, which in turn results in a smaller circuit size. Further, the circuit shown in FIG. 23 requires one instruction less than the circuit which executes the branching operation in the WB stage, which results in an improved execution rate.

Third Embodiment

Figure 24:
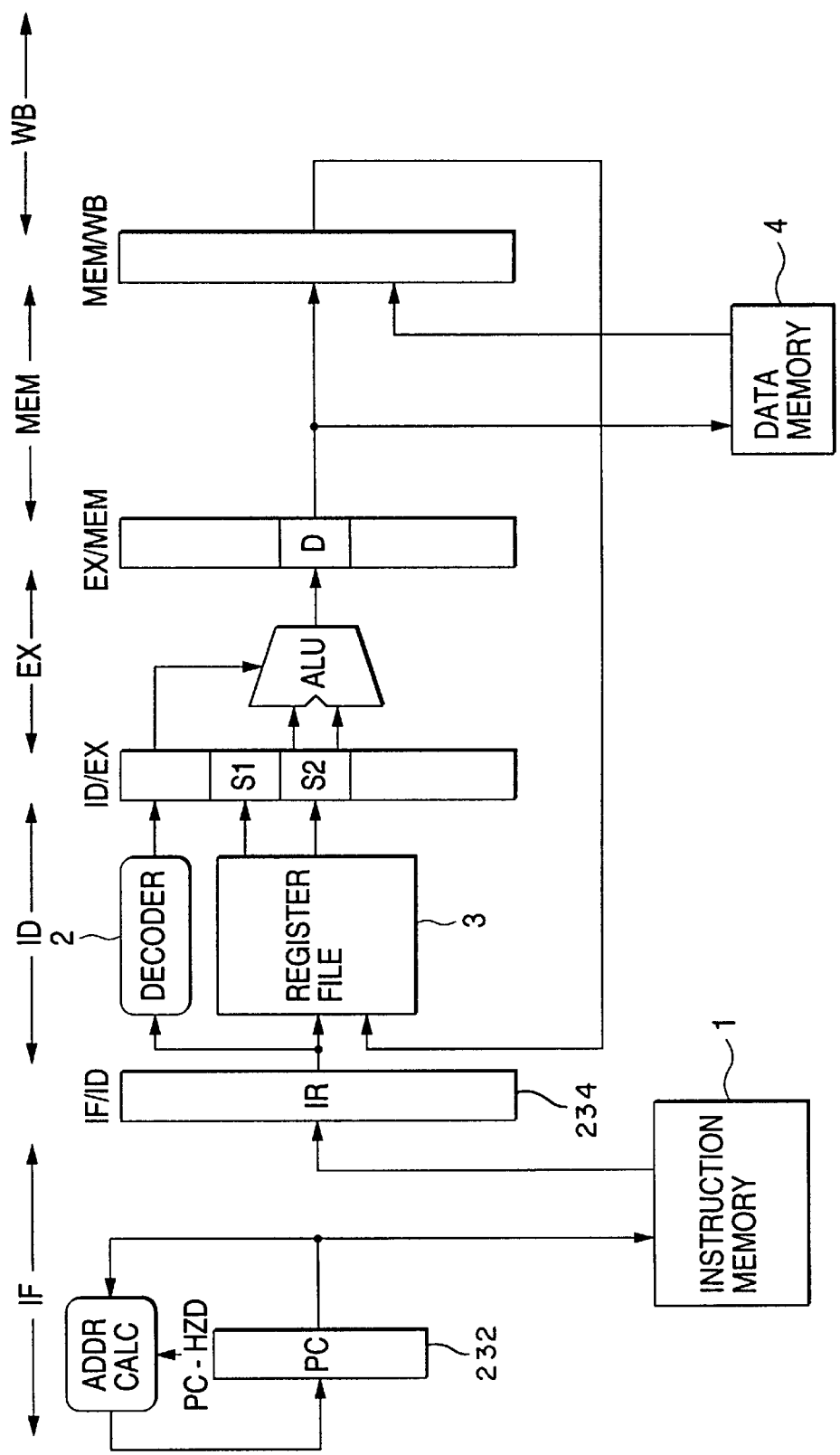
FIG. 24 is a simplified block diagram corresponding to FIG. 4.

For explaining a third embodiment of the present invention, FIG. 24 is used instead of FIG. 4. FIG. 24 is substantially simplified from FIG. 4.

Although the pipeline stage having the five-stage pipeline structure shown in FIG. 24 has the advantage of taking a shorter time period of a pipeline stage, this advantage also means that it must take a shorter time to access the instruction memory 1 or the data memory 4. As a result of the number of pipeline stages being increased to five stages, it becomes necessary to carry out complicated determination of conditions particularly when an access is carried out with respect to the instruction memory 1. The time required to access the instruction memory 1 hinders a reduction in the time required by the pipeline stage. In consequence, it is necessary to reduce the overall performance for the access to the instruction memory 1 or it is necessary to employ a high-speed instruction memory 1, which results in considerably increased costs.

Figure 28:
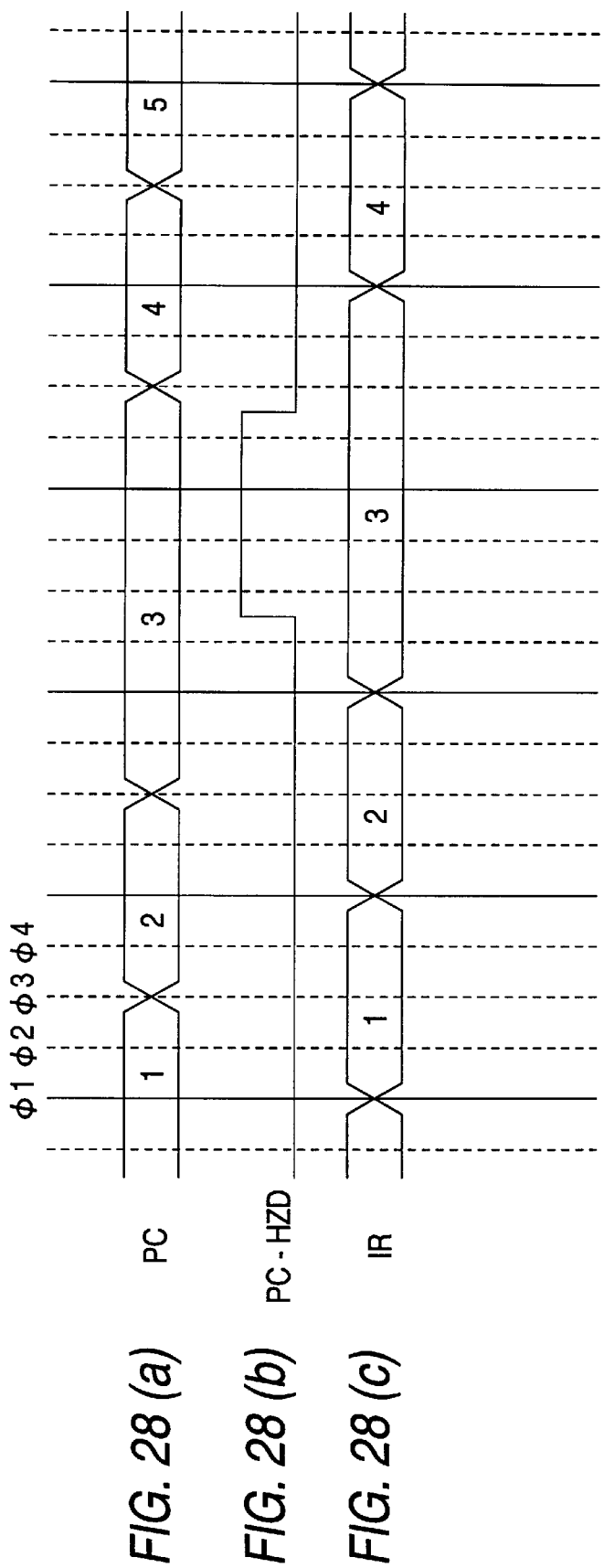
FIGS. 28(a)–28(e) are timing charts which show one example of the timing of the programmable controller as shown in FIG. 24.

FIGS. 28(*a*) to (*c*) illustrate a timing chart which shows timing related to instruction fetch of the programmable controller having the five-stage pipeline structure. For brevity, this programmable controller is based on the assumption that only a control signal PC-HZD affects a program counter control circuit ADDRCALC shown in FIG. 24, and the programmable controller is designed such that one is added to the program counter PC 232 when the control signal PC-HZD is zero, and that the program counter PC 232 is riot updated when the control signal PC-HZD is one. The timing of an instruction, such as a branching instruction for changing the program counter PC 232, is omitted from the timing chart shown in FIG. 26. Further, the programmable controller is based on the assumption that it is operated on a four-phase clock signal having phases $\Phi 1$ to $\Phi 4$, that the pipeline registers starting with IF/ID is actuated by a clock signal $\Phi 1$, and that the program counter PC is actuated by a clock signal $\Phi 3$.

FIGS. 28(*a*) to 28(*c*) show fetching of an instruction from address 1 of the instruction memory 1 in increasing order. FIG. 28(*a*) shows a value of the program counter PC 232, and FIG. 28(*b*) shows a value of the control signal PC-HZD. FIG. 28(*c*) shows a value of the instruction register IR 234, and the instruction register IR 234 sends the result of the instruction fetch to a second stage ID and doubles as the pipeline register IF/ID 234.

In the example shown in FIGS. 28(*a*) to 28(*c*), the control signal PC-HZD becomes one only the time period of one pipeline stage when the program counter PC 232 is three, and the increment of the program counter PC 232 is suspended. An instruction located in the instruction memory 1 at address 3 is fetched twice. Subsequently, an instruction is fetched from address 4, address 5, . . . in order. When the instruction is fetched, the address of the instruction memory 1 is determined by the clock signal $\Phi 3$. The value of that address of the memory must be output until the arrival of the next clock signal $\Phi 1$. In other words, access time from the determination of the address of the instruction memory 1 to the reading of the contents of the instruction memory 1 must be shorter than the time between the clock signals $\Phi 3$ to $\Phi 1$. If optimization of the pipeline structure proceeds, and if the time required by one pipeline stage becomes shorter, the time between the clock signals $\Phi 3$ to $\Phi 1$ becomes smaller than the access time of the instruction memory 1 that has been taken until now. Therefore, it becomes necessary to use higher-speed and more expensive instruction memory 1.

If the program counter PC 232 can be actuated by the clock signal $\Phi 2$ that changes at faster timing than the clock signal $\Phi 3$, the above described problem is solved. However, complicated conditions are determined in order to output the control signal PC-HZD for controlling the increment of the program counter PC 232. It is impossible to determine the control signal PC-HZD prior to the arrival of the clock, signal $\Phi 2$. Therefore, it was impossible to actuate the program counter PC on the clock signal $\Phi 2$.

A programmable controller according to third embodiment of the present invention will be described with reference to FIGS. 24 through 27. Only the characteristic portions of the present invention are illustrated in the drawings. The other portions are the same as those shown in FIG. 24, and, therefore, detailed explanations of them will be omitted here.

Figure 25:
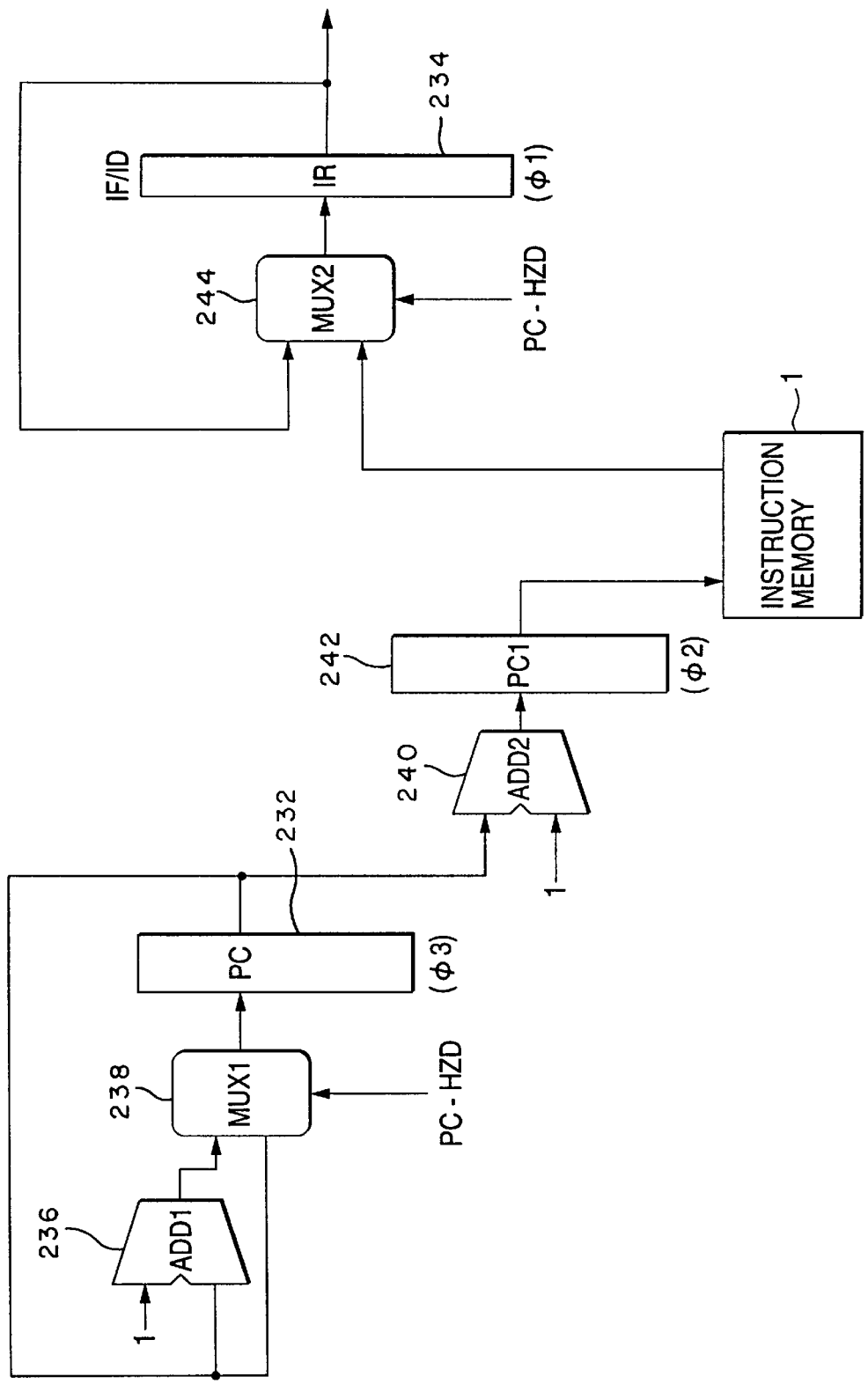
FIG. 25 is a block diagram of a programmable controller according to third embodiment of the present invention.

FIG. 25 is a block diagram showing only a first stage designated by IF. In the drawing, ADD1 236 is an adder for adding one to the value of a program counter PC 232 actuated by a clock signal $\Phi 3$ (i.e., for incrementing the program counter by one). MUX1 238 designates a multiplexer which is controlled by a control signal PC-HZD for suspending the increment of the program counter PC 232 and switches a value to be set to the program counter PC 232 to either an output from the adder ADD1 236 or the value of the program counter PC 232. ADD2 240 is an adder for adding one to the output of the program counter PC 232 (i.e., for incrementing the program counter by one). PC1 242 is a register which is actuated by a clock signal $\Phi 2$ faster than a clock signal $\Phi 3$ for actuating the program counter 232 and holds the output from the adder ADD2 240.

Reference numeral 1 designates instruction memory for outputting an instruction stored in the address indicated by the register PC1 242. MUX2 244 designates a multiplexer which is controlled by a control signal PC-HZD and switches the value to be stored in the instruction register IR 234 to either an output of the instruction memory 1 or the value stored in the instruction register IR 234. When the control signal PC-HZD is zero, the output of the instruction memory 1 is stored in the instruction register IR 234. When the control signal PC-HZD is one, the value stored in the instruction register IR 234 is set to the instruction register IR 234.

In other words contrasted with the programmable controller shown in FIG. 24, the programmable controller shown in FIG. 25 is provided with the register PC1 242 that has the same data width as the program counter PC 232 and is actuated by the clock signal N2. The value obtained by adding one to the value of the program counter PC 232 is latched irrespective of the value of the control signal PC-HZD. An instruction is fetched using this value as the address of the instruction memory 1 at which the instruction to be read is stored. The instruction register 234 is designed so as not to fetch the value of the instruction memory 1 but to fetch the value of the instruction register 234 itself when the control signal PC-HZD is one.

Figure 26:
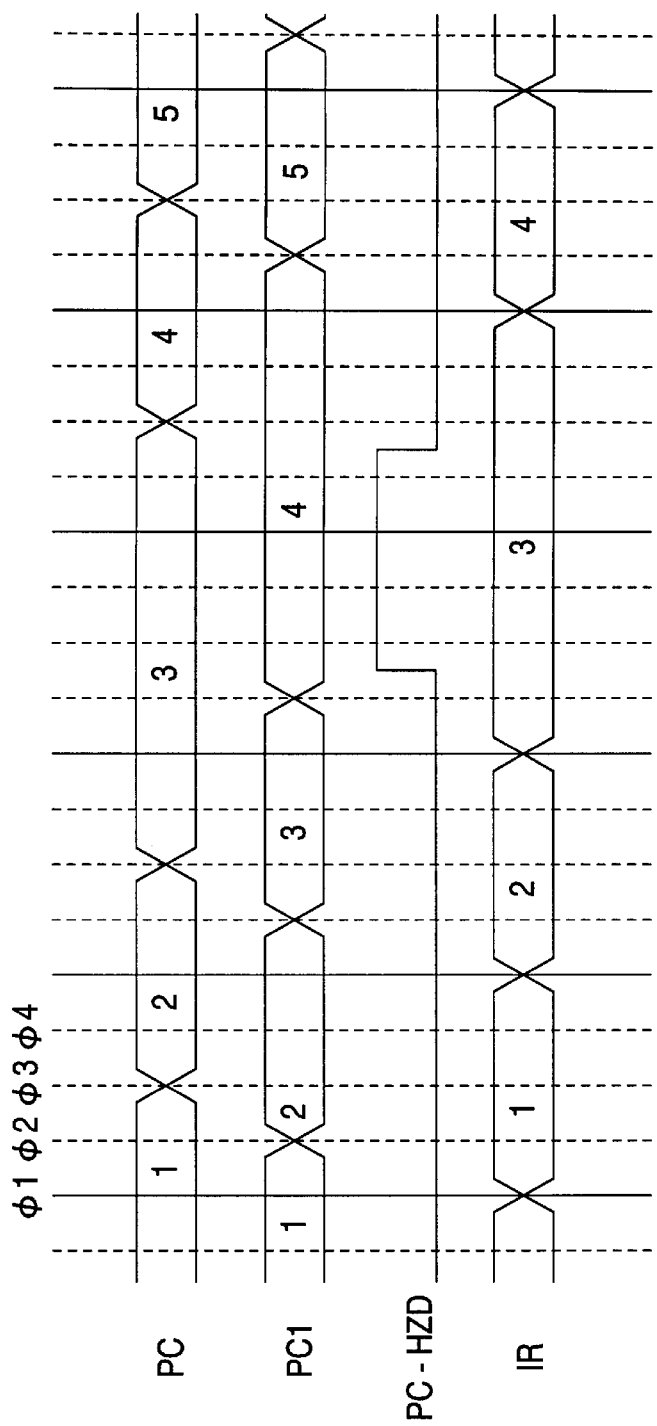
FIGS. 26(a)–26(d) are timing charts which show the timing of the programmable controller according to third embodiment of the present invention.

FIGS. 26(*a*)–26(*d*) illustrate a timing chart which shows timing of instruction fetch of the programmable controller shown in FIG. 25. The value obtained by adding one to the value of the program counter PC 232 which is updated by the clock signal $\Phi 3$, shown in FIG. 26(*a*), is latched into the register PC1 242 which is actuated by the clock signal $\Phi 2$ shown in FIG. 26(*b*). The instruction register IR 234 shown in FIG. 26(*d*) fetches the contents of the instruction memory 1 using the value retained in the register PC1 242 as the address. When the value of the control signal PC-HZD shown in FIG. 26(*c*) is one, the value of the instruction register itself is fetched instead of the value of the instruction memory 1.

By virtue of the register PC1 242 shown in FIG. 25, the address of the instruction memory 1 can be determined earlier than the program counter PC 232, and it becomes possible to use the instruction memory 1 which takes longer access time. In addition, if the control signal PC-HZD for suspending the increment of the program counter PC 232 is a signal for suspending the increment of the program counter (i.e., the signal is one), the value read from the instruction memory 1 is not loaded into the instruction register IR 234 which fetches the instruction. Instead, the value read from the instruction memory 1 is loaded into the instruction memory 1 itself. Even when the instruction for suspending the increment of the program counter PC 232 is executed, it becomes possible to use memory that takes much longer access time as the instruction memory 1.

If only the instruction, which increments the program counter PC 232 by one or retains a value just as it is, is executed, the programmable controller operates according to specifications by means of only the circuit configuration shown in FIG. 25. However, in addition to such an instruction, the programmable controller carries out instructions such as conditional branch and unconditional branch instructions for updating the program counter PC 232. Further, there is a differential instruction particularly to the programmable controller that reads and writes a value from and into bit memory (not shown) which shares the address bus with the instruction memory 1. The initial value of the program counter PC 232 is set from outside when the programmable controller is in suspend mode, and the fetching of contents of the instruction memory 1 is started from the thus set address when the programmable controller starts up. Like the programmable controller shown in FIG. 25, if the value obtained by adding one to the value of the program counter PC 232 is used as the address of the instruction memory 1, it becomes impossible to fetch an instruction from the address set by the program counter while the programmable controller is in suspend mode.

Figure 27:
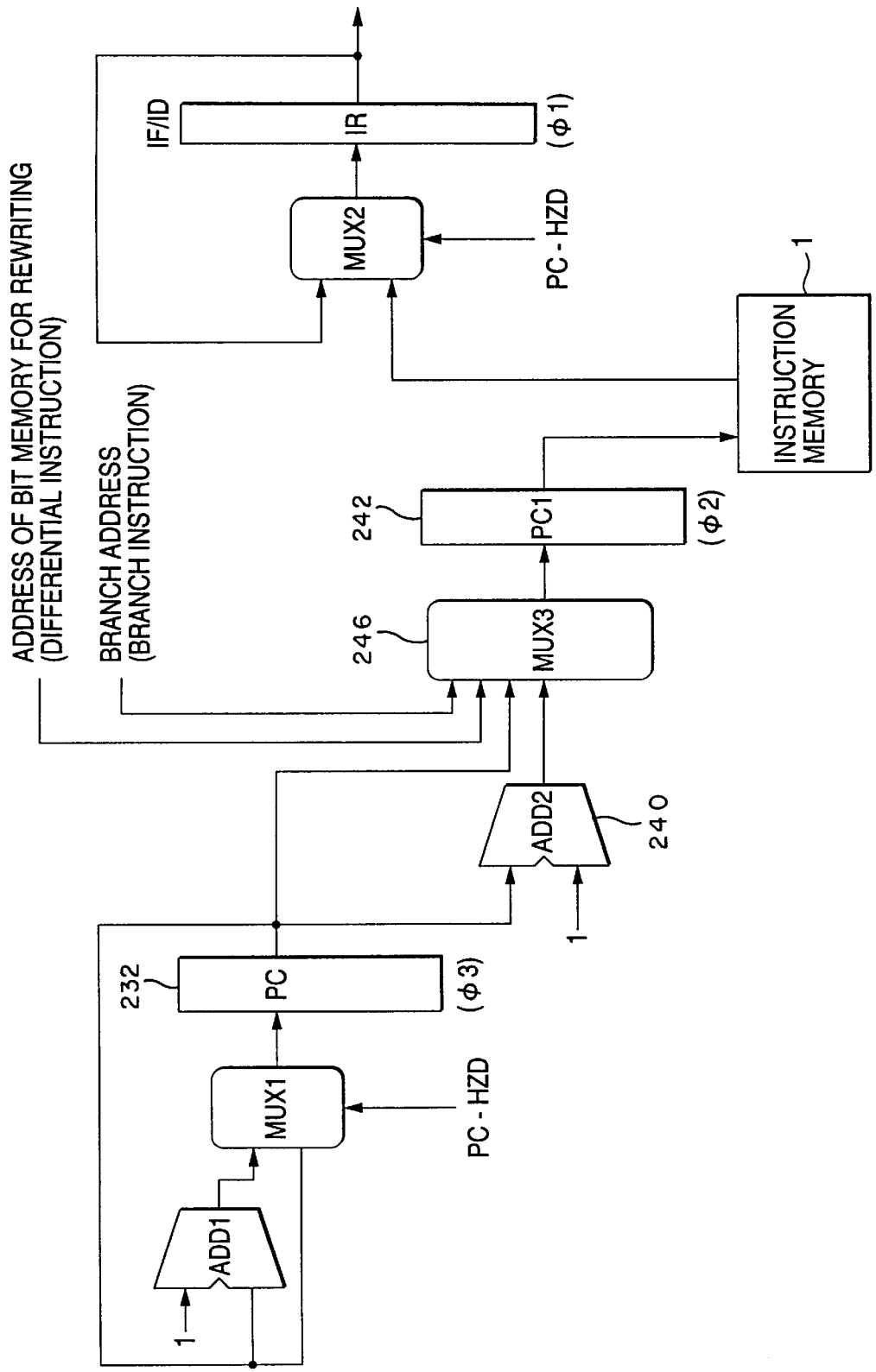
FIG. 27 is a block diagram of a programmable controller according to another embodiment of the present invention.

FIG. 27 is a block diagram of a programmable controller according to one embodiment of the present invention which solves the previously described problem. Contrasted with the programmable controller shown in FIG. 25, the programmable controller shown in FIG. 27 is provided with a multiplexer MUX3 246 which switches the value to be stored in the register PC1 242 to any one of the value of the program counter PC 232, the output from the adder ADD2 240, and the address of a target branch or the address of bit memory for rewriting purposes output from the pipeline register in the following stage. The value of the program counter PC 232 is directly latched into the register PC1 242 immediately after the programmable controller has started up.

An input value other than the value obtained by adding one to the value of the program counter (the output of the adder ADD2 240) is selected as a value to be stored in the register PC1 242, when the branch instruction is executed as a result of the branch conditions being satisfied, when the value is written back into the bit memory by means of the differential instruction, or when a first instruction to be executed immediately after the programmable controller has started up is fetched. Signals used to select these inputs are omitted from FIG. 27.

Fourth Embodiment

Although the pipeline stage with a five-stage pipeline structure has the advantage of taking a shorter period of time, this advantage presents a problem in executing an application instruction which is necessary in view of the specifications of the programmable controller. An arithmetic and logic unit ALU provided in a third stage EX of the pipeline executes arithmetic operations, logic operations, and the calculation of an address for use in accessing the memory. It is impossible for the ALU to perform operations such as particularly complicated multiplication and division of the application instructions within the time period of one pipeline stage.

In general, if an attempt is made to reduce operation time, the size of circuitry for executing operation will become much larger. If an attempt is made to execute multiplication or division included in the specifications within the time period of one pipeline stage in a programmable controller having a five-stage pipeline structure as shown in FIG. 24, an operation block which is too large to be implemented on an LSI will become necessary. Even if an operation block which has a fast algorithm is used in defiance of size problems, it is still impossible to complete operations within the time period of one pipeline stage. To execute such operations, it is necessary to extend the time period of the pipeline stage.

Figure 34:
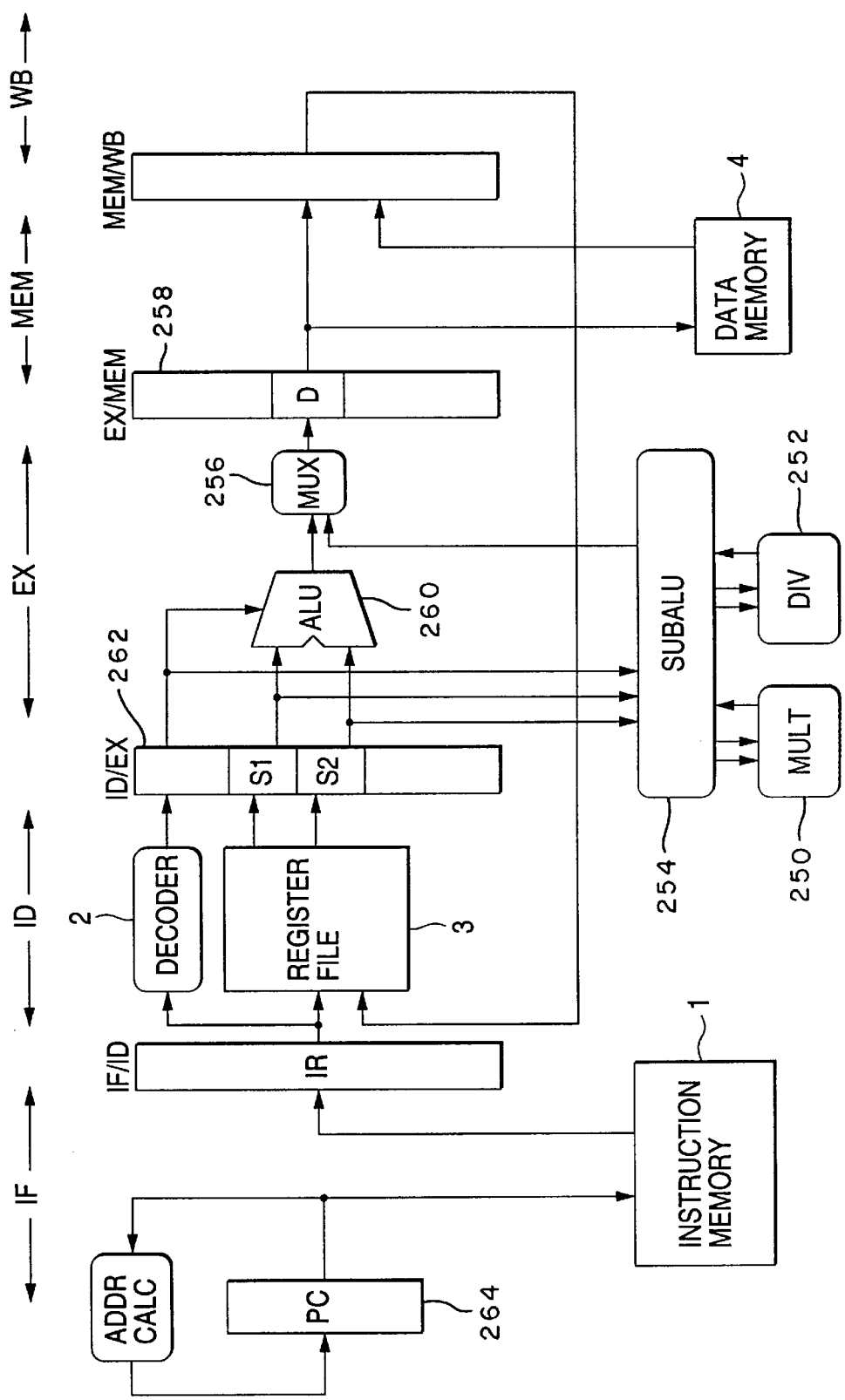
FIG. 34 is a block diagram of fifth embodiment of the schematic configuration of the programmable controller having the five-stage pipeline structure.

A diagrammatic structure of the programmable controller having the five-stage pipeline structure of the present invention will be described with reference to FIG. 34. In contrast to the programmable controller shown in FIG. 24, the programmable controller shown in FIG. 34 has the following additional blocks disposed in a third stage EX of the pipeline structure; namely, operation blocks MULT 250 and DIV 252 specifically designed so as to execute complicated operations, i.e., multiplication and division, among all the application instructions, an operation execution control block SUBALU 254 for controlling the execution of operations of the operation blocks, and a multiplexer MUX 256 which switches an operation result output to the pipeline register EX/MEM 258 to either an output of the arithmetic and logic unit ALU 260 or an output of the operation execution control block SUBALU 254, in addition to the arithmetic and logic unit ALU 260 for executing arithmetic operations, logic operations, and calculation of an address for use in accessing to memory.

The operation execution control block SUBALU 254 is in the same position as the arithmetic and logic unit ALU 260 in terms of the execution of a pipeline. As shown in the drawing, the operation execution control block SUBALU 254 receives arguments S1, S2 and a control signal (a signal decoded by a decoder 2) necessary for operations from the pipeline register ID/EX 262. The operation execution control block SUBALU 254 also outputs necessary data to the operation block MULT 250 or DIV 252. The result of the operation is delivered to the pipeline register EX/MEM 258 via the multiplexer MUX 256. These operations are not completed within the time period of one pipeline stage, and hence the operation execution control block SUBALU 254 executes control operations such as; (1) suspension of the increment of the program counter PC 264 and the operation of the pipeline, and (2) invalidating request signals with regard to the writing of a value back into a general-purpose register (i.e., a register file 3) in a second stage ID and the third stage EX and the writing of data to data memory 4 if the specifically designed operation blocks are in operation. More specific functions will be described with reference to an illustrative embodiment.

Figure 29:
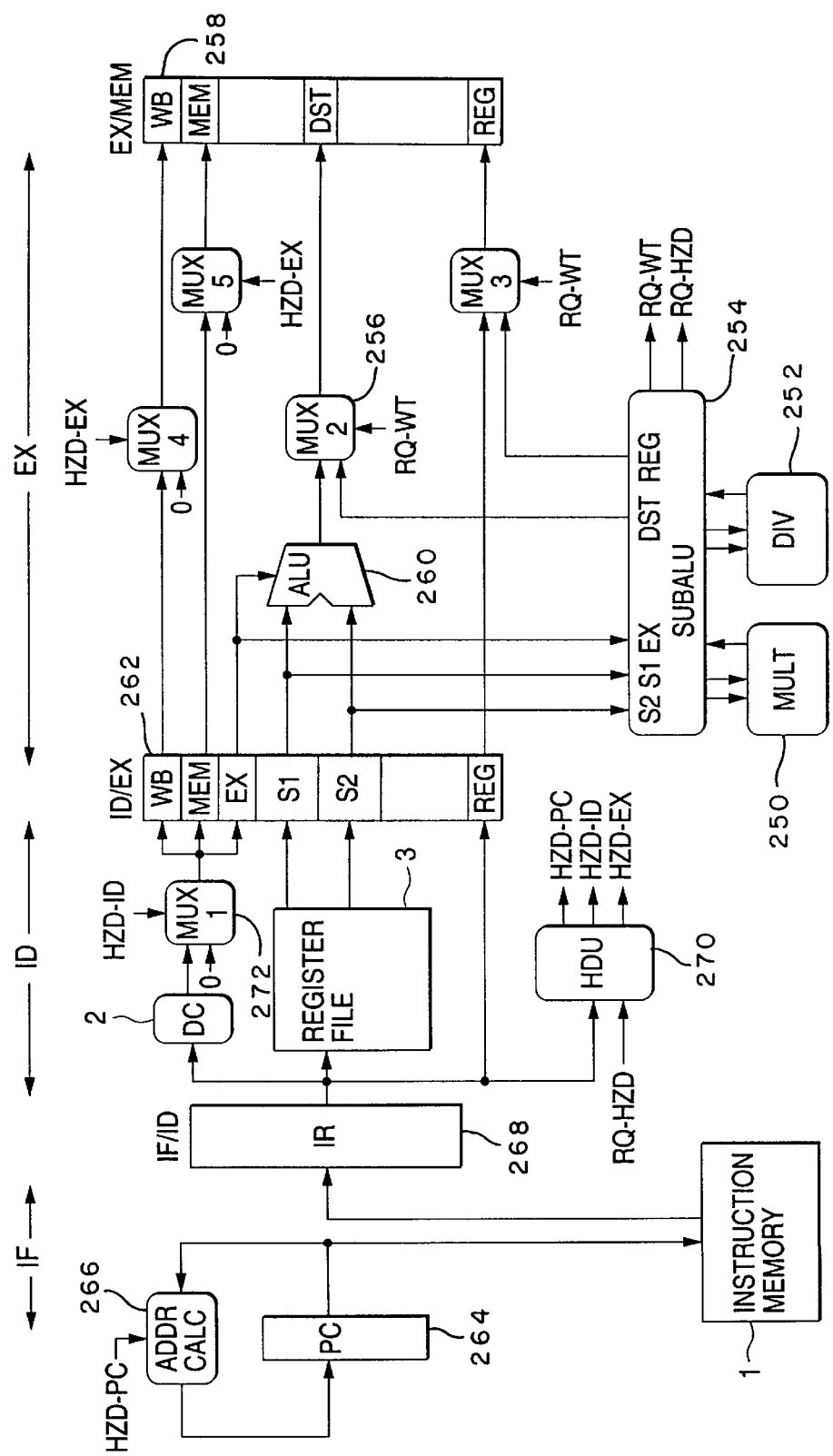
FIG. 29 is a block diagram of a programmable controller having a five-stage pipeline structure according to a fourth embodiment of the present invention.

A programmable controller having a five-stage pipeline structure according to fourth embodiment of the present invention will now be described with reference to FIG. 29 in more detail. FIG. 29 shows only the configurations of a first stage IF, a second stage ID, and a third stage EX among all the five pipeline stages. Further, the portions of the pipeline structure that are irrelevant to the present invention are omitted from the drawing. Moreover, the same elements as those shown in FIG. 34 are assigned the same reference symbols and numerals.

In the first stage IF, the program counter PC 264 counts an address of instruction memory 1 to be fetched for the next time. A program counter control circuit ADDRCALC 266 updates the value stored in the program counter PC 264. In the programmable controller shown in FIG. 29, the configuration of a circuit which processes such as a branch instruction for modifying the program counter PC 264 is omitted from the drawing, and the explanation of that circuit will be omitted. The following descriptions are based on the assumption that the program counter PC 264 is basically incremented one by one, and that the program counter PC 264 retains the original value when a control signal HZD-PC is one.

An instruction register IR 268 which is interposed between the first stage IF and the second stage ID and doubles as a pipeline register IF/ID fetches the instruction from the instruction memory 1 that is stored in the program counter PC 264 and stored at a predetermined address of the instruction memory 1.

In the second stage ID, the contents of the instruction are decoded on the basis of the value of the instruction register IR. The second stage ID is provided with a register file 3 comprising a plurality of general-purpose registers which have a bit width determined by the specifications, a decoder 2 (hereinafter referred to as a decoder DC) which generates various types of control signals i-or use in subsequent pipeline stages by decoding the instruction, and a hazard control unit HDU 270 which outputs a control signal being exceptional in proceeding the pipeline operations. The pipeline register ID/EX 262 disposed between the second stage ID and the third stage EX is provided with S1 and S2 for reading and storing the value of the general-purpose register having its number designated, and REG which shows control signals EX, MEM, and WB to be used in each of the subsequent pipeline stages and a register number to be used in writing a value back into the register.

The control signals EX, MEM, and WB are the collection of required control signals. Assume that a writing operation becomes valid when either the control signal WB for controlling the writing of a value back into the register or the control signal MEM for controlling the writing of data into the data memory is one. A multiplexer MUX1 272 is disposed between the decoder DC 2 and the pipeline register ID/EX 262 in the second stage ID, and this multiplexer MUX1 272 overwrites all of these control signals EX, MEM, and WB with zero when the control signal HZD-ID is one, whereby a writing request signal with respect to the general-purpose register (i.e., the register file 3) or the data memory 4 is invalidated.

In practice, the arithmetic and logic unit ALU 260 executes the operation designated by the control signal EX on the basis of the values of S1 and S2 of the pipeline register ID/EX 262 in the third stage EX that executes operations. The result of that operation is stored in DST of the pipeline register EX/MEM 258.

The programmable controller shown in FIG. 29 is provided with the operation execution control block SUBALU 254 disposed in the third stage EX for executing an instruction whose operations are not completed within the time period of one pipeline stage. This operation execution control block has the same function as the arithmetic and logic unit ALU 260 which receives an input from the pipeline register ID/EX 262 and outputs an operation result to the pipeline register EX/MEM 258 during the course of the pipeline operation. The operation execution control block does not execute practical operations, and is separately provided with a specifically designed operation block (an operation block for executing multiplication 250 and an operation block DIV 252 for carrying out division). The operation execution control block SUBALU 254 provides an argument to the operation blocks, receives an operation result, and outputs the thus received result to the pipeline register EX/MEM 258. These operations are not completed within the time period of one pipeline stage, and hence it is necessary to suspend the operation of the pipeline during the operations. For this reason, the operation execution control block SUBALU 254 outputs a control signal RQ_HZD to the hazard control unit HDU 270.

When the operation result or the number of the register to be rewritten is output to the pipeline register EX/MEM 258, the output to the pipeline register EX/MEM 258 must be switched to either the output of the arithmetic and logic unit ALU 260 or the output of the operation execution control block SUBALU 254. Similarly, the number of the general-purpose register to be rewritten must be switched to either the value of REG of the pipeline register ID/EX 262 or the output of the operation execution control block SUBALU 254. For these reasons, the operation execution control block SUBALU 254 outputs a control signal RQ-WT for switching purposes to multiplexers MUX2 and MUX3. The multiplexer MUX2 switches the result of the operation to be output to the pipeline resister EX/MEM 258, and the thus switched result is delivered to the pipeline register EX/MEM 258 via the multiplexer MUX3. As a result, the number of the general-purpose register to be rewritten is switched.

The control signal MEM or WB does not act at all in the third stage EX, and the control signal is simply transferred from the pipeline register ID/EX 262 to the pipeline register EX/MEM 258. As in the second stage ID, the third stage EX is also provided with multiplexers MUX4 and MUX5, and the control signal HZD-EX to be sent to the multiplexers MUX4 and MUX5 is set to one, which makes it possible to invalidate the control signal. The MUX4 is a multiplexer which invalidates a request for writing a value to the general-purpose register (i.e., the register file 3) by overwriting the control signal WB with zero. The MUX5 is a multiplexer which invalidates a request for writing a value to the data memory 4 by overwriting the control signal MEM with zero.

With reference to a timing chart shown in FIG. 30, the operation of the operation execution control block SUBALU 254 will now be described. The timing chart shown in FIG. 30 illustrates one example in which a multiplication instruction (MULT) is located at address 10 of the instruction memory 1, preceding instructions F1 and F2 are located at addresses 9 and 8 before address 10, and subsequent instructions R1, R2, R3, and R4 are located at address 11 and addresses thereafter.

The programmable controller shown in FIG. 29 is based on the assumption that registers within the circuit are actuated by any one of four-phase clock signals Φ1 to Φ4, and that each pipeline register is actuated by the clock signal Φ1. The drawing shows the instruction register IR 268 that doubles as the pipeline register IF/ID, the program counter PC 264, the control signal HZD-PC, the S1 and EX of the pipeline register ID/EX 262, the state STATE of a state machine provided in the operation execution control block SUBALU 254, an operation end signal DONE of the multiplication block MULT 250, DST and WB of the pipeline register EX/MEM 258, the control signal HZD-EX, and the control signal RQ-WT output from the operation execution control block SUBALU 254.

Figure 30:
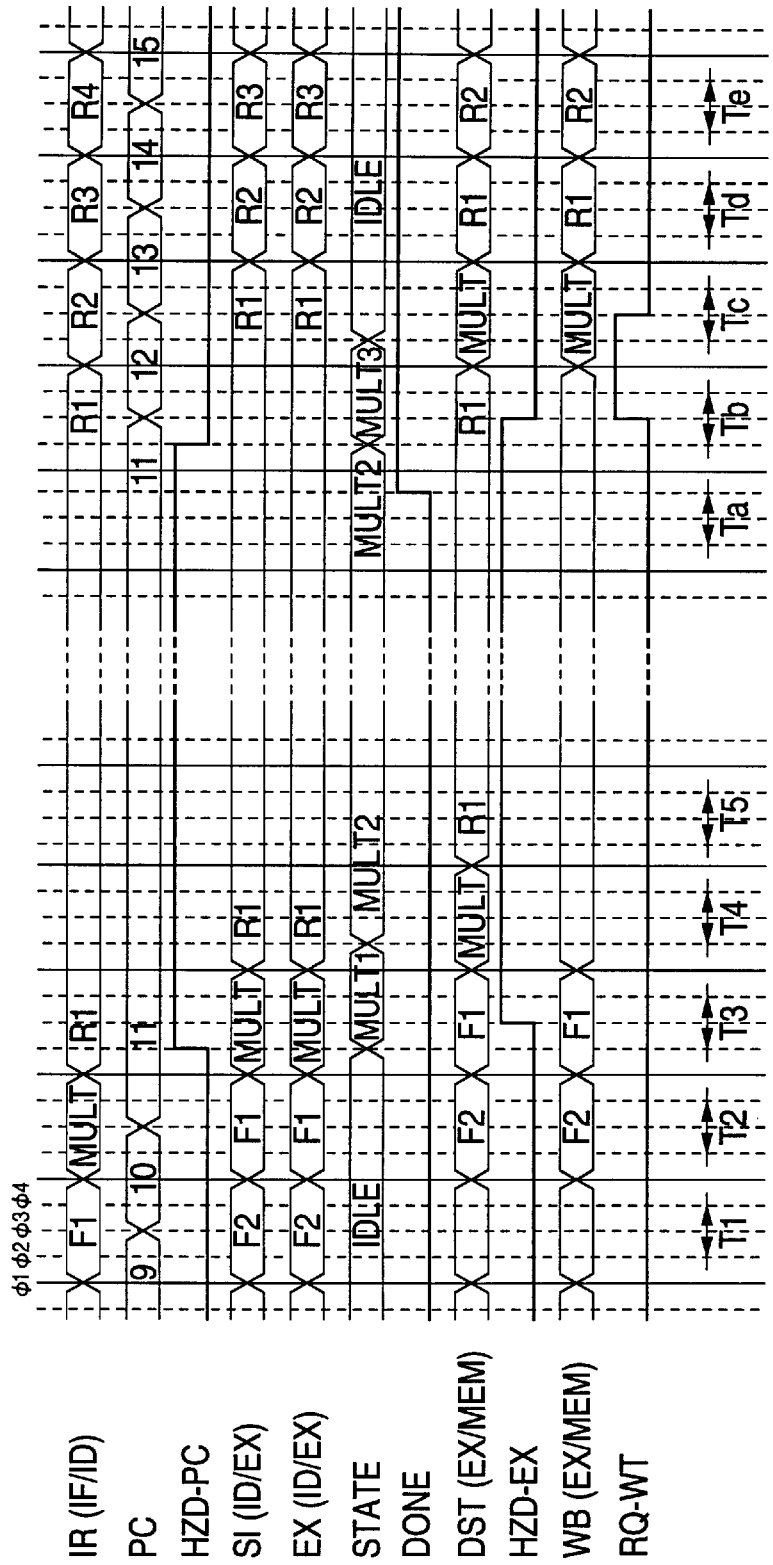
FIG. 30 is a timing chart which shows fourth embodiment of operation timing of the programmable controller having the five-stage pipeline structure.

In the example shown in FIG. 30, one pipeline stage having the clock signal Φ1 for actuating the pipeline register becomes one stage of the pipeline. There are pipeline stages T1 to T5 and pipeline stages Ta to Te which are arranged in time sequence, and a slight time interval is interposed between the pipeline stages T1 to T5 and the pipeline stage Ta to Te. In the pipeline stage T1, an instruction before the multiplication instruction (i.e., a preceding instruction F1) is fetched, and the multiplication instruction is fetched in the pipeline stage T2. The multiplication instruction is introduced into the third stage EX in the pipeline stage T3. The increment of the program counter PC 264 is suspended by the operation execution control block SUBALU 254 that has received the multiplication request from EX of the pipeline register ID/EX 262 and the control signal HZD-PC generated by the hazard control unit HDU 270. The state of the state machine provided within the operation execution control block SUBALU 254 shifts from the initial state IDLE showing that the state machine waits for the operation request signal to MULT1 and, further to MULT2. When the state of the state machine provided within the operation execution control block SUBALU 254 is MULT2, the state machine remains in a wait mode until an operation end signal DONE is sent back from the multiplication block MULT 250. Upon receipt of the operation end signal DONE, the state machine shifts to a state MULT3 and, further to, the original IDLE state showing that the state machine waits for the operation request signal. The operation execution control block SUBALU 254 affords the information on the state of the state machine provided in the SUBALU 254 to the hazard control unit HDU 270, and the hazard control unit HDU 270 updates the control signals HZD-PC and HZD-EX on the basis of the thus received state information.

Figure 31:
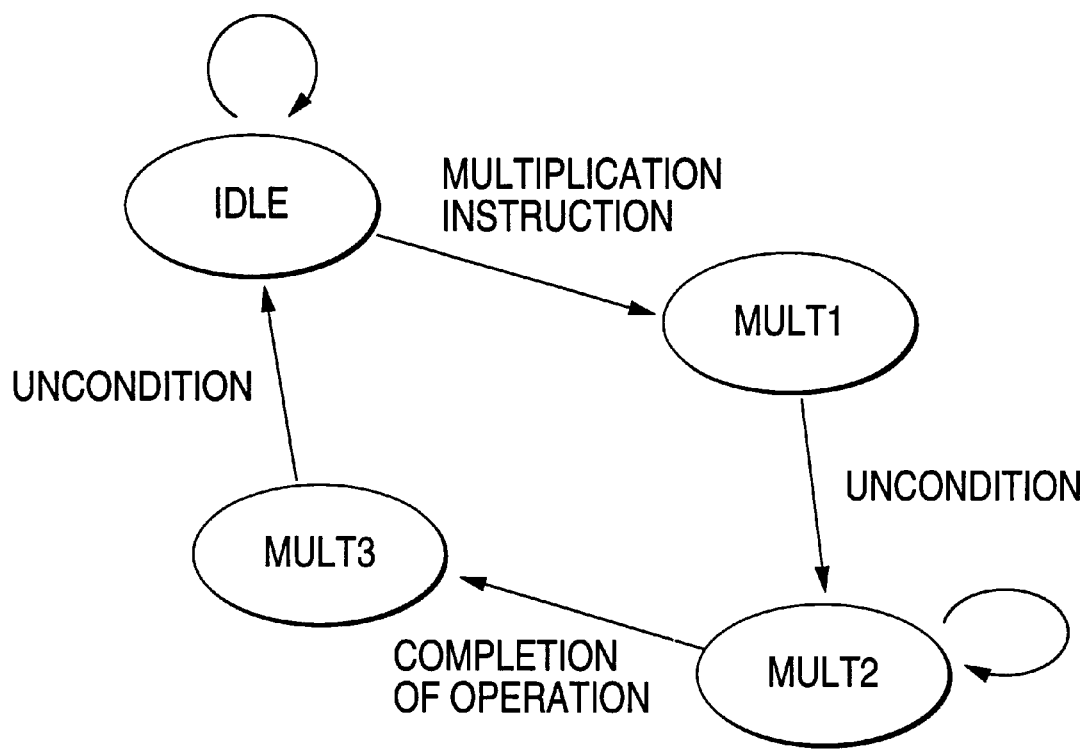
FIG. 31 is a state shift diagram which shows fourth embodiment of shift of the state of a state machine provided in an operation execution control block SUBALU of the programmable controller having the five-stage pipeline structure.

FIG. 31 shows a diagrammatic illustration of the shift of the state of the state machine provided in the operation execution control block SUBALU 254 in the case where the multiplication instruction shown in FIG. 30 is executed. The state machine shifts from the initial state showing that the state machine waits for the operation request signal to the state MULT1 when the multiplication instruction is introduced into the third stage EX of the pipeline. The state machine unconditionally changes from the state. MULT1 to the state MULT2, and the completion of the operations is waited in the state MULT2. The completion of the operations is determined as a result of the output of the operation end signal DONE to the multiplication block MULT 250. If the specifications of the programmable controller are arranged such that the operation block does not send the operation end signal DONE back to the state machine because it takes a constant time to execute the operation, a counter will be provided in the operation execution control block SUBALU 254 as, e.g., time counting means. It is also possible to use the fact that a count value of the counter exceeds a preset value as the conditions for the state shift (i.e., the conditions for determination of the completion of the operation).

Figure 32:
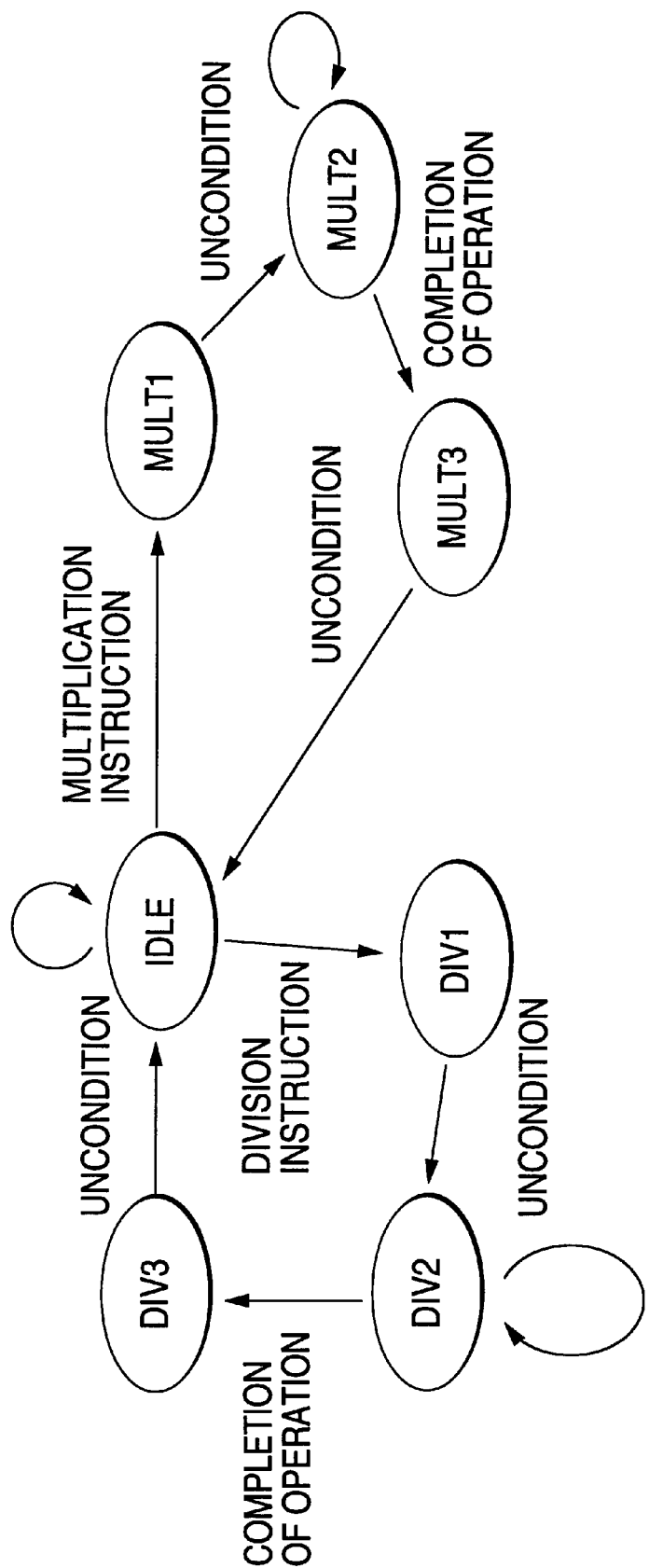
FIG. 32 is a state shift diagram which shows another embodiment of shift of the state of EL state machine provided in operation execution control block SUBALU of the programmable controller having the five-stage pipeline structure.
Figure 33:
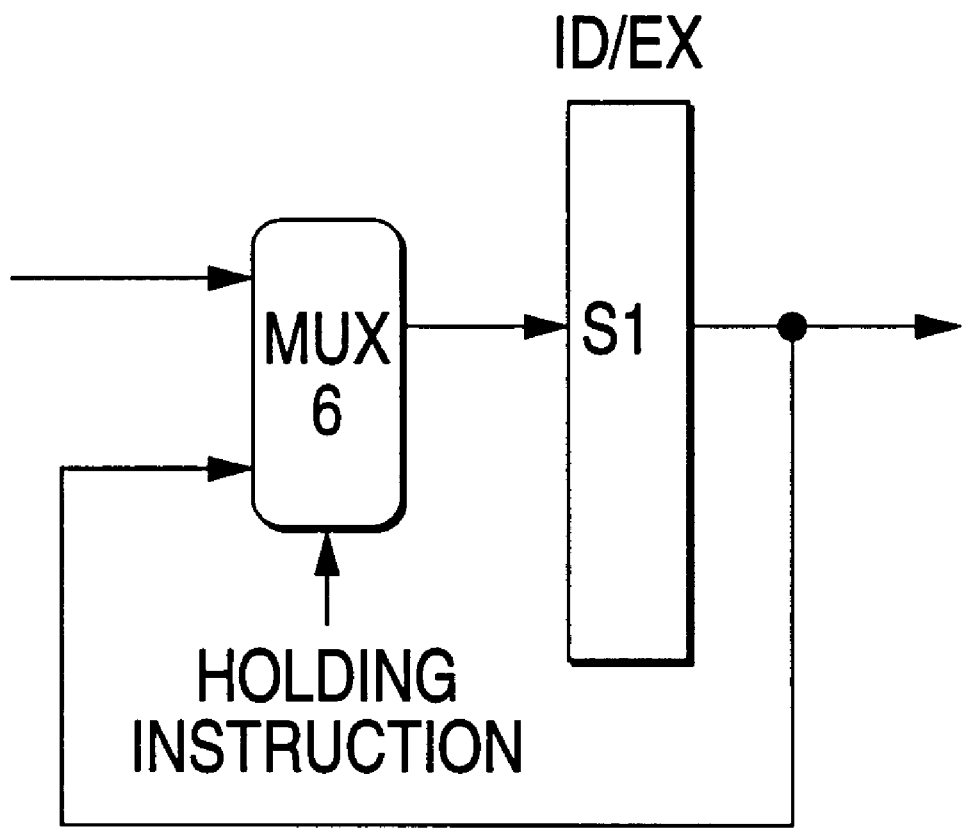
FIG. 33 is a block diagram of a programmable controller having a five-stage pipeline structure according to another embodiment of the present invention.

The timing chart shown in FIG. 30 shows only the case of the multiplication. Like the programmable controller shown in FIG. 29, if a plurality of operation blocks are connected to the operation execution control block SUBALU 254, and if a plurality of types of operations are performed all that is needed to do is to manufacture a state machine capable of shifting from the initial state IDLE for waiting for the operation request signal to the states of a plurality of types of operations (the state of the multiplication or division in FIG. 32). At this time, all that is needed is to select a more convenient method from a method of determining the completion of the operation on the basis of the operation completion signal DONE sent back from each of the operation blocks or a method of determining the completion of the operation on the oasis of the value of the counter (i.e., the time counting means) provided in the operation execution control block SUBALU 254.

Of the instructions executed by the programmable controller, some instructions are subjected to a determination as to whether or not they are executed (the instructions whose operations cannot be completed within the time period of one pipeline stage). In the case of ordinary instructions which are processed by the arithmetic and Logic unit ALU 260, the arithmetic and logic unit ALU 260 performs operations irrespective of the instruction execution conditions. If the instructions are not executed, those instructions are substantially invalidated by invalidating the control signals for writing a value back into the register or writing data to the data memory. The above-described manner in which the operations are performed is intended to minimize disturbances in the flow of the pipeline processing. In the case where the operation execution control block SUBALU 254 unconditionally executes the operation like the ALU 260, wait time until the operation are completed will be wasted if the instruction execution conditions become invalid. If the instruction execution conditions are not satisfied when the instruction for performing operations in the operation execution control block SUBALU 254 is introduced into the third stage EX of the pipeline, the state machine is prevented from shifting from the initial state IDLE to the state in which operations are currently executed, so as to eliminate wasteful lapse of time.

In the case where the operation block supports operations in a plurality of modes (i.e., the operation block copes with operations of a plurality of different types of data width), for example, if one multiplication block multiplies 8-bit data by 8-bit data and also multiplies 16-bit data by 16-bit data, the values of the two registers are directly used as arguments. In the case of the multiplication of 8-bit data, if the high-order 8 bits of each of the two registers are used as an argument, it is necessary set the argument to the low-order 8 bits of the input data if the operation block which actually carries out multiplication is operated in an 8-bit operation mode. It is necessary for the operation execution control block SUBALU 254 to substitute the value of the high-order 8 bits to the low-order 8 bits without directly transferring the 16-bit data to the multiplication block MULT 250.

When the multiplication block MULT 250 is in an 8-bit operation mode, it is necessary for the operation execution control block SUBALU 254 to process data in accordance with the specifications of the operation block, for example, it is necessary to clear an unused bit position of the input data using zero. In some cases, it is necessary to process not only the input data but also an operation result in a similar manner. The operation block should be designed so as to eliminate the necessity of such data processing. However, if the overall system is configured utilizing the past design resources, the above-described processing also becomes necessary.

Of the instructions executed by the programmable controller having the five-stage pipeline structure shown in FIG. 29, some instructions required execution of operations on the basis of the value of one or two registers and the writing of the result of that operations back into one word of the data memory 4 or one general-purpose register (i.e., the register file 3). Contrary to this, of the instructions executed by the operation execution control block SUBALU 254, some instructions may require a plurality of rewriting operations. For example, if 16-bit data is multiplied by 16-bit data, the result becomes 32 bits in length. If the general-purpose register included in the register file 3 has 16 bits wide, it becomes necessary to rewrite the register twice with respect to one instruction. In the timing chart shown in FIG. 30, the general-purpose register is rewritten only once with respect to the multiplication instruction. However, in some instances, the rewriting operation must be carried out several times depending on the data width of operations and the data width of the general-purpose register and the data memory 4, or the like. To cope with such an instruction, the state machine is designed such that the operation execution control block SUBALU 254 holds the information which is received from the pipeline register when operations are requested, and that rewriting operations which do not result from ordinary pipeline operations can be carried out several times.

In the timing chart shown in FIG. 30, a request for multiplication is introduced into the third stage EX. At this time, the following instruction R1 is fetched, and hence an argument of the following instruction R1 is introduced into the pipeline register ID/EX 262 in the next pipeline stage T4. The argument of the multiplication instruction exits in the pipeline register ID/EX 262 only for the time period of one pipeline stage. If the argument must be fixed in the pipeline register ID/EX 262 until the end of the operation according to the specifications of the operation block MULT 250 that actually perform operations, it becomes impossible to correctly carry out operations. With regard to the instruction which requires the transfer of a value to the operation execution control block SUBALU 254 in the pipeline register ID/EX 262, the programmable controller is provided with a multiplexer MUX6 which is arranged so as to retain the value (i.e., the contents of S1) stored in the pipeline register ID/EX 262 if there is a hold request signal. The operation execution control block SUBALU 254 generates the hold request signal so that the multiplexer MUX6 can retain the value. As a result, even if the following instruction is introduced into the pipeline register ID/EX 262, it becomes possible to retain the argument or operation mode of the instruction being currently processed by the operation execution control block SUBALU 254 for as long a period of time as required, whereby it becomes possible to correctly perform operations.

The operation block that carries out multiplication and division is shown in the above described embodiment. However, the operation block is not limited to that disclosed in the embodiment.

Fifth Embodiment

Among the functions necessary for the programmable controller is a bit processing instruction for updating or referring to the value of one bit in one word of data memory and for updating or referring to a plurality of words of the data memory during the course of execution of the instruction. A plurality of memory access cycles become necessary to execute this bit operation instruction. Therefore, it becomes impossible to execute the bit operation instruction if the above-described five-stage pipeline structure is used just as it is.

The programmable controller is also provided with a so-called differential instruction for detecting a rise or fall of an input. Memory for use with the differential instruction becomes necessary to record a value obtained as a result of previous scanning of an input signal. For this reason, a conventional programmable controller which executes an instruction using a three-stage pipeline structure is provided with memory having the same address as the instruction memory and being a one bit wide (Unexamined Japanese Patent Application Nos. Hei-5-189014 and 189015). For example, where an output Y1 is turned on as a result of an input X0 rising from an OFF state to an ON state, it is impossible to detect the rise of the input X0 by checking only whether the current input X0 is in the ON or OFF state. On the basis of the previous input X0 stored in the memory, it is judged that the input X0 has risen only when the previous input X0 is in the OFF state and the current input X0 is in the ON state. If the input X0 is turned on, this fact is stored in the memory. As a result, even if the input X0 is in the ON state at the time of the next scanning operation, it is not judged that, the input X0 has risen. In this way, the differential instruction for detecting the rise and fall of the input signal requires memory for recording the value of the input signal obtained as a result of the previous scanning of the input signal. For this reason, the programmable controller is provided with memory having the same address as the instruction memory and being one bit wide. This method has the advantage of simple management of addresses. The programmable controller having a five-stage pipeline structure that is already developed and is capable of executing a high-speed operation also employs this method. An address bus is shared between the instruction memory and the data memory for use with the differential instruction, whereby the number of signal lines is reduced. However, the use of this configuration results in a pipeline operation being disturbed when the memory for the differential instruction is rewritten. As a result, required instructions are not executed.

Figure 35:
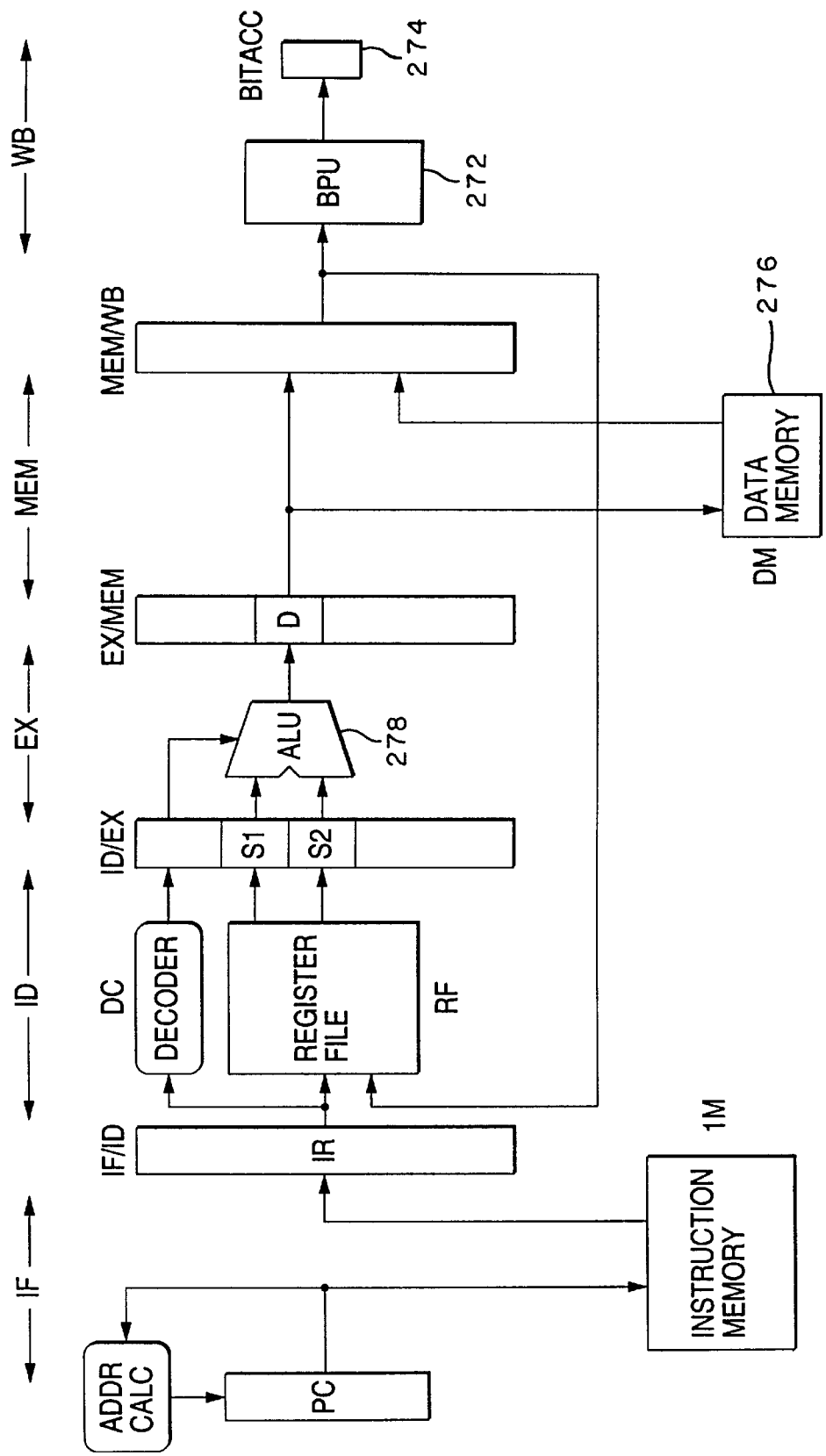
FIG. 35 is a block diagram of a programmable controller having a five-stage pipeline structure according to a fifth embodiment of the present invention.

FIG. 35 is a block diagram showing the overall configuration of a programmable controller having a five-stage pipeline structure according to a fifth embodiment of the present invention. As is evident from comparison with the programmable controller having the structure shown in FIG. 24, the programmable controller of the fifth embodiment is additionally provided with a BPU 272 (Bit Processing Unit) for executing a bit processing instruction and a register BITACC 274 (Bit Accumulator) which is updated as a result of a bit operation.

In the programmable controller having the five-stage pipeline structure of the fifth embodiment, one instruction is executed after having been separated into five pipeline stages such as shown in FIG. 36(a); namely, IF: instruction fetch, ID: instruction decode, register fetch, EX: arithmetic and logic operations, data address calculations, and target branch operations, MEM: memory access (a read/write operation), and WB: branching operations and writing of data into a register. In addition to these instructions, there is another instruction required by the programmable controller, that is, a "bit processing instruction" for referring to or updating a value of one bit in one word of the data memory. So-called bit processing instructions comprise various types of instruction. There is an instruction for updating a register BITACC 274 (Bit Accumulator) in the programmable controller depending on the state of a certain bit in one word read from the data memory. FIGS. 36(b) and 36(c) show the state of the bit processing instruction in the pipeline stage. As shown in the drawings, a BPU stage is present at the place corresponding to the WB stage in which the writing of data into the register is carried out by instructions other than the bit processing instruction. In the BPU stage, the updating of BITACC 274 using the value that was read from the data memory 276 in a MEM stage, the updating of one bit in the data memory, and writing of data into the data memory 276, are all executed. There are many types of bit processing instructions, and the required number of BPU stages changes in the manner as shown in FIGS. 36(b) and 36(c) depending on the instruction.

Some bit processing instructions require not the reading of one word from the data memory but the reading of a plurality of words from the data memory in order to execute one instruction. For example, in the case of load and store instructions which simply carry out the reading and writing of data from and to the memory address, the instructions have such a simple instruction language structure as to make it possible to obtain a memory address by adding the contents of a specified register to immediate value data. Therefore, if an ALU for use in carrying out an arithmetic operation such as a register-to-register operation is used to calculate an address for use in the memory access operation, an efficient circuit can be implemented. However, contrasted with the Load/store instructions, the bit processing instruction does not necessarily require a simple memory address. Therefore, if the circuit is configured such that the address is calculated by the ALU, the circuit will become complicated. To prevent this problem, the programmable controller is provided with an address calculation block specifically designed for use with the bit processing instruction aside from the ALU. The address of the memory is calculated by this address calculation block when the bit processing instruction is executed.

If the bit processing instruction requires a plurality of memory access in contrast to the load/store instructions, it is impossible to execute the instruction by calculating the memory address only once as in the case of the load/store instructions. Therefore, a mechanism for recording the portion of a word of the bit processing instruction necessary for the calculation of an address is provided in the address calculation block. As a result, the programmable controller is provided with the function of calculating addresses over a plurality of continuous pipeline cycles. A control signal for use in accessing memory is output from this mechanism. Consequently, the programmable controller is provided with the function of carrying out an access to the memory over the plurality of pipeline cycles.

If the bit processing instruction reaches the circuit block BPU for executing the bit processing instruction after having traveled through the pipeline register, it also becomes possible for the BPU other than the address calculation block to calculate an address for use in memory access required by the bit processing instruction. In some cases, It would be better to calculate an address by use of the BPU rather than the address calculation block due to the execution of an instruction following the bit processing instruction. For this reason, the programmable controller is provided with a data path which makes it possible to read data from the data memory using the address calculated by the BPU 272 and the data read request signal.

Further, if the bit processing instruction requires the updating of the data memory 276, the BPU 272 calculates a value to be written into the data memory 276. To this end, the programmable controller is provided with a data path which makes it possible to write data into the data memory 276 by use of the value to be written into the memory calculated by the BPU 272, the address, and the data memory write request.

Figure 37:
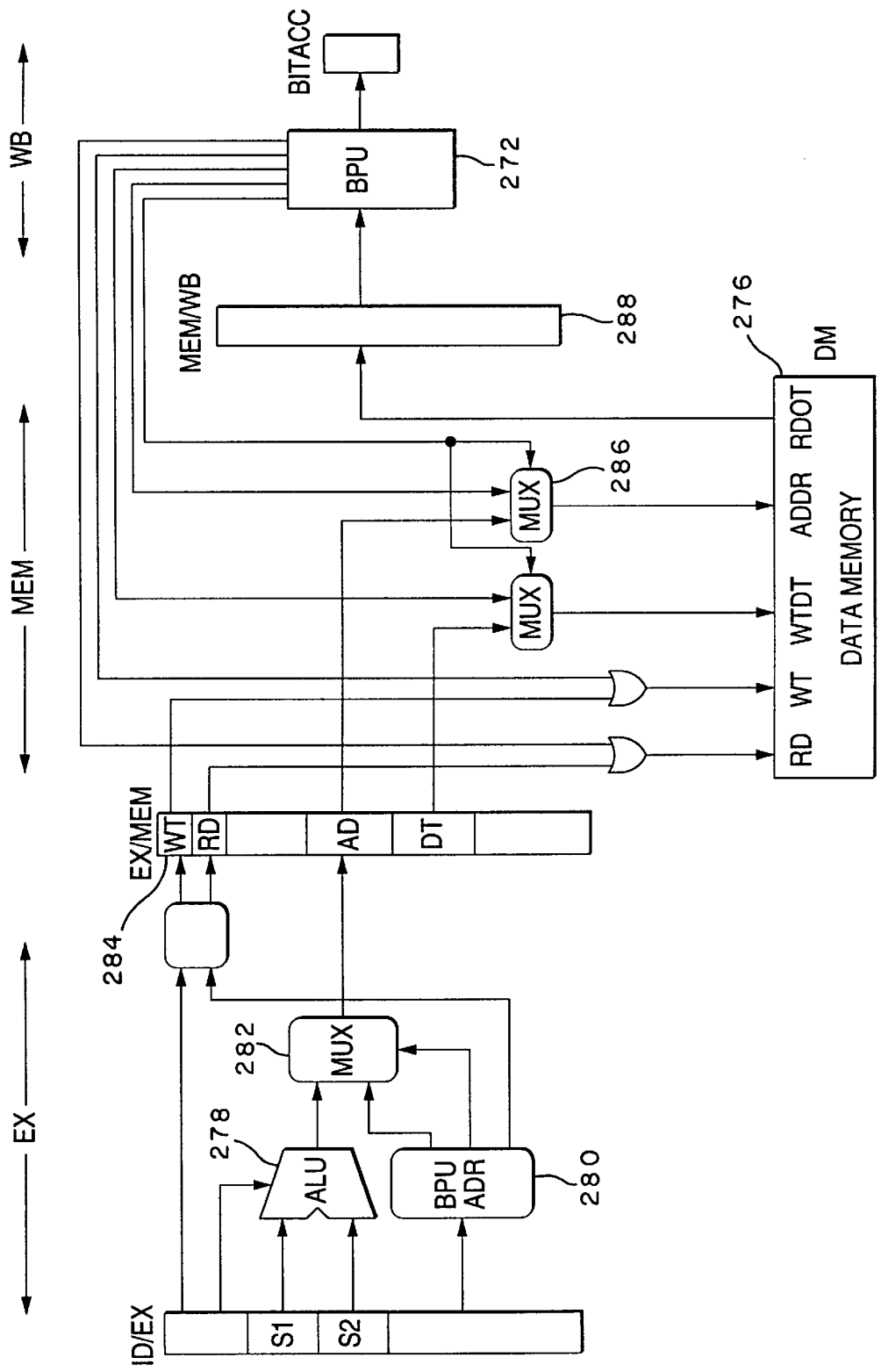
FIG. 37 is a block diagram of one embodiment of the present invention.

FIG. 37 shows a circuit configuration for implementing the features of the present invention. Of the three stages EX, MEM, and WB (BPU) of the five-stage structure, the circuit particularly relevant to the data memory access is shown in FIG. 37. The EX stage shown in FIG. 37 is provided with the address calculation BPUADR 280 specifically designed for use with the bit processing instruction aside from the ALU 278 that calculates a memory address according to the load and store instructions. An output from the BPUADR 280 instead or an output from the ALU 278 is used as an address for use in memory access at the time of execution of the bit processing instruction. To this end, a multiplexer MUX 282 is disposed in the EX stage in order to select an output from the outputs of the ALU 278 and the BPUADR 280. The thus selected output is written into an address AD of the EX/MEM pipeline register 284. The address calculation block BPUADR 280 specifically designed for use with the bit processing instruction calculates the address for use in a memory access. The thus calculated address is written into the address AD of the EX/MEM pipeline register 284 via the multiplexer MUX 282. If the memory access is the reading of data from the memory, a memory read control signal RD of the pipeline register EX/MEM becomes one. If the memory access is the writing of data into the memory, a memory write control signal WT of the pipeline register EX/MEM becomes one. In this way, in the case of the bit processing instruction, the address calculation block BPUADR specifically designed for user with the bit processing instruction calculates an address ADDR of the data memory DM 276 and outputs the read control signal RD or the write control signal WT. In the case of the load instruction or the store instruction, the ALU 278 calculates the memory address, and the thus calculated memory address is written into the address AD of the pipeline register EX/MEM 284 via the multiplexer MUX 282. In the case of the load instruction, the memory read control signal RD of the pipeline register EX/MEM 284 becomes one, whereas, in the case of the store instruction, the memory write control signal WT of the pipeline register EX/MEM 284 becomes one.

The MEM stage is provided with a data path which makes it possible to execute memory accesses on the basis of the address ADDR of the data memory DM 276, a write value WTDT, and memory control signals RD and WT output from the block BPU 272 that executes the bit processing instruction as well as the value calculated in the EX pipeline cycle. On the assumption that the memory control signals RD and WT shown in FIG. 37 mean the execution of memory access when they are one, the memory access can be executed by outputting a memory access request from the bit processing instruction block BPU 272 even if the memory control signals WT and RD in the pipeline register EX/MEM 284 are zero. In short, where the bit processing instruction execution circuit block BPU 272 reads data from the data memory DM 276, the memory address ADDR is sent to the data memory DM 276 from the bit processing instruction execution circuit block BPU 272 in lieu of the address AD of the pipeline register EX/MEM 284 by switching the multiplexer MUX 286. Further, the memory read control signal RD is sent to the data memory DM 276 from the bit processing instruction execution circuit block BPU 272 via the OR gate. As a result, data RDDT read from the data memory DM 276 are input to the bit processing instruction circuit BPU 272 via the pipeline register MEM/WB 288. Where the bit processing instruction execution circuit block BPU 272 writes data into the data memory DM 276, the memory address ADDR is sent to the data memory DM 276 from the bit processing instruction execution circuit block: BPU 284 in lieu of the address AD of the pipeline register EX/MEM 284 by switching the multiplexer MUX 288. Further, write data WTDT are sent to the data memory DM from the bit processing instruction execution circuit block BPU 272 in lieu of data DT of the pipeline register EX/MEM 284. In addition, the memory write control signal WT is sent to the data memory DM 276 from the bit processing instruction execution circuit block BPU 272 via an OR gate. As a result, it becomes possible to write the data into the data memory DM 276 from the bit processing instruction execution circuit block BPU 272.

Figure 38:
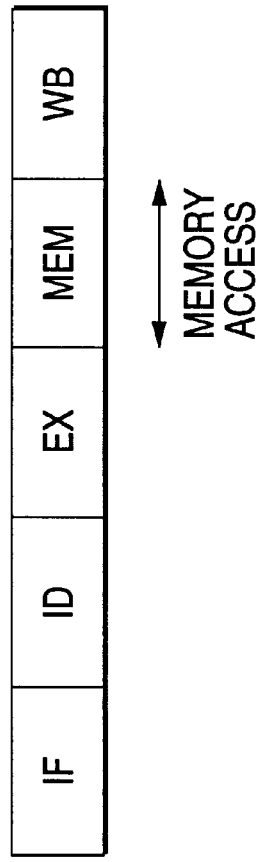
FIGS. 38(a) and 38(b) are timing charts which show an operation timing of the programmable controller as shown in FIG. 37.
Figure 38:
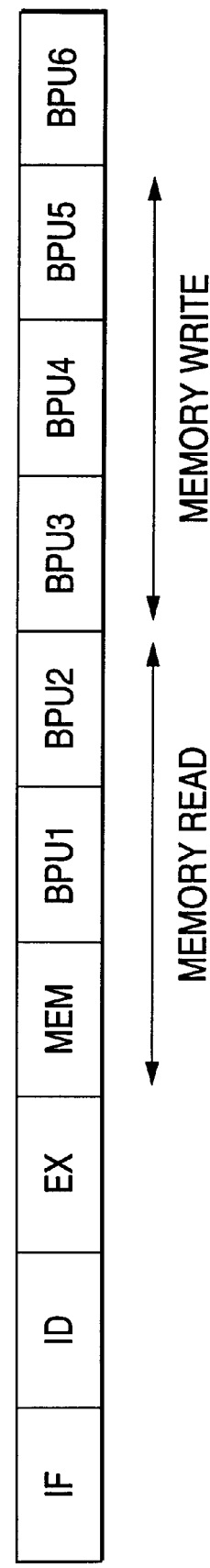

FIGS. 38(a) and 38(b) show a timing chart of the programmable controller of the fifth embodiment of the present invention. FIG. 38(a) shows a timing chart of the load/store instructions, and FIG. 38(b) shows a timing chart of the bit processing instruction according to which three words of data are read from the data memory, and the three words of data are written back into the data memory at the time of execution of the instruction. In the timing chart shown in FIG. 38(a), an address is calculated by the ALU 278 in the EX stage, and the reading and writing of data from and into the data memory 276 are carried out in the MEM stage. On the other hand, an address is calculated by the BPUADR 280 in the EX stage in the timing chart shown in FIG. 38(b). On the basis of the thus calculated address, data are read from the data memory 276 in the MEM stage. The BPUADR 280 holds therein part of an instruction word of the bit processing instruction necessary to calculate an address. The BPUADR 280 calculates the address even in the MEM stage subsequent to the EX stage so as to make it possible to read the data memory 276 even in the pipeline cycle carried out immediately after the MEM stage and to output a data memory read request signal. In consequence, the reading of data from the data memory 276 is executed even in a BPU1 stage. It becomes necessary to read another word of data from the memory. However, the instruction word of the bit processing instruction has already reached the BPU 272 in the BPU1 stage after having traveled through the pipeline register. Therefore, all the signals necessary to read data from the data memory during two cycles of the BPU 272 are output from the BPU 272, whereby the reading of data from the data memory 276 is effected. Further, in the case of the writing of three words of data into the data memory 276 carried out after the reading operation, all the necessary values are output from the BPU 272, and the writing of data into the data memory 276 carried out over three cycles are executed.

By virtue of the programmable controller of the present invention, it becomes possible for he programmable controller having the five-stage pipeline structure to execute the bit processing instruction that requires memory access to be made many times in order to execute the instruction. However, the bit processing instruction occupies the data memory 276 over a plurality of pipeline cycles. Therefore, it is necessary to suspend the execution of an instruction following the bit processing instruction until the following instruction can access to the data memory. For this reason, the programmable counter is provided with the function of suspending the increment of the program counter on the basis of a control signal which is provided in the pipeline register and shows that the following signal is a bit processing instruction. If it is impossible to suspend the execution of the following instruction by only suspending the increment of the program counter, the programmable counter is provided with the function of invalidating the instruction by overwriting the instruction with a result of decoding of the instruction, on the basis of the control signal which is provided in the pipeline register and shows that the following signal is a bit processing instruction.

Further, if it is impossible to realize the required suspension of execution of the following instruction by use of only the control signal, the programmable controller is provided with the function of suspending the increment of the program counter on the basis of a control signal showing that the bit processing instruction is currently executed is output from the BPU. Similarly, if it is impossible to suspend the execution of the following instruction by suspending the increment of the program counter, the programmable counter is provided with the function of invalidating the instruction by overwriting the instruction with a result of decoding of the instruction, on the basis of the control signal which is provided in the pipeline register and shows that the following signal is a bit processing instruction is provided on the pipeline register.

Figure 39:
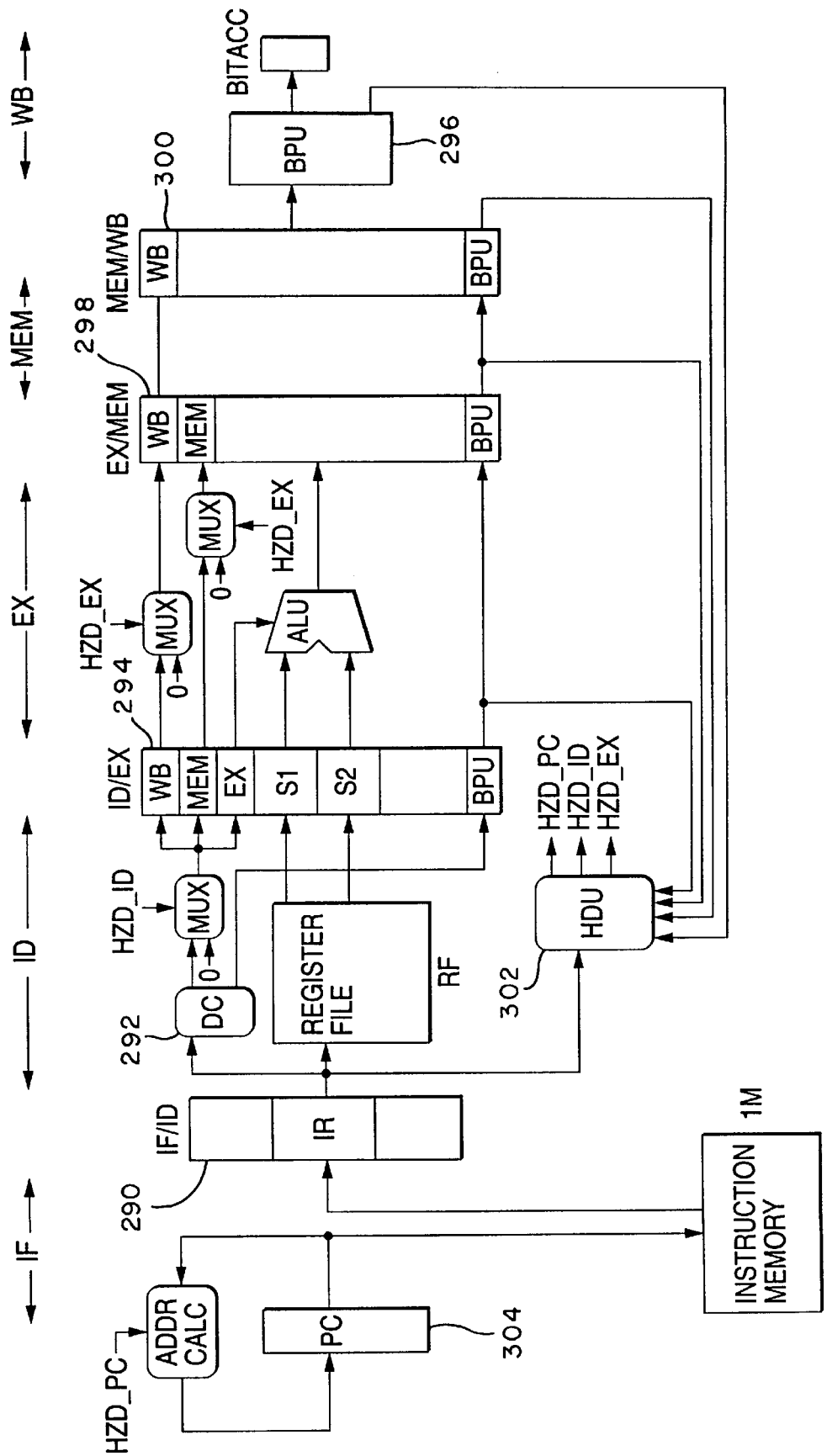
FIG. 39 is a block diagram of another embodiment of the present invention.

FIG. 39 shows a circuit configuration for implementing the features. An instruction word acquired from instruction memory IM in the IF stage shown in FIG. 39 is stored in an instruction register IR provided on the pipelines register IF/ID 290. The thus stored instruction word is decoded in the decoder block DC 292 in the ID stage, and a result of the decoding operation is written into the pipeline register ID/EX 294. If the thus decoded instruction is a bit processing instruction, one is written into the control signal BPU provided on the pipeline register. This control signal BPU Ls sequentially transferred over the pipeline registers ID/EX 294, EX/MEM 298, and MEM/WB 300. The control signal is then sent to a hazard detection block HDU 302. The hazard detection block HDU 302 generates hazard signals HZD_ID, HZD_ID, and HZD_EX. The hazard signal HZD_PC suspends the increment of the program counter PC 304, and the hazard signal HZD_ID invalidates the memory access and the register write operation of the results obtained in the ID stage. The hazard signal HZD_EX invalidates the memory access and the register write operation of the results obtained in the EX stage. In addition to the control signal BPU provided on the pipeline register, the bit processing instruction execution block also outputs a control signal showing that the bit processing instruction is currently executed. These signals are processed together by the hazard detection block HDU, whereby the hazard signals are generated.

Figure 40:
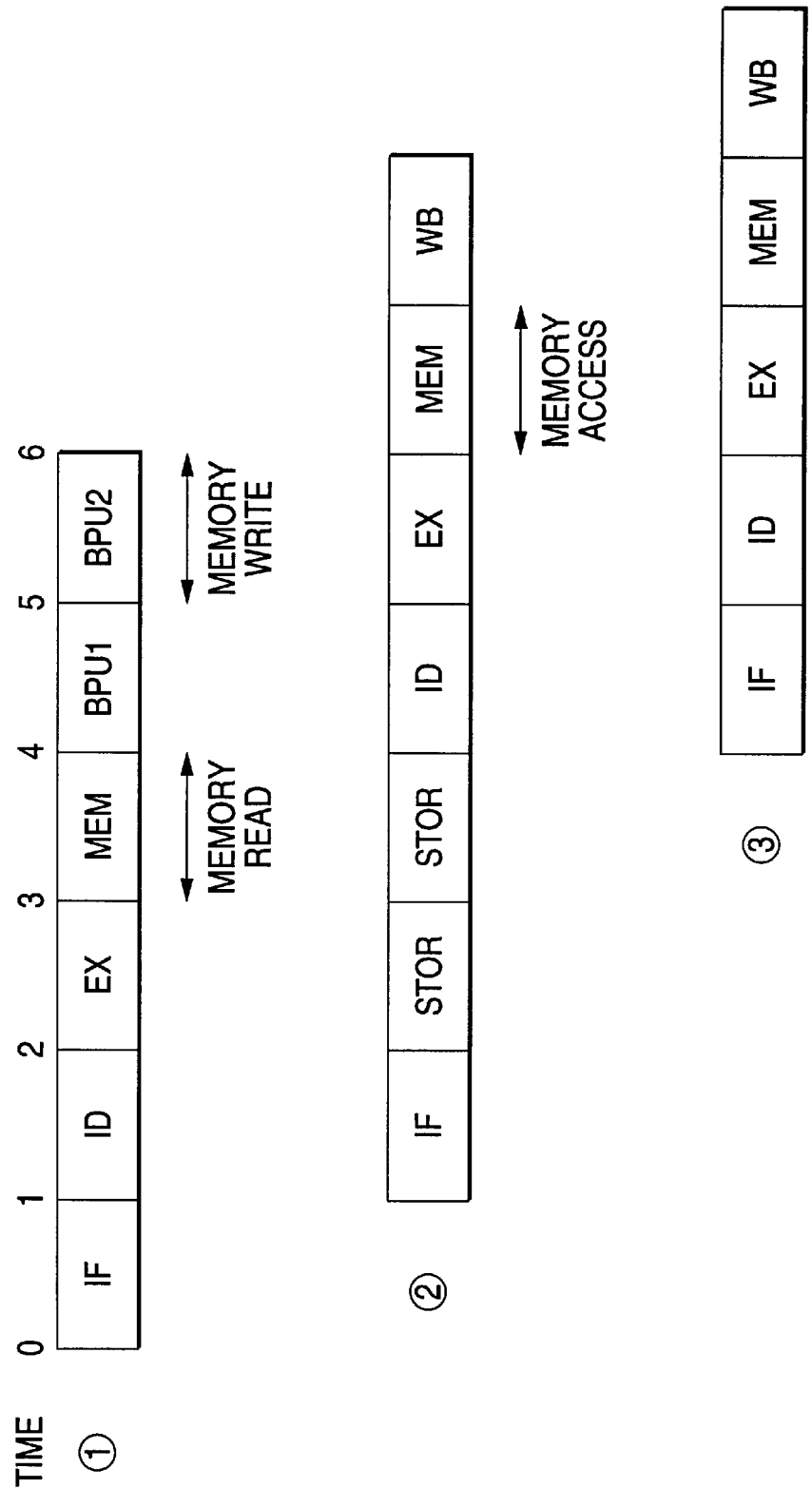
FIG. 40 is a timing chart which shows an operation timing of a bit processing instruction to which one word of data is read from the data memory and the thus read data are written to the data memory again after one bit of that data has been modified.

With reference to a timing chart of the instructions obtained when they are executed, the operation of the programmable controller will be described. As shown in FIG. 40, an explanation will now be given of the bit processing instruction according to which one word of data is read from the data memory and the thus read data are written to the data memory again after one bit of that data has been modified. In the case of the timing chart shown in FIG. 40, assume that the bit processing instruction is stored in address 1 of the instruction memory, and that the following instructions are stored in addresses 2 and 3. According to the bit processing instruction shown in this drawing, the data are initially read from the data memory in the MEM stage, and one bit data of the thus read data are processed in the BPU 1 stage. The thus processed data are written back to the data memory again in a BPU 2 stage. Therefore, a plurality of instructions simultaneously carry out accesses to the data memory unless the memory accesses associated with the following instructions is carried out after the BPU 2 stage of the bit processing instruction. When the bit processing instruction at address 1 of the instruction memory is in the ID stage, the subsequent instruction at address 2 of the instruction member is in the IF stage. Therefore, it is impossible to prevent the following instruction from being fetched. Further, the MEM stage for the instruction at address 2 must be executed after the BPU 2 stage for the preceding bit processing instruction, and hence the execution of the instruction must be suspended only for two pipeline cycles.

Figure 41:
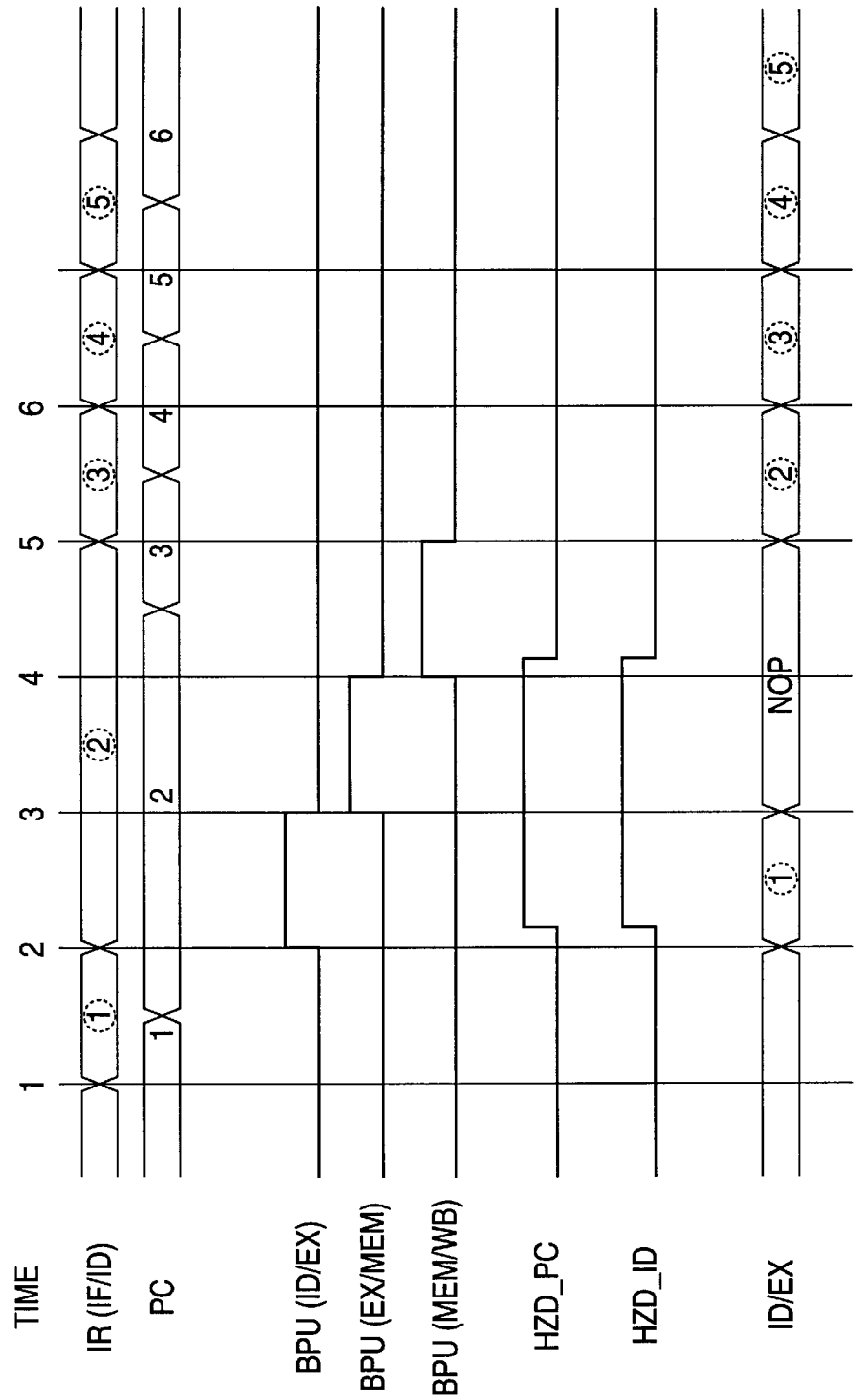
FIG. 41 is a timing chart of signals in the circuit when the instructions shown in FIG. 40 are executed.

FIG. 41 shows a timing chart of signals in the circuit when the instructions shown in FIG. 40 are executed. The fetching of the bit processing instruction at address 1 in the instruction memory has been completed at time 1, and the instruction word is input in an instruction register IR, and IR the pipeline register IF/ID. The thus input instruction word is then decoded, whereby information that the thus fetched instruction is a bit processing instruction appears in the control signal BPU of the pipeline register ID/EX at time 2. This control signal BPU is sent to the pipeline registers EX/MEM and MEM/WB. When the control signal BPU is in the pipeline registers ID/EX and EX/MEM, the hazard detection block HDU outputs a hazard signal HZD_PC. As a result, the program counter PC is suspended for two cycles. An instruction at address 2 continues being fetched from time 2 to time 5. If the preceding bit processing instruction is not affected by directly decoding the fetched instruction, the decoding is carried out just as it is. However, if erroneous operations occur as a result of the decoding of the fetched instruction, the hazard signal HZD_ID is also output at the same timing as the hazard signal HZD_PC. The hazard signal HZD_ID invalidates the control signals MEM, WB, and EX relating to the memory access and the writing of data into a register when a result of the decoding of the instruction register IR is written into the pipeline register ID/EX. When the hazard signal HZD_ID is in the process of generation, the pipeline register ID/EX changes to the same state when NOP instructions are decoded. As a result of the use of the hazard signal HZD_ID together with the hazard signal HZD_PC, the following control is implemented: that is, the execution of the instruction is suspended only for two pipeline cycles as in the instruction 2 shown in FIG. 40, and memory access for the following instruction is not carried out until the memory access of the bit processing instruction is completed.

Figure 42:
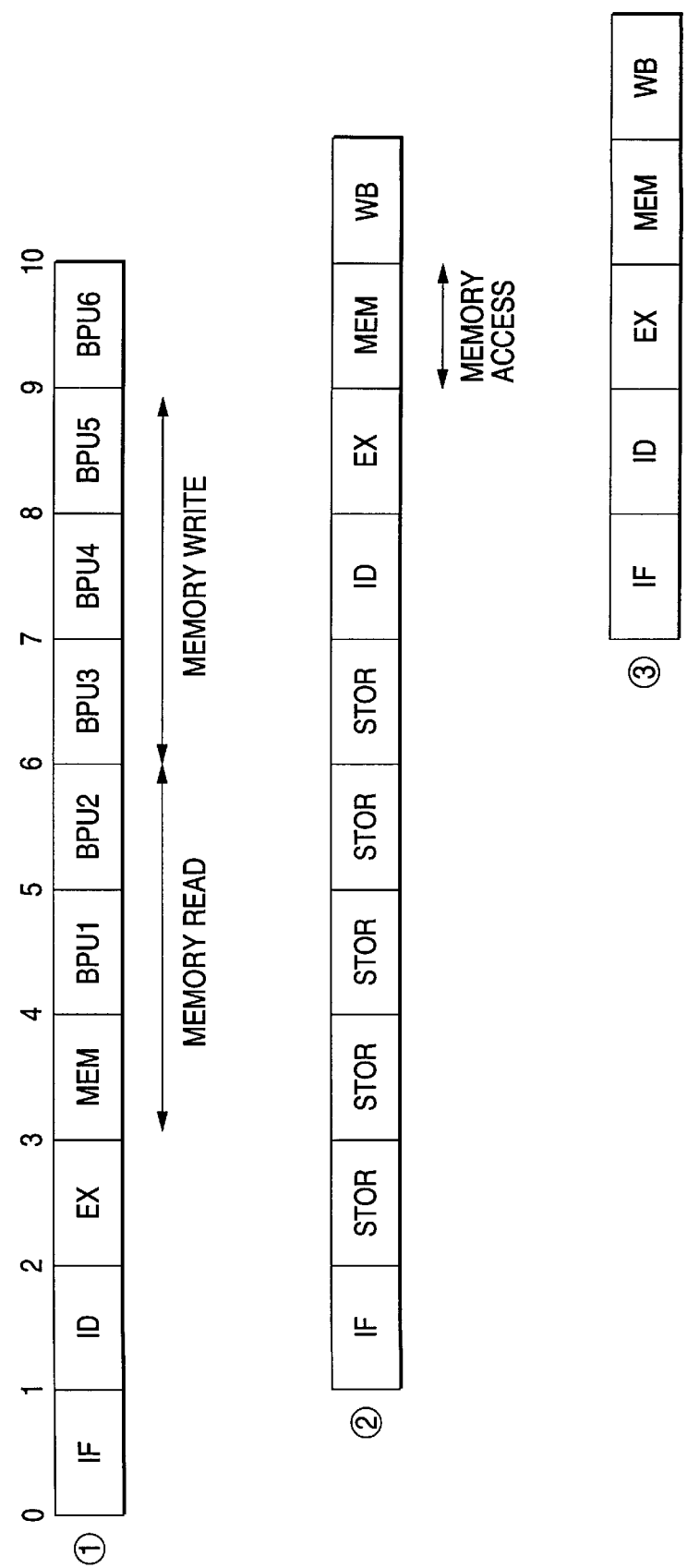
FIG. 42 is a timing chart which shows an operation timing of a bit processing instruction according to which three words of data are read from the memory and the thus read data are written back into the memory when the instruction is executed.
Figure 43:
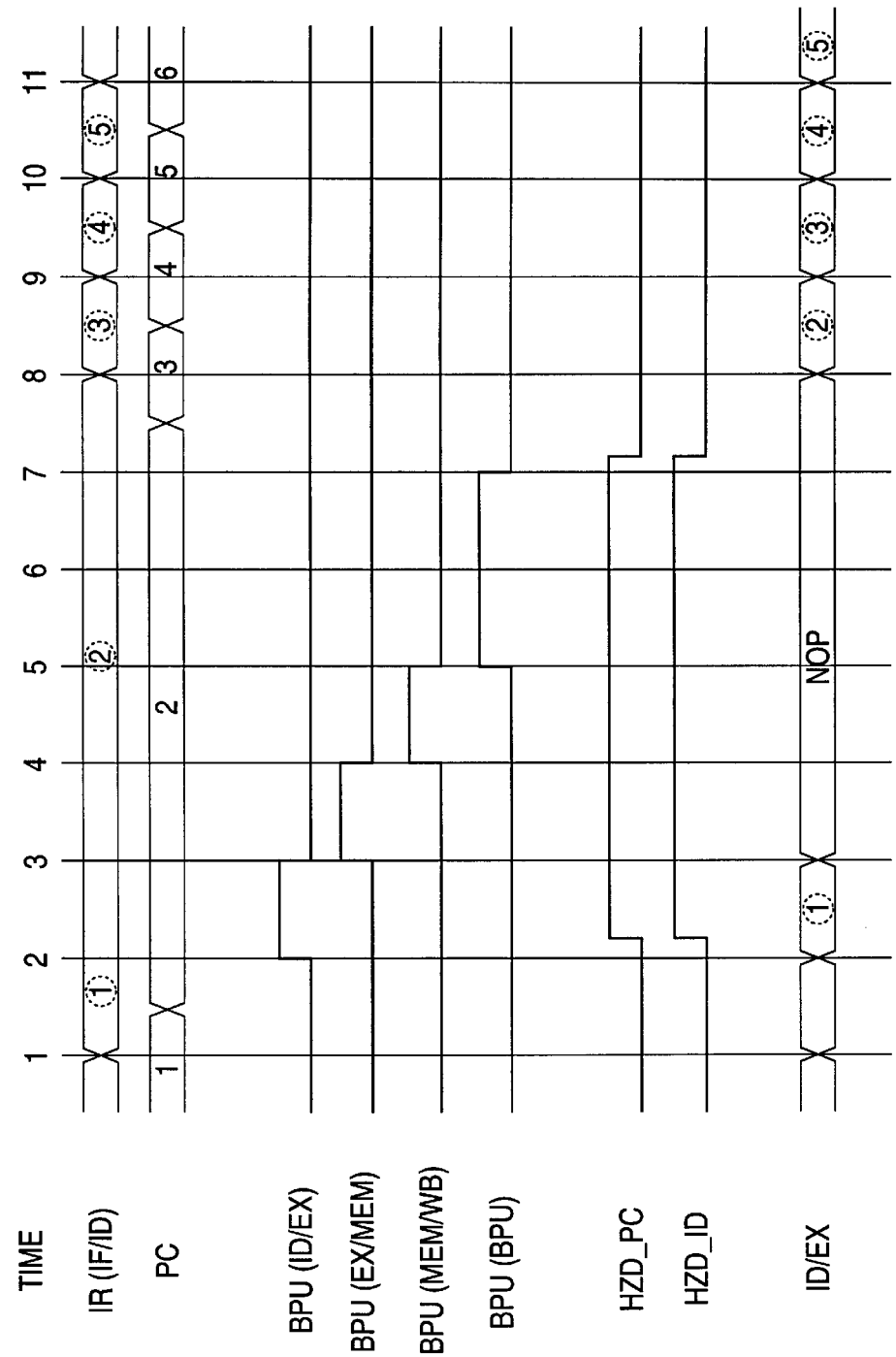
FIG. 43 is a timing chart of signals in the circuit when the instructions shown in FIG. 42 are executed.

An explanation will now be given of a bit processing instruction according to which three words of data are read from the memory and the thus read data are written back into the memory when the instruction is executed. This case is based on such an assumption that the bit processing instruction is stored in an address 1 of the instruction memory IM, and that other instructions are also stored in the contiguous addresses 2 and 3. As shown in FIG. 42, the bit processing instruction (1) carries out memory accesses for contiguous six cycles, and the following instruction (2) must delay the execution of the MEM stage until the BPU6 stage of the instruction (1). In this case, it is impossible to suspend the execution of the following instruction by means of only the control signal BPU carried through the pipeline register. Therefore, a control signal showing that the bit processing instruction is currently being executed is output from the bit processing instruction execution lock BPU, as shown in FIG. 43. If the hazard signal HZD_PC is generated by use of this control signal together with the control signal BPU, it becomes possible to suspend the execution of the following instruction as needed. If the hazard signal HZD_ID is generated as needed, it is also possible to invalidate a result of the decoding of the fetched instruction.

The programmable controller has a differential instruction for detecting a rise or fall of an input signal. Memory for use with the differential instruction becomes necessary in order to record a value obtained as a result of previous scanning of the input signal. For this reason, the programmable controller is provided with the memory employed in a conventional programmable controller which executes an instruction with a three-stage pipeline structure, that is, memory which has the same address as the instruction memory and a one bit wide. An address bus is shared between the data memory for use with the differential instruction and the instruction memory, which results in fewer signal lines. As a result, it becomes possible even for the programmable controller being capable of operating at a higher speed and having the five-stage pipeline structure to execute differential instructions which are the same as the conventional differential instructions.

By virtue of the above-described circuit configuration and the memory for use with the differential instructions, a memory rewrite address required when the differential instruction is executed becomes the same as the address of the instruction memory which the differential instructions are stored. According to one possible method of storing the rewrite address, a value of the program counter obtained when the differential instruction was fetched is stored in a stack, and that address is acquired when the differential instruction is rewritten. However, this method results in complicated control, and the value of the program counter PC is transferred up to the EX stage for branch instruction purposes or the like. To prevent these problems, the following configuration is employed: In other words, the address of the instruction memory (i.e., the value of the PC) is transferred to the bit processing instruction execution block BPU by use of the pipeline register, and the thus transferred address is used again in rewriting the differential instruction to the memory when the BPU executes the differential instruction.

When the differential instruction is written back into the memory, the address of the instruction memory becomes identical to the address for use in rewriting the differential instruction to the memory. If the instruction continues being fetched just as it is, the differential instruction which is currently written into the memory is fetched again in lieu of the instruction that was to be fetched originally. To prevent this problem, the increment of the program counter in the pipeline cycle, during which the differential instruction is written back into the memory, is suspended, which ensures fetching of an instruction to be executed.

It is impossible to prevent execution of an invalid instruction by simply suspending increment of the program counter PC. If it is impossible to invalidate the result of the decoding of the instruction, a result obtained as a result of further overwriting the value fetched from the instruction memory with a NOP (No Operation: No operation instruction) is input to the instruction register IR. As a result, invalid execution of the instruction is prevented.

Figure 44:
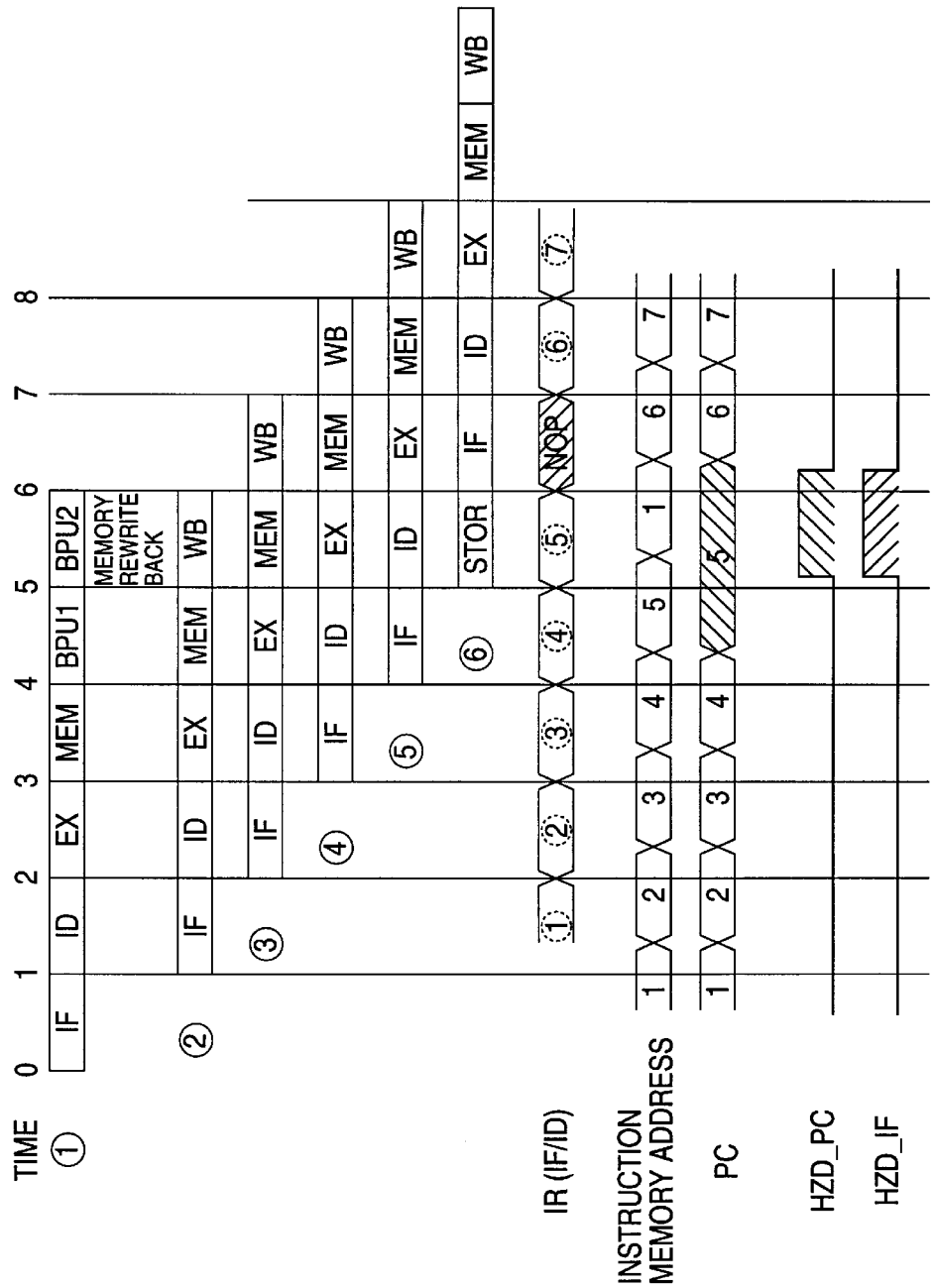
FIG. 44 is a timing chart of the circuit obtained at the time of the execution of the differential instruction.
Figure 45:
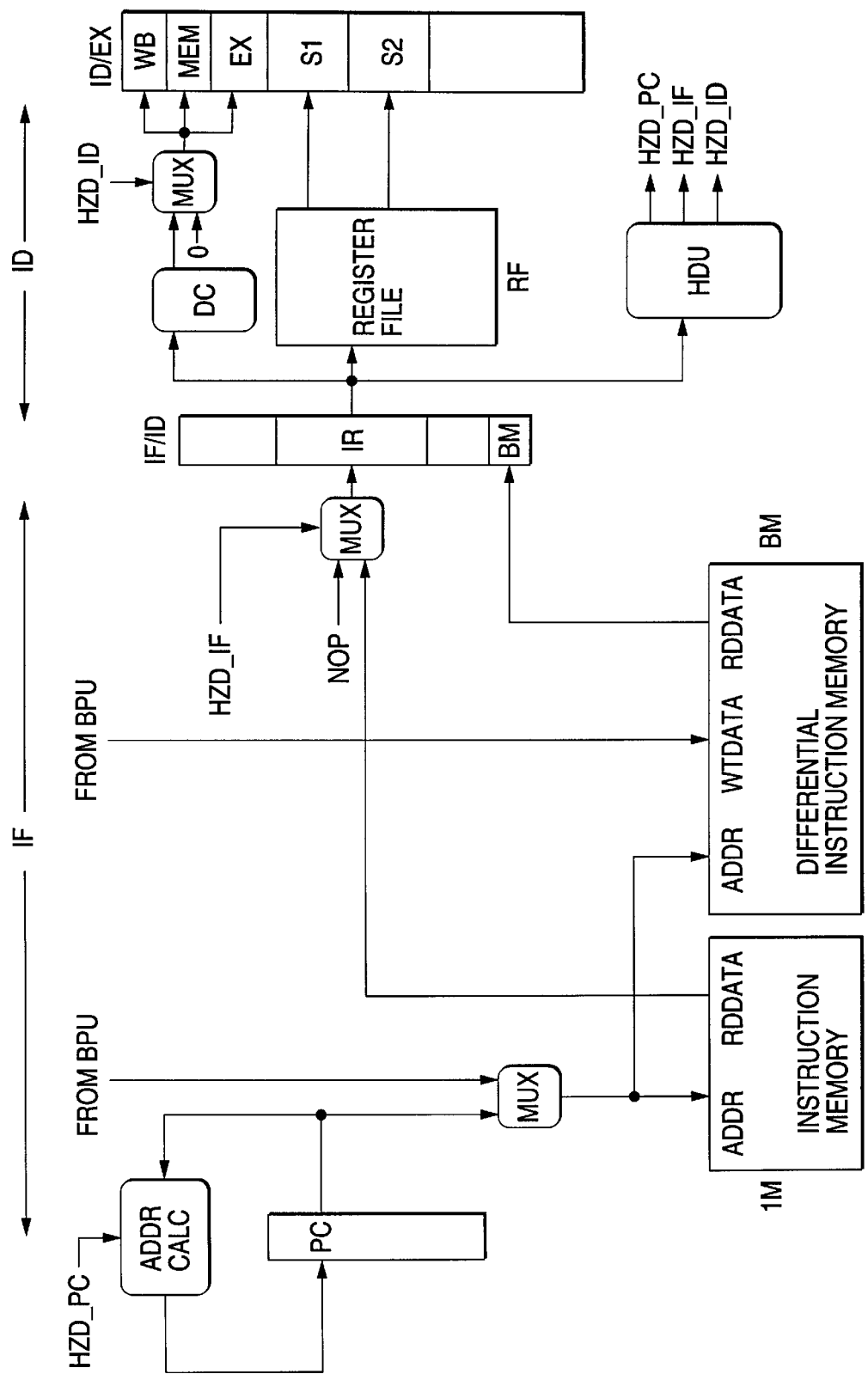
FIG. 45 is a timing chart which shows an operation timing of the programmable controller as shown in FIG. 44.

With reference to a timing chart of the circuit obtained at the time of execution of the differential instruction and the portions of the circuit relevant to the execution of the differential instruction, the programmable controllers will be described. FIG. 44 shows a timing chart of the circuit obtained at the time of the execution of the differential instruction. FIG. 45 is a block diagram of the IF and ID stages. The embodiment is based on the following assumption that a differential instruction is present in the instruction memory at address 1, that instructions other than the bit processing instruction are stored at address 2 and addresses following address 2, and that the differential instruction stored at address 1 is executed first. The differential instruction is written into the memory again in the BPU2 stage. The address of the memory and the memory write request signal are output from the BPU block at this time. In the pipeline cycle during which the differential instruction is writen back into the memory, as shown in FIG. 44, the hazard signal HZD_PC is generated in order to suspend the increment of the program counter PC, whereby the fetching of an instruction stored in the instruction memory at address 6 can be ensured. As a result of simple suspension of the increment of the PC, the address of the instruction memory changes to address 1 when the differential instruction is written back into the memory. The instruction at address 1 is fetched again. It is also possible to invalidate the thus fetched instruction in the ID stage. In this embodiment, however, a value showing a NOP (No Operation Instruction) is written into the instruction register IR in lieu of the value fetched from the instruction memory, which prevents the execution of an invalid instruction.

Contrasted with the hazard processing of another instruction which is capable of determining the manner of settling a hazard, the hazard processing carried out when the differential instruction is rewritten becomes necessary immediately before the completion of execution of the instruction. For this reason, a contradiction will arise in the hazard processing depending on the combination of instructions, which results in faulty operation of the programmable controller. To prevent this problem, the hazard detection block HDU monitors the occurrence of various types of hazard. If a contradiction arises in settling a hazard of the differential instruction, the execution of the instruction is additionally suspended for another cycle so as to prevent a faulty circuit operation.

Figure 46:
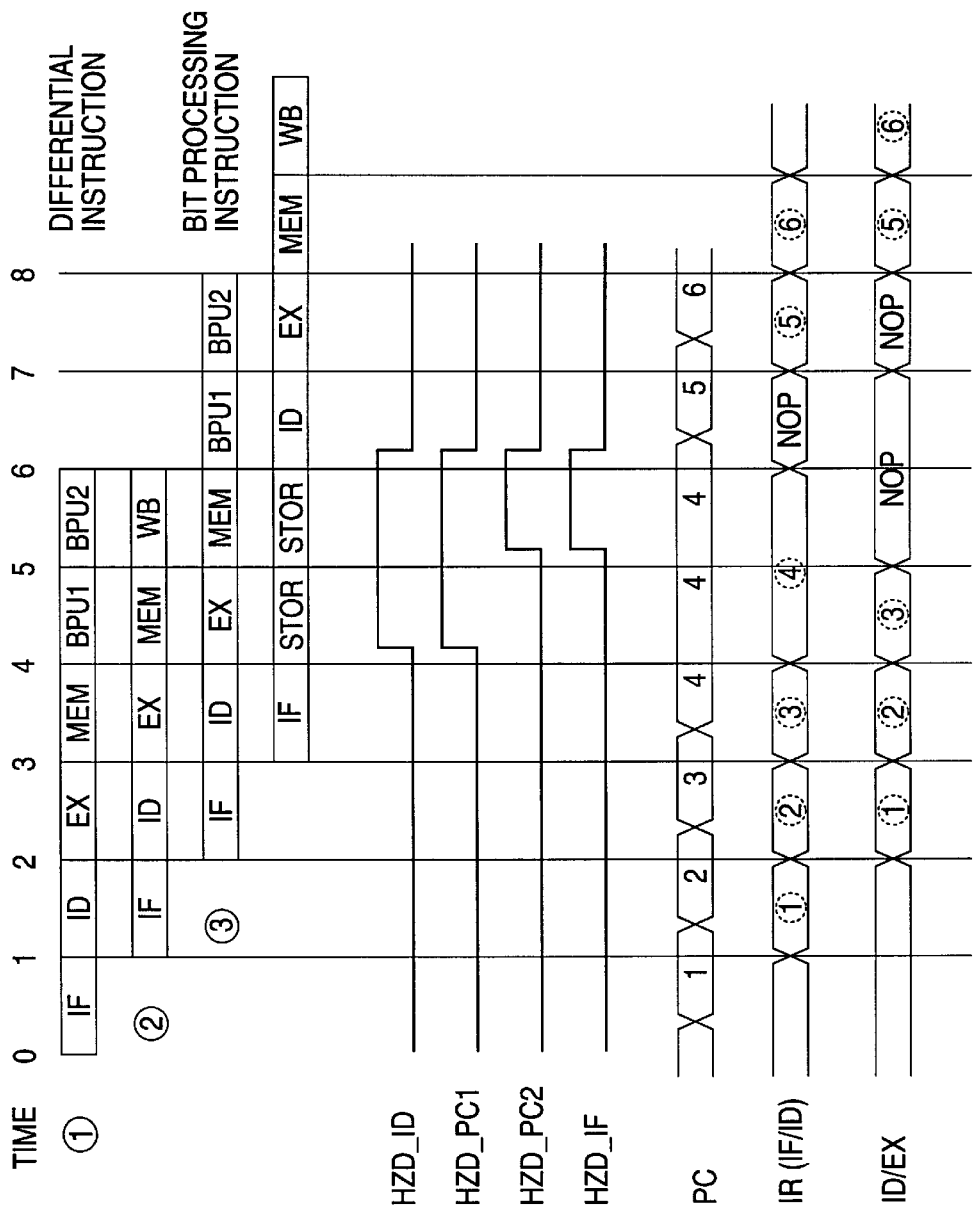
FIG. 46 is a timing chart which shows an explanation of a contradiction arising in the hazard processing of the differential instruction.

FIG. 46 shows an example of the contradiction. In FIG. 46, the differential instruction is placed at address 1, and the bit processing instruction shown in FIG. 40 for reading and writing one word of data from and to the data memory is located at address 3. Instructions other than the bit processing instruction are placed at address 2, address 4, and addresses following address 4. The instructions are executed in order from the differential instruction at address 1. The hazard signals represent signals generated within the hazard detection block. The hazard signals HZD_ID and HZD_PC1 are relevant to the bit processing instruction at address 3. The hazard signals HZD_PC2 and HZD_IF are relevant to the differential instruction at address 1. The hazard signal HZD_PC output from the hazard detection block HDU is obtained by logical summation (OR) of the hazard signals HZD_PC1 and HZD_PC2 (OR). The increment of the program counter PC is suspended over two cycles from time 4 to time 5 and from time 5 to time 6. The instruction is decoded by the hazard signal HZD_PC1, and the value written in the pipeline register ID/EX between time 5 to time 6 is overwritten with the NOP (No Operation Instruction). On the other hand, the instruction, which is acquired by the instruction register IR at time 6 by the hazard signal HZD_IF for settling a hazard of the differential instruction, is overwritten with the NOP. If these two hazard processing operations are executed just as they are, the instruction at address 4 is neither decoded nor executed. If such a contradiction arises in the hazard processing, it is necessary to obviate an instruction not to be executed by generating the hazard signal HZD_PC for another cycle in the hazard detection block HDU.

Figure 47:
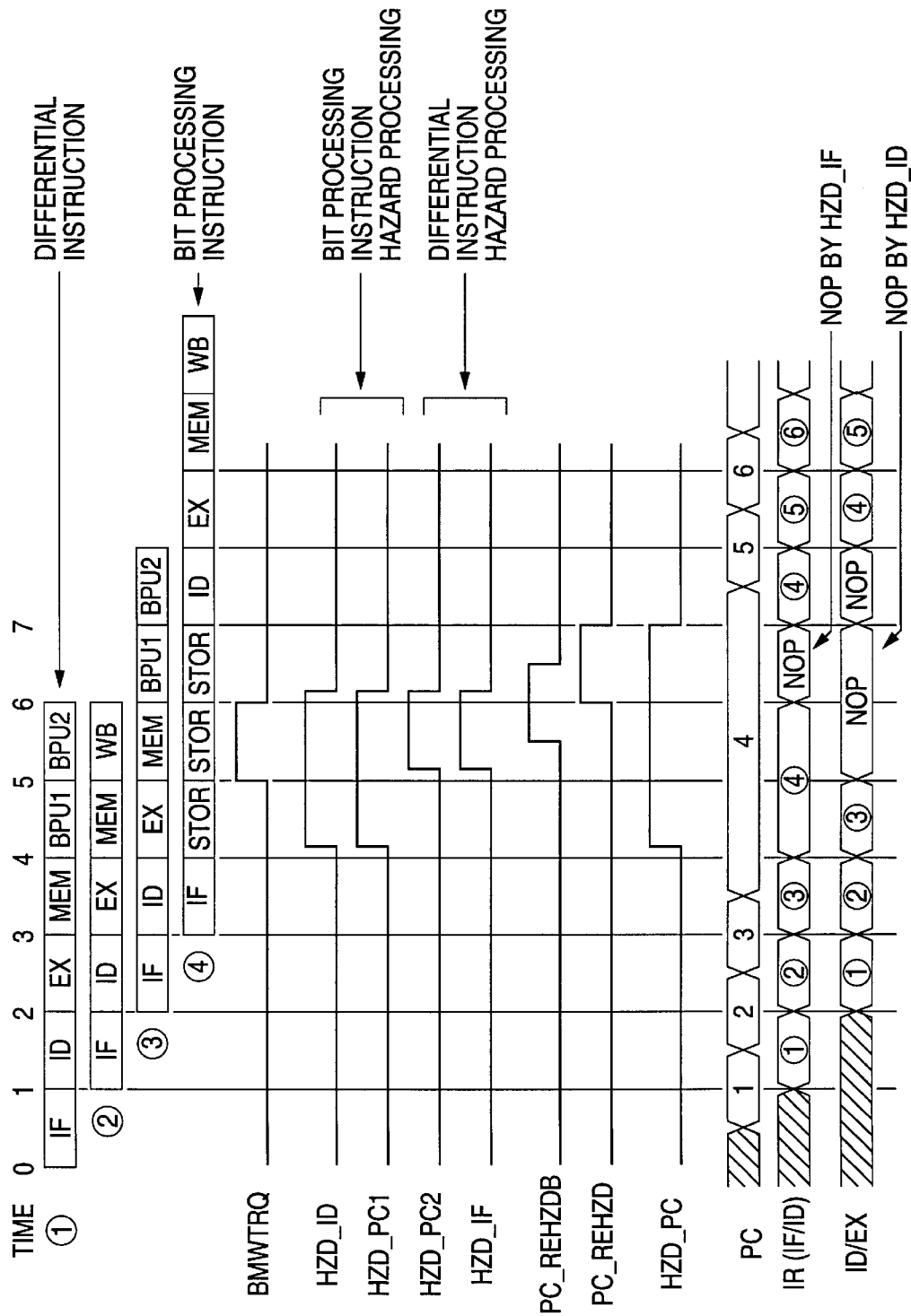
FIG. 47 is a timing chart which shows a countermeasure when the differential instruction and the bit processing instruction are executed.
Figure 48:
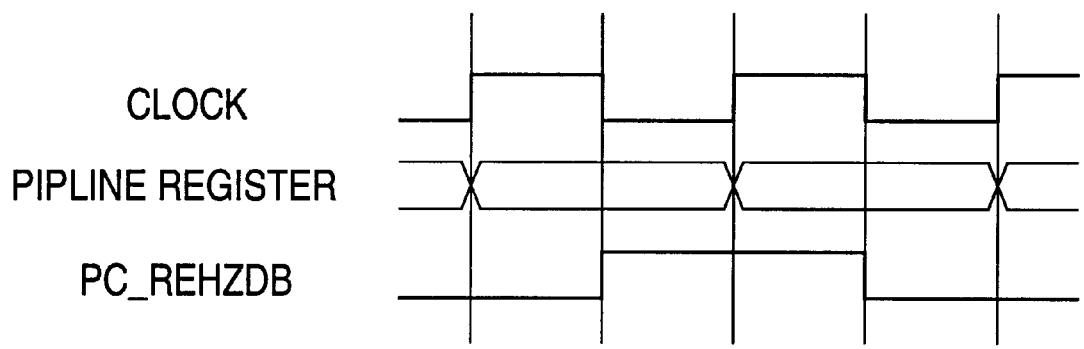
FIG. 48 is a table which shows one example of allocation of an operation code PC_REHZDB of the programmable controller of the present invention.

FIG. 47 is a timing chart which shows a countermeasure when the differential instruction and the bit processing instruction are executed. Signal BMWTRQ set to "1" when the differential instruction writes the bit memory, and set to "0" in the other condition. Signal PC_REHZDB represents a signal operated by an inverse phase clock with respect to a clock driving the pipeline resister. FIG. 48 is a table which shows one example of allocation of an operation code PC_REHZDB of the programmable controller of the present invention. An amount of signal BMWTRQ is changed as follows: PC_REHZDB sets to "1" under the condition BMWTRQ equal to "1" and HZD_ID equal to "1", and PC_REHZDB sets to "0" under the condition HZD-PC1 or HZD_PC2 equal to "0". Signal PC_REHZDB represents a signal produced by latching the pipeline resister by the clock driving the pipe line resister. Signal HZD_PC represents a logical summation of HZD_PC1, HZD_PC2and PC_REHZD. Signal HZD_PC stops the increment of PC.

Sixth Embodiment

Of the instructions required by the programmable controller, some instructions are not constantly executed but executed only when predetermined instruction execution conditions are satisfied. Flags which constitute the instruction execution conditions are provided in various positions of the above-described five-stage pipeline structure. A flag BITACC of the flags which is updated by the bit operation instruction is updated in the fifth stage or a stage after the fifth stage of the five-stage pipeline structure. For this reason, if an instruction which is determined to be executed or invalidated depending on the instruction execution condition is positioned immediately after the bit operation instruction for updating the flag BITACC, the bit operation instruction has not updated the flag BITACC yet when the following instruction is executed. The instruction execution conditions are not determined yet, and therefore it becomes impossible to properly carry out the execution/invalidation control.

Figure 49:
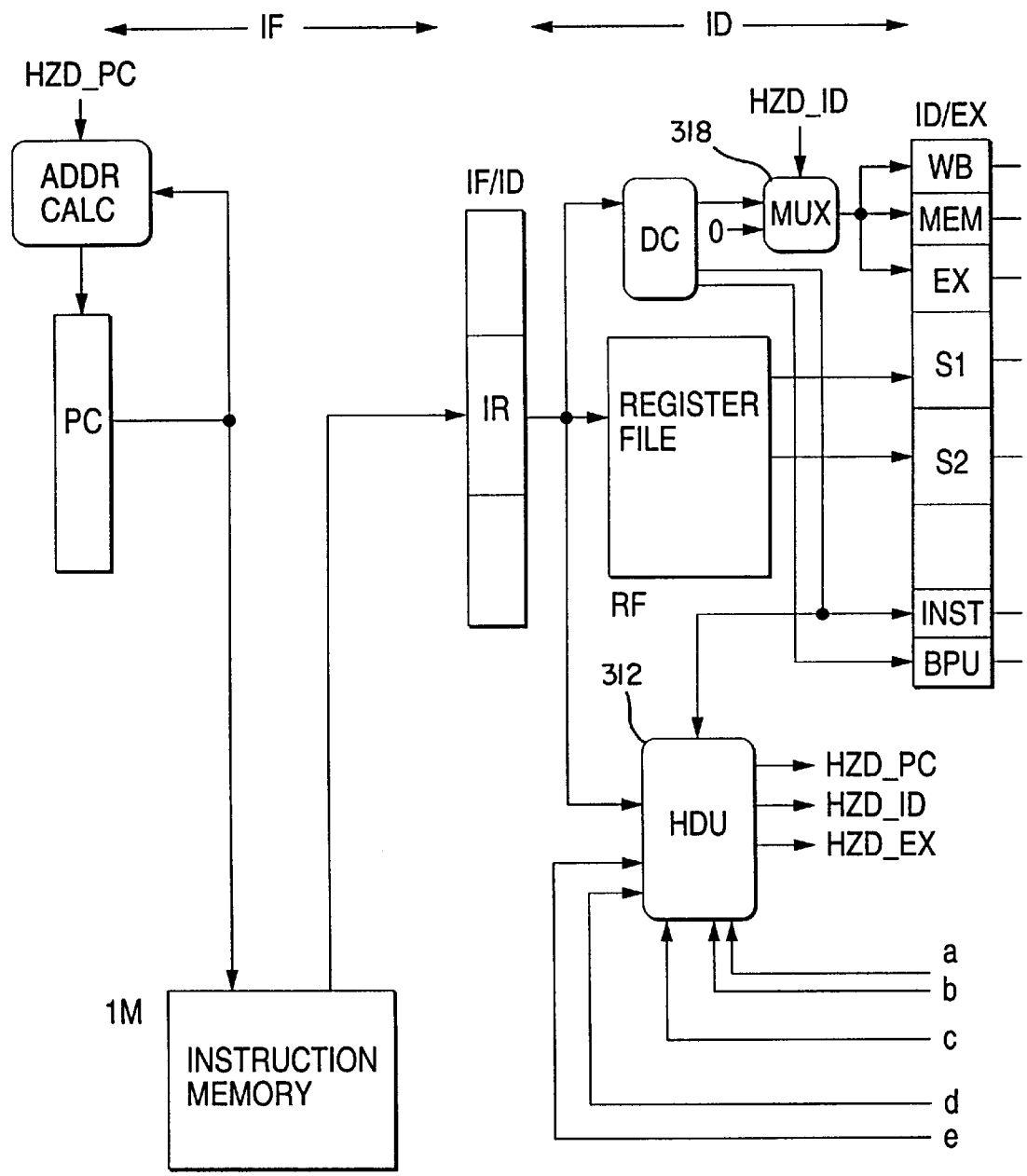
FIG. 49 is a block diagram showing the configuration of first and second stages of a programmable controller having a five-stage structure of a sixth embodiment of the present invention.
Figure 50:
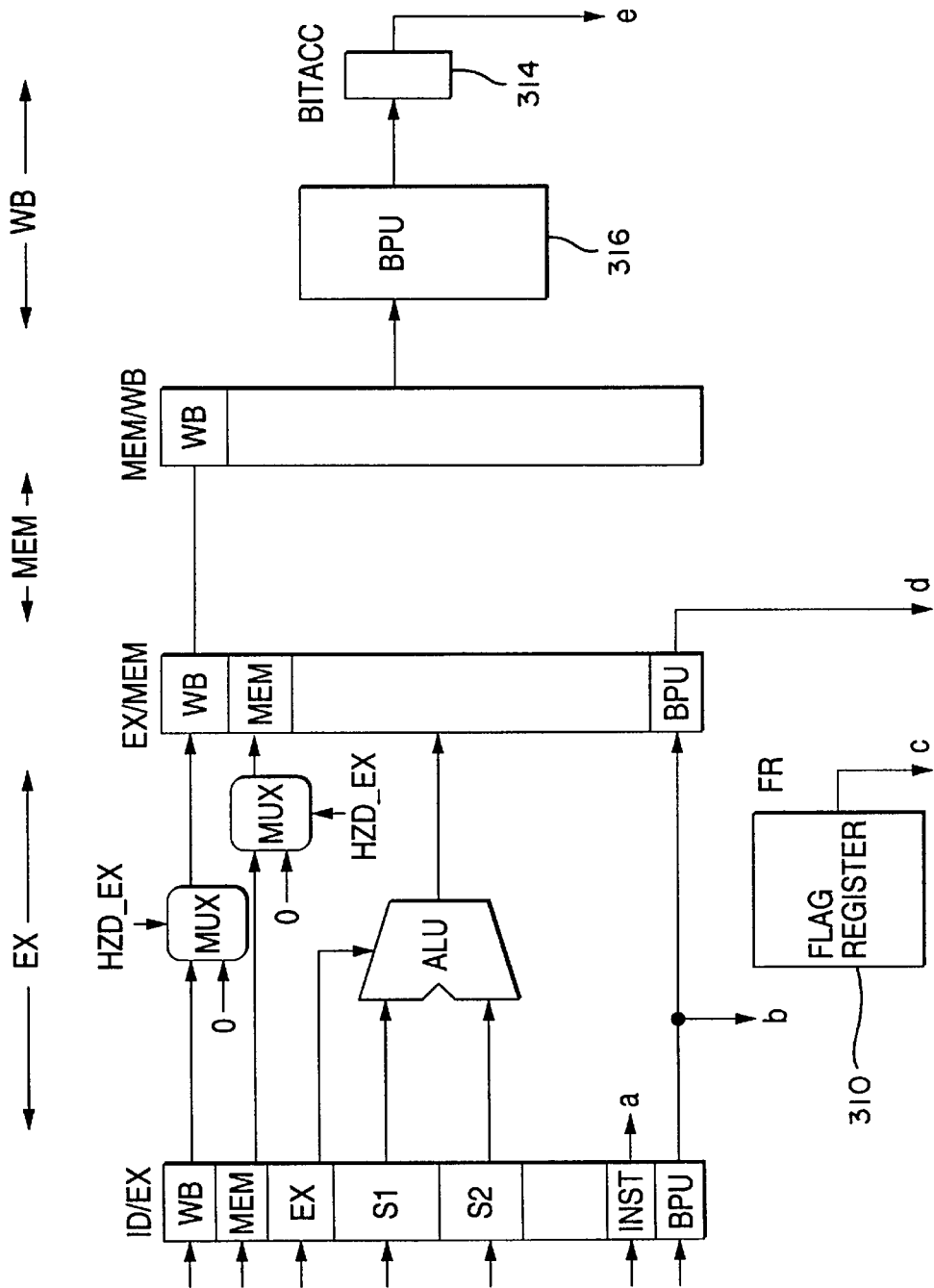
FIG. 50 is a block diagram showing the configuration of third to fifth stages of the programmable controller having the five-stage structure of the present invention.

FIGS. 49 and 50 are block diagrams showing the overall configuration of a programmable controller having a five-stage pipeline structure according to sixth embodiment of the present invention. As is evident from comparison related to structure between an example of a programmable controller as shown in FIG. 35 and the programmable controller of the present invention, the programmable controller of the present invention is additionally provided with a flag register FR 310 and a hazard detecting unit HDU 312. The hazard detecting unit HDU 312 determines instruction execution conditions on he basis of the value of a flag BITACC which is updated by a forced execution flag EXEFLG and an error flag ERRCNTR in the flag register FR 310 and a bit processing instruction execution unit BPU 316. If the instruction execution conditions are not satisfied, one is output to a hazard signal HZD_EX.

Figure 51:
FIGS. 51(a)–51(c) provide an explanatory illustration showing a pipeline stage of the programmable controller of the present invention.
Figure 51:
Figure 51:
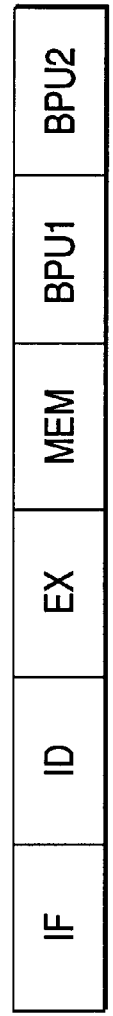

For example, the programmable controller having the five-stage pipeline structure of the present invention carries out one instruction after having divided it into five pipeline stages, namely, IF: Instruction fetch, ID: Instruction decode, Register fetch, EX: Arithmetic and logic operations, Data address calculations, and Calculation of a target branch, MEM: Memory access (read/write operations), and WB: Branching operations, and register write operations, as shown in FIG. 51(a). In addition to such an instruction, the programmable controller requires a "bit processing instruction" for referring to or updating the value of one bit included in one word of the data memory. The bit processing instruction includes various type of instructions. Some instructions are used to update a register BITACC (bit accumulator) provided in the programmable controller depending on the state of a certain bit included in one word read from the data memory, or some instructions are used to update the value of a certain one bit included in the data memory as well as the BITACC 314. FIGS. 51(b) and 51(c) show the pipeline stage of the bit processing instruction and the updating of the flag BITACC. As shown in the drawings, a BPU stage is exist in the place corresponding to a WB stage in which an instruction other than the bit processing instruction writes a value into a register. In the BPU stage, the updating of the BITACC 314 by means of a value read from the data memory in the MEM stage, the updating of the value of one bit included in the data memory, arid writing operations with respect to the data memory, or the like, are carried out. There are various types of bit processing instructions, and the number of required BPU stages changes depending on the instruction, as FIGS. 51(b) and 51(c). Although the flag BITACC changes from zero to one in the drawing, it may change in a reverse manner.

Of the instructions of the programmable controller, some instructions are not constantly executed but executed only when the instruction execution conditions comprising a plurality of flag values are satisfied. In the embodiment, some instructions are executed when the following conditions are satisfied.

EXEFLG∩(BITACC∪ERRCNTRL)=1

In the expression, EXEFLG is a forced execution flag, and ERRCNTRL is an error flag. These flags are included in the flag register FR 310 in the circuit together with other flags. The BITACC 314 is a flag updated by the bit processing instruction. FIGS. 49 and 50 show the programmable controller of the present embodiment which has the function of executing a specific instruction only when these flags satisfy the above described instruction execution conditions.

An instruction word fetched from the instruction memory IM in the IF stage is stored in the instruction register IR provided in a pipeline register IF/ID. The thus stored instruction word is decoded in the decoder block DC of the ID stage, and the result of the decoding operation is written into a pipeline register ID/EX. If the decoded instruction is a bit processing instruction, one is written into the control signal BPU provided in the pipeline register. This control signal BPU is sequentially transferred through the pipeline registers ID/EX and EX/MEM. These control signals are output to the hazard detecting block HDU 312. The hazard detecting block HDU 312 generates hazard signals HZD_PC, HZD_ID, and HZD_EX. The hazard signal HZD_PC suspends the increment of a program counter PC, and the hazard signal invalidates memory access and register write operations of all the results of the decoding operation carried out in the ID stage. The signal HZD_EX invalidates the memory access and register write operations of all the results of the decoding operation carried out in the EX stage.

An INST signal of the pipeline register ID/EX shown in FIGS. 49 and 50 shows that the execution or invalidation of the current instruction depends on the instruction execution conditions. If it turns out that an instruction in the EX stage is an instruction for controlling executing and invalidating operations, the hazard detecting unit HDU 312 determines the instruction execution conditions on the basis of the value of the flag BITACC which is updated by the forced execution flag EXEFLG and the error flag ERRCNTR in the flag register FR 310 and the bit processing instruction execution unit BPU. If the instruction execution conditions are not satisfied, one is output to the hazard signal HZD_EX. If the hazard signal HZD_EX is one, the signal for controlling the updating of external memory and the register file RF is overwritten with a value representing that "an updating operation is not carried out". Even if any operations are performed in the EX and MEM stages, the results of the operations are not retained, which eventually results in prevention of execution of the instructions.

Figure 52:
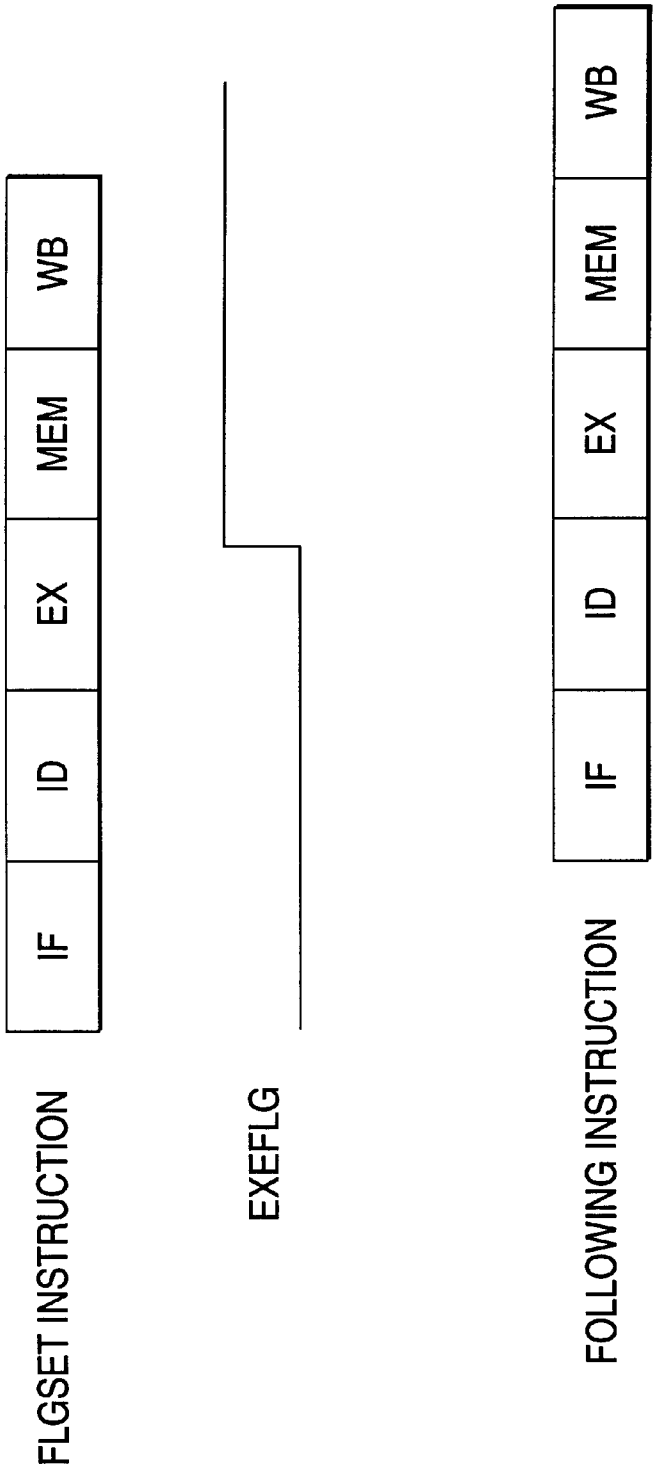
FIG. 52 is a timing chart showing the operation of the programmable controller.

An explanation will now be given of the case where an instruction for changing the instruction execution conditions is provided immediately before an instruction which is executed or invalidated depending on the instruction execution conditions. Of the flags that constitute the instruction execution conditions, the forced execution flag EXEFLG and the error flag ERRCNTRL are updated by the FLGSET instruction. In the embodiment, the FLGSET instruction updates the flag in the EX stage in which the instruction is currently executed. Even if the instruction which is executed or invalidated depending on the instruction execution conditions is placed immediately after the FLGSET instruction, the execution conditions are already determined when the following instruction is executed. As a result, it becomes possible to execute the instruction while consistently controlling a determination as to whether the instruction is executed or invalidated. FIG. 52 is a timing chart which shows the above described operations.

The error flag ERRCNTRL is updated not only by the FLGSET instruction but also by another instruction such as an arithmetic operation instruction, e.g., division, or a BCD code conversion instruction. For example, in the case of the division of a value by zero, or in the case of a value outside the area of the BCD code, the operation is handled as an error. For an instruction which updates the error flag ERRCNTRL other than the FLGSET instruction, the immediately following instruction updates the error flag ERRCNTRL before the execution of the EX stage is initiated. As a result, it becomes possible to execute the following instruction while consistently controlling a determination as to whether the instruction is executed or invalidated.

Figure 53:
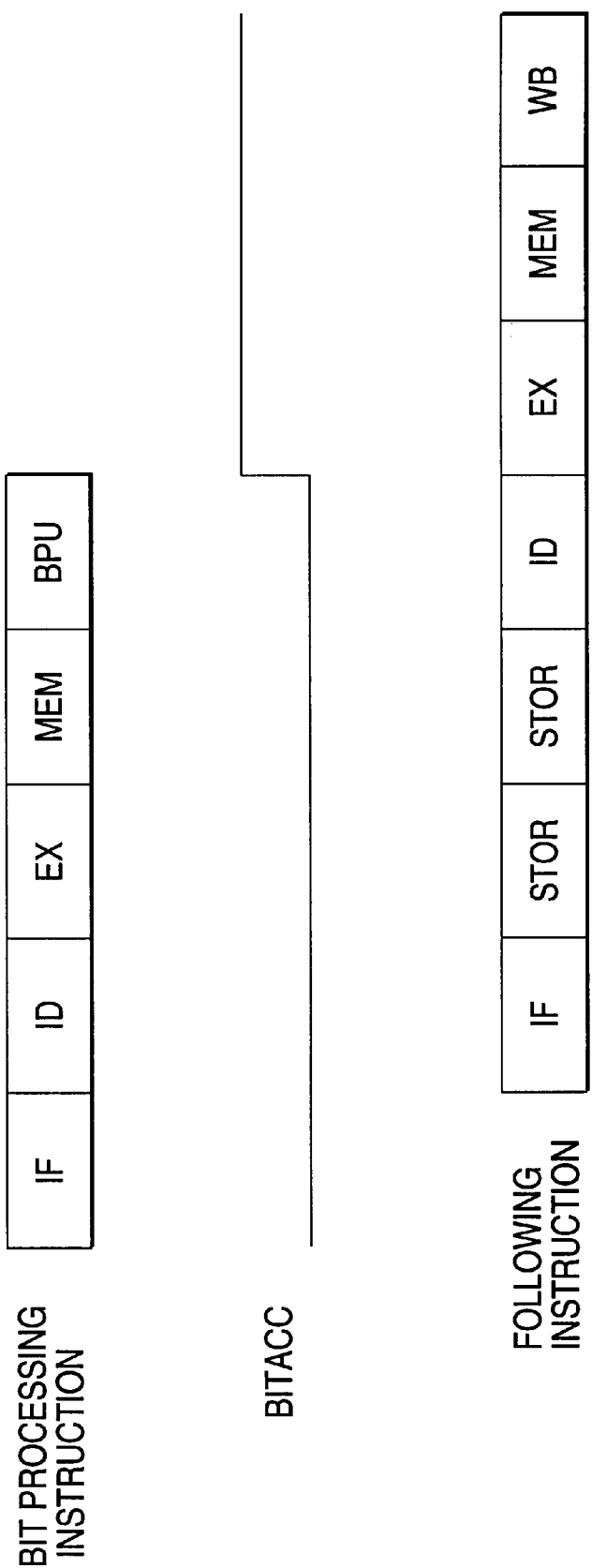
FIG. 53 is a timing chart showing the operation of the programmable controller.

The flag BITACC of all the flags constituting the instruction execution conditions is updated when the BPU stage of the bit processing instruction is completed. Therefore, if the instruction that is executed or invalidated depending on the instruction execution conditions is placed immediately after the bit processing instruction, the EX stage for the following instruction is executed before the bit processing instruction updates the flag BITACC, which in turn makes it impossible to control a determination as to whether the instruction is executed or invalidated. To prevent this problem, if the bit processing instruction for updating the flag BITACC is placed before the instruction that is executed or invalidated depending on the instruction execution conditions as shown in FIG. 53, the programmable controller enters a wait state when the instruction which is executed or invalidated depending on the instruction execution conditions is executed, so as not to execute the EX stage for the instruction that is executed or invalidated depending on the instruction execution conditions until the flag BITACC is updated and the instruction execution conditions are determined. By virtue of this function, even if the instruction that is executed or invalidated depending on the instruction execution conditions is placed immediately after the bit processing instruction for updating the flag BITACC, it becomes possible to consistently control a determination as to whether the instruction is executed or invalidated.

The feature of the present invention will now be described with reference to block diagrams shown in FIGS. 49 and 50. A control signal BPU showing that the current instruction is a bit processing instruction for updating the flag BITACC is provided in the pipeline registers ID/EX and EX/MEM. If it turns out that the instruction of the ID stage is an instruction which is executed or invalidated depending on the instruction execution conditions as a result of the decoding of an instruction loaded into the instruction register IR, the hazard detecting unit HDU 312 examines the control signal BPU in the pipeline registers ID/EX and EX/MEM. If there is the bit processing instruction for updating the BITACC 314 in either the EX or MEM stage of the pipeline, one is output to the hazard signals HZD_PC and HZD_ID. If the hazard signal HZD_PC is one, the result of the decoding of the instruction in the ID stage is overwritten with the value representing that nothing is executed (i.e., zero in the drawing) by means of the multiplexer MUX 318. It is possible to suspend the execution of a specific instruction in the ID stage by issuing these two hazard signals. The suspended instruction is resumed by overwriting the hazard signals HZD_PC and HZD_ID with zero when the bit processing instruction for updating the flag BITACC disappears from the EX and MEM stages of the pipeline.

Seventh Embodiment

The programmable controller having the five-stage pipeline structure carries out one instruction after having divided it into five pipeline stages, namely, IF: Instruction fetch, ID: Instruction decode, Register fetch, EX: Arithmetic and logic operations, Data address calculations, and Calculation of a target branch, MEM: Memory access (read/write operations), and WB: Branching operations, and register write operations. In addition to such an instruction, the programmable controller requires a "bit processing instruction" for referring to or updating the value of one bit included in one word of the data memory. The bit processing instruction includes various type of instruction. Some instructions are used to update a register BITACC (bit accumulator) within the programmable controller depending on the state of a certain bit included in one word read from the data memory, or some instructions are used to update the value of a certain one bit included in the data memory as well as the BITACC.

The programmable controller is suspended for various reasons such as the execution of a stop instruction, the occurrence of interruption, or the occurrence of operation failures. The state of the programmable controller after it has been suspended, e.g., the value of the program counter PC, depends on the stop conditions. If the programmable controller having a five-stage pipeline structure is suspended as a result of execution of a stop instruction, another instruction following the stop instruction has already been introduced into the pipeline stage when the decoding of the stop instruction is completed. It is also possible to think that several instructions will further be introduced into the pipeline stage before the programmable controller is actually suspended. In such a case, the value of the program counter PC obtained after the programmable controller has been suspended is not necessarily the same as a desired value described in specifications. As a result, the state of the programmable controller when it is suspended becomes different from such a desired state as described in the specifications. If another instruction following the instruction that satisfied the stop conditions has already been introduced into the pipeline register, the instruction which should not be executed will be executed.

Figure 54:
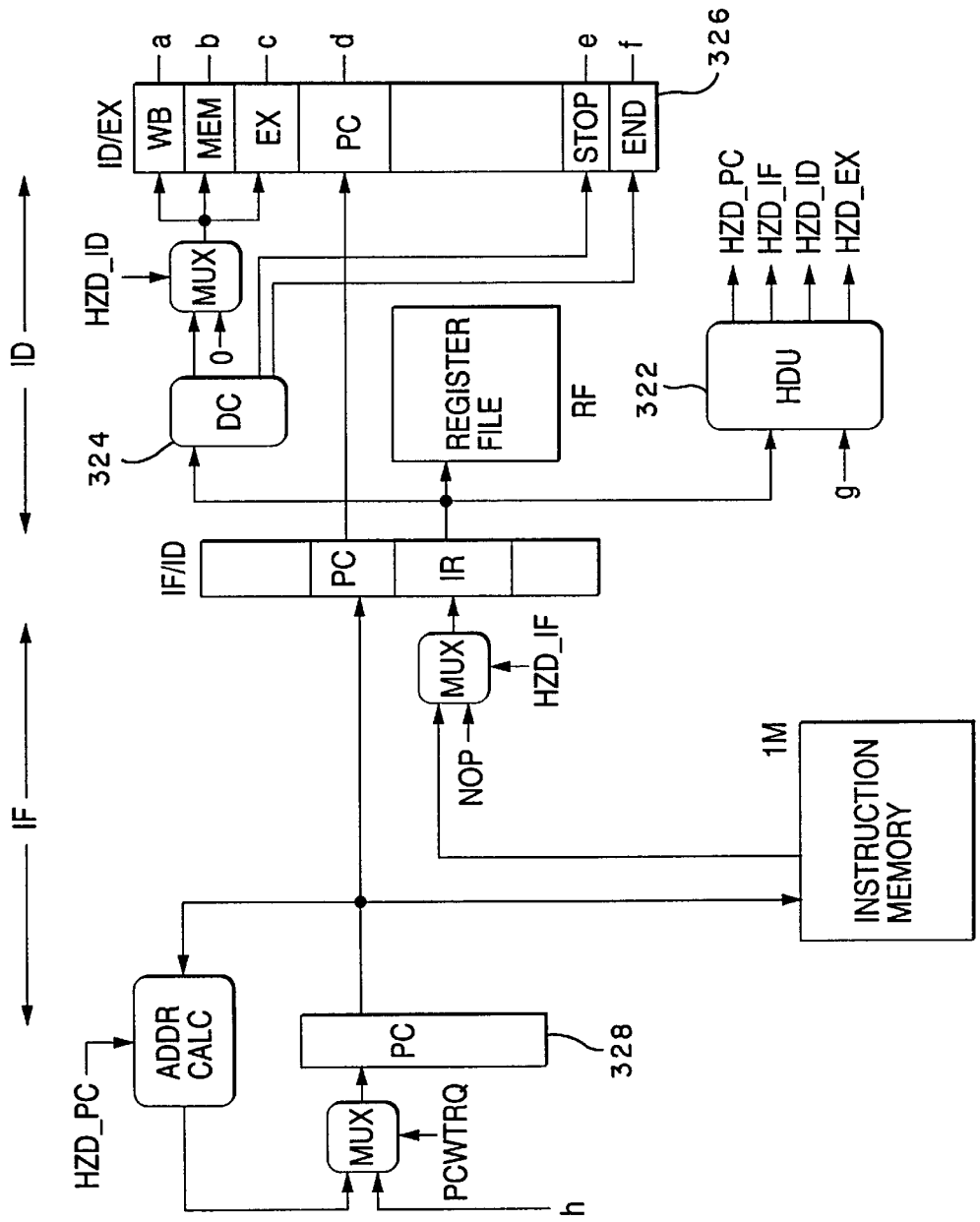
FIG. 54 is a block diagram showing the configuration of first and second stages of a programmable controller having a five-stage pipeline structure of a seventh embodiment of the present invention.
Figure 55:
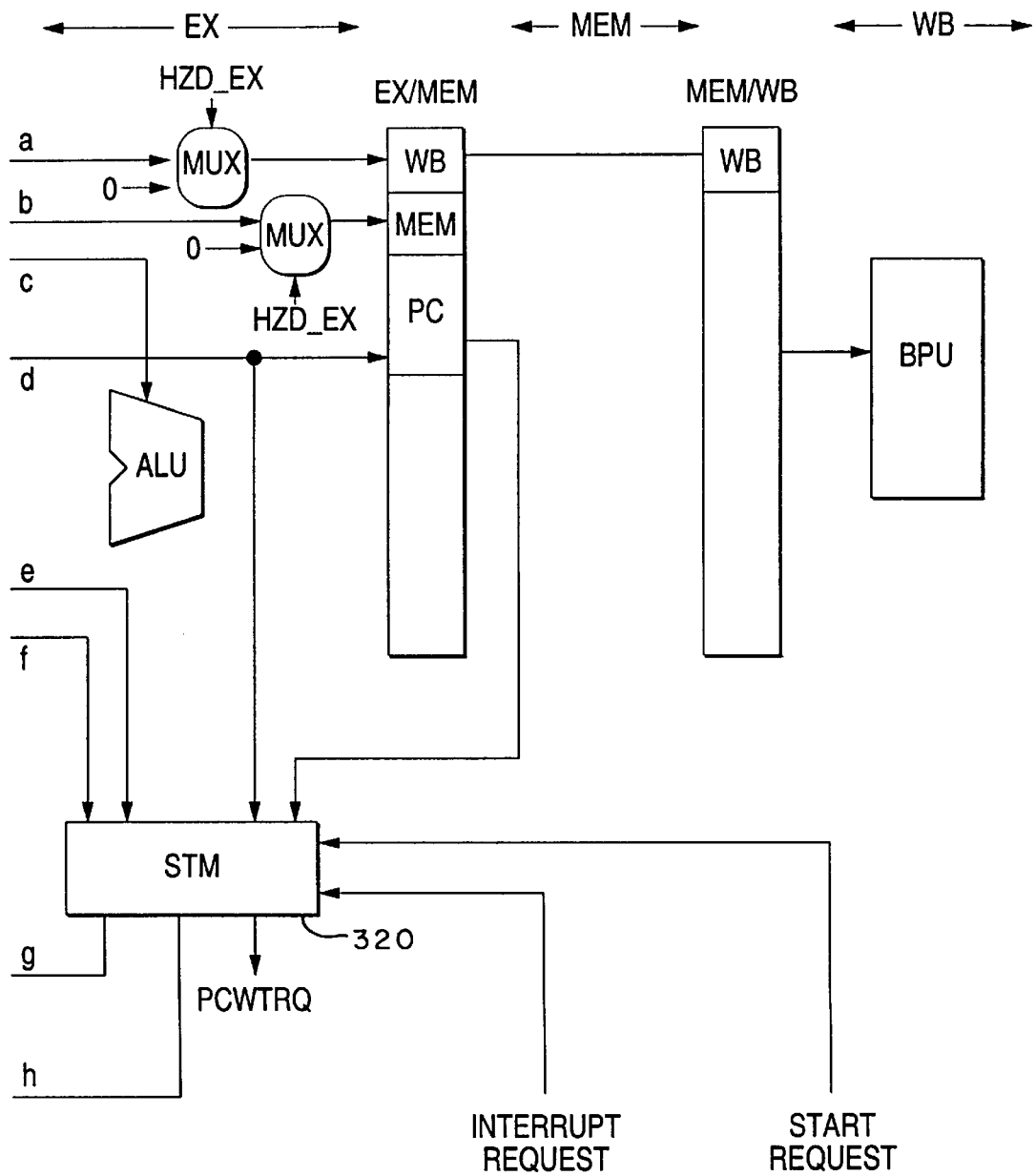
FIG. 55 is a block diagram showing the configuration of third through fifth stages of the programmable controller having the five-stage pipeline structure of the present invention.

FIGS. 54 and 55 are block diagrams showing the overall configuration of a programmable controller having a five-stage pipeline structure according to seventh embodiment of the present invention. Lines designated by a–h in the drawings are connected to corresponding elements. As is evident from comparison related to structure between the programmable controller shown in FIG. 35 and the programmable controller of the present invention, the programmable controller of the present invention is additionally provided with a state machine STM 320 for controlling the start/stop operations of the programmable controller and a hazard detecting unit HDU 322 for preventing execution of an invalid instruction.

Assume that the programmable controller of the present invention is suspended in the following cases:

(a) At the time of execution of a stop instruction:

The programmable controller is suspended when the stop instruction is executed. The value of the programmable counter PC obtained after the programmable controller has been suspended becomes the address of the stop instruction itself.

(b) At the time of generation of an interrupt request signal:

The programmable controller is not suspended before execution of an instruction designated by "a stop mark" which first appears after the interrupt request signal has been generated. The value of the program counter PC obtained after the programmable controller has been completed becomes the address of another instruction which follows the "instruction having the stop mark" that caused the suspension of the programmable controller.

In the programmable controller of the present embodiment, a bit provided at a specific position in the overall instruction is used as the "stop mark". Only the instruction having the bit set to "1" becomes an instruction which suspends the programmable controller when an interrupt request signal is generated.

FIGS. 54 and 55 are block diagrams of the programmable controller of the present embodiment that fulfills the previously described stop specifications. Only the circuit blocks relevant to the embodiment of the present invention are illustrated in the drawings. STM 320 shown in the drawings designates a state machine which controls the start/stop operations of the programmable controller. The state machine STM 320 receives control signals STOP and END in order to know the execution of a stop instruction and a stop mark, as well as receiving a start request signal and an interrupt request signal. The control signals will now be described. An instruction word fetched from instruction memory IM in the IF stage is stored in an instruction register IR in the pipeline register IF/ID. The instruction word is decoded by a decoder block DC 324 in a DC stage, and the result of the decoding of the instruction word is written into a pipeline register ID/EX 326. If the decoded instruction is a stop instruction, one is written into the control signal STOP provided in the pipeline register ID/EX. Further, to execute the instruction designated by a stop mark, the instruction is decoded, and one is written into the control signal END provided in the pipeline register ID/EX 326 which shows that the instruction is provided with the stop mark. On the basis of these control signals STOP and END, it is possible for the state machine STM 320 to know that the stop instruction and the instruction with the stop mark have been executed.

The value of the program counter PC 328 that represents the address of the instruction memory IM is input to the pipeline register IF/ID. The value is sequentially then transferred to the ID/EX 326 and EX/MEM pipeline registers, so that it can be used in calculating the value of the program counter PC when the programmable controller is suspended. The state machine STM 320 calculates the value of the program counter PC 328 when the programmable controller is suspended from the value of the program counter PC 328 provided in the pipeline register ID/EX 326 or EX/MEM, the value of the pipeline register ID/EX 326 that represents the result of the decoding of the instruction, and an interrupt request signal which becomes one of the stop conditions. The thus calculated value is written into the program counter PC 328 before the programmable controller is suspended. A conceivable method of storing the value of the program counter comprises the steps of storing the value of the program counter obtained when the instruction was loaded into a stack, and fetching the value from the stack when the programmable controller is suspended. This method results in more complicated control. Further, the value of the program counter PC 328 is transferred through the pipeline register for use as a branch instruction. For these reasons, the value of the program counter provided in the pipeline register ID/EX 326 or EX/MEM is transferred to the state machine STM 320. The value is then written back into the program counter PC 328 in accordance with the stop specifications.

The state machine STM 320 sends a hazard signal generation request signal to the hazard detecting unit HDU 322 as required, whereby a hazard signal is generated. As a result, the execution of the instruction is invalidated, and it becomes possible to execute an invalid instruction while the programmable controller is in suspend mode. The hazard detecting unit HDU 322 generates hazard signals HZD_PC, HZD_IF, HZD_ID, and HZD_EX. Among these signals, the signal HZD_PC suspends the increment of the program counter PC 328, and the signal HZD IF invalidates the fetching of an instruction in the IF stage. The signal HZD_ID invalidates memory access and register write operations of all the results of the decoding operation carried out in the ID stage. The signal HZD_EX invalidates the memory access and register write operations of all the results of the decoding carried out in the EX stage.

Figure 56:
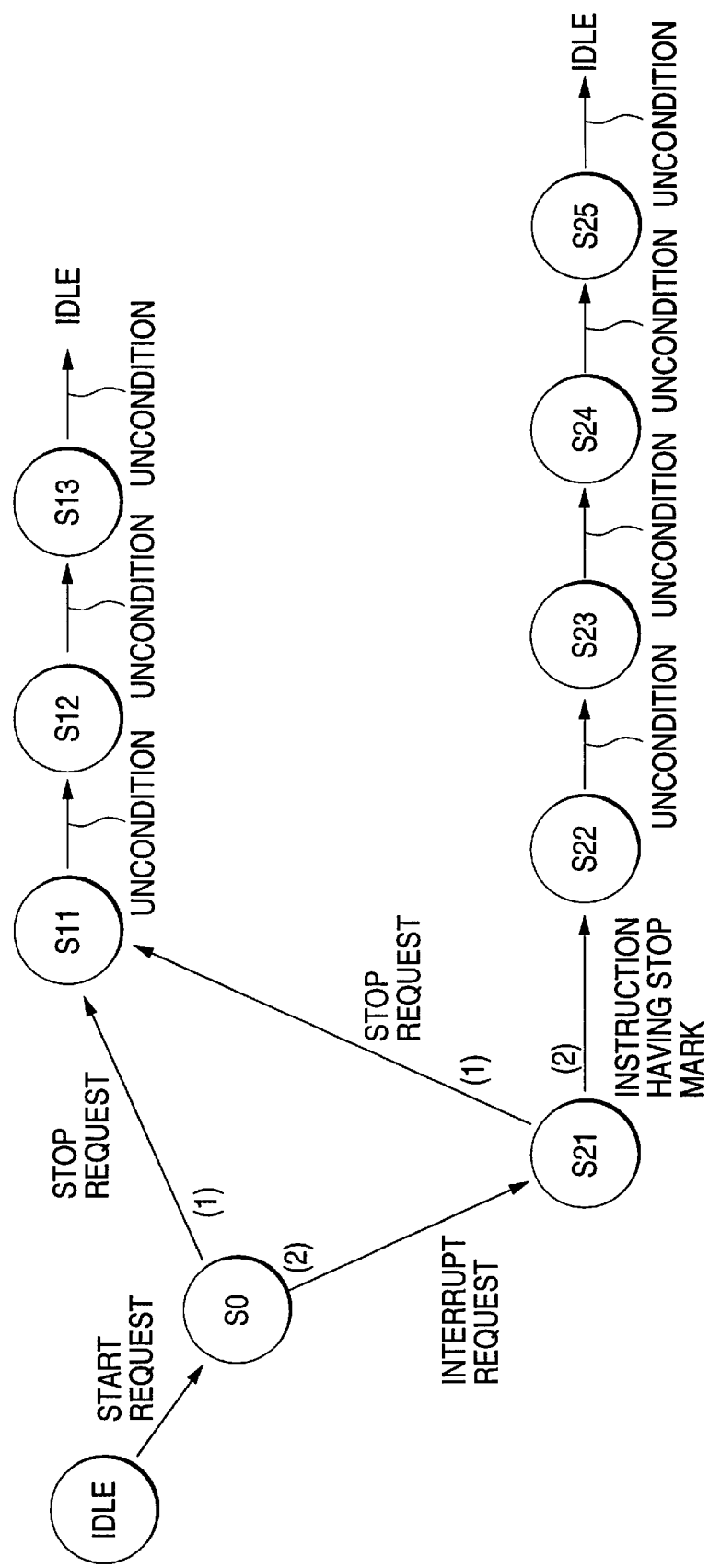
FIG. 56 is a schematic representation showing the transition of the state of a state machine of the present invention.

FIG. 56 shows the transition of the state of the state machine for start/stop control purposes. The state machine changes to an IDLE state when the programmable controller is rest or the power of the programmable controller is turned on. When a start request signal for the programmable controller is input to the state machine, the state machine changes from the IDLE state to S0. As a result, the programmable controller starts the execution of the instruction. If the state of the state machine is S0, the programmable controller continues the execution of the instruction just as it does. If the stop instruction is executed, the state of the state machine changes from S0 to S11. Thereafter, the state machine sequentially changes to S12 and S13. Required stop operations are executed during the transition of the state of the state machine, and the programmable controller is then suspended. The state of the state machine also changes to the IDLE state.

If the interrupt request signal is generated when the state of the state machine currently being executing the instruction is S0, the state of the state machine changes from S0 to S21. As a result, the programmable controller waits for execution of an instruction having a stop mark while executing instructions. If the instruction having the stop mark is executed when the state of the state machine is S21, the state of the state machine changes from S21 to S22, S23, S24, and S25. The required stop operations are executed during the transition of the state of the state machine, and the state of the state machine then changes to the IDLE state, whereby the programmable controller is suspended. If the stop instruction is executed while the state of the state machine is S21 and while the programmable controller waits for an instruction with a stop mark, the state of the state machine changes from S21 to S11. As a result, the state of the state machine changes to stop operations carried out when the stop instruction is executed. If the state machine is possible to change to a plurality of states as it is in S0 or S21, priorities in which the state of the state machine shifts are previously determined like priorities (1) and (2) shown in FIG. 56. If the execution of the stop instruction and the generation of the interrupt request signal occur simultaneously when the instruction is executed in state S0, the state of the state machine changes to S11. Further, the operation changes to the suspending operations at the time of execution of the stop instruction.

Figure 57:
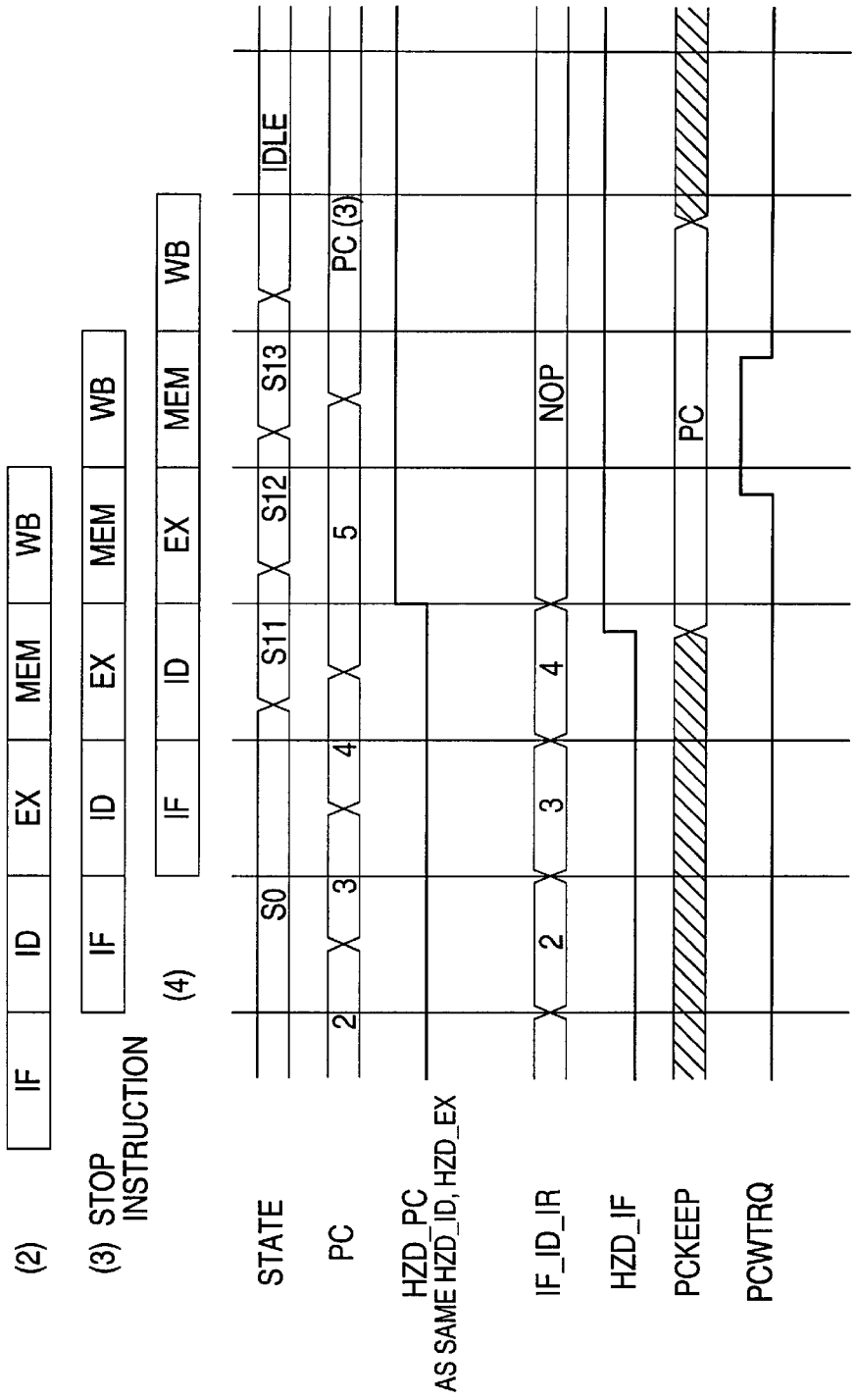
FIG. 57 is a timing chart showing the operation of the programmable controller when it carries out a stop instruction.
Figure 58:
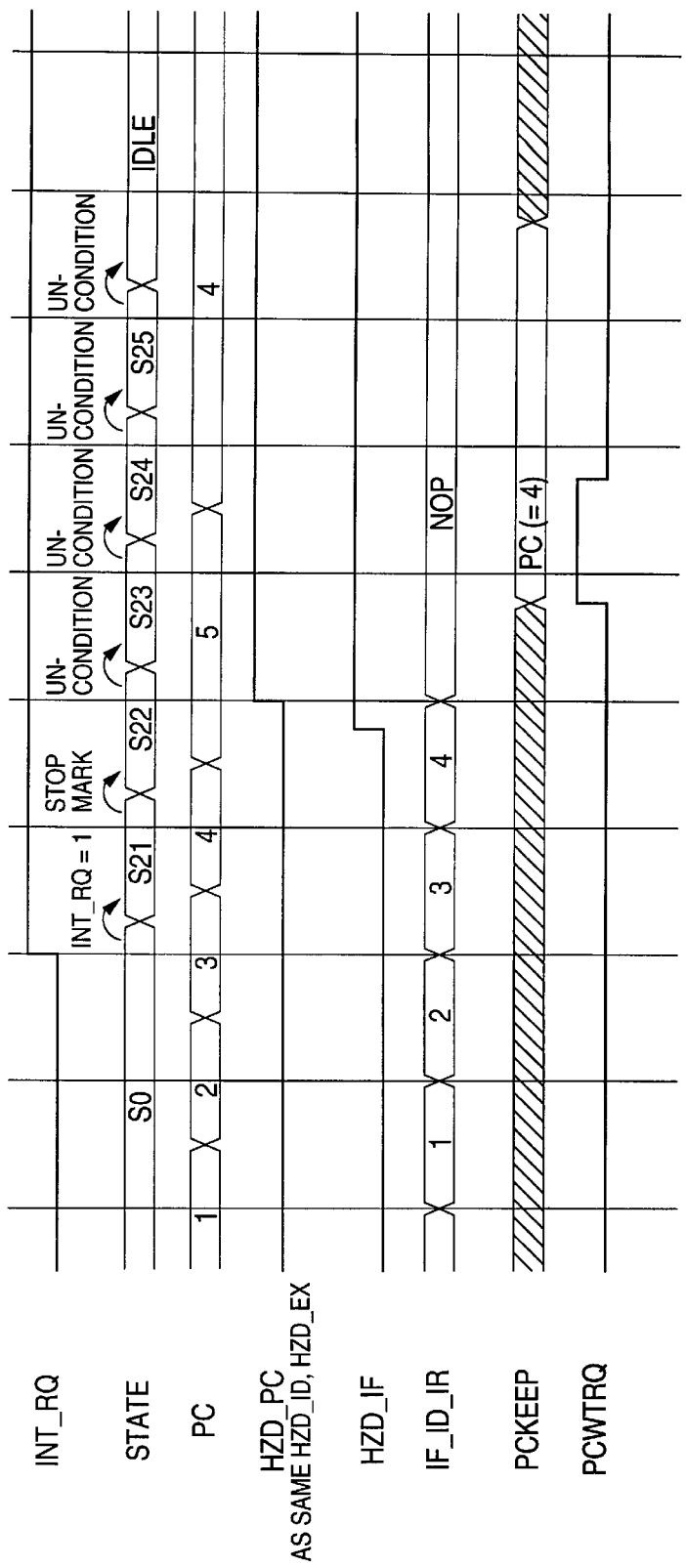
FIG. 58 is a timing chart showing the operation of the programmable controller when it carries out a stop instruction.

FIGS. 57 and 58 are timing charts showing the suspending operations of the programmable controller of the embodiment. FIG. 57 shows suspending operations at the time of execution of the stop instruction based on the assumption that the stop instruction is stored in the instruction memory IM at address 3. In FIG. 57, STATE designates the state of the state machine for start/stop control purposes, and PC KEEP designates a register for temporarily storing the program counter PC which is present in the state machine when the programmable controller is in suspend mode. PCWTRQ designates a control signal used when the state machine writes a value into the program counter PC. IF_ID_IR designates an instruction register for fetching an instruction existing in the pipeline register IF/ID. HZD_PC designates a hazard signal for suspending the increment of the program counter PC, and HZD_IF designates a hazard signal for overwriting the instruction fetched from the instruction memory IM with NOP instructions (i.e., No Operation Instructions).

When the stop instruction is executed, that instruction is decoded, and one is written into the control signal STOP representing that a corresponding instruction in the pipeline register ID/EX is a stop instruction. The state machine for start/stop control purposes changes from S0 to S11 when the value of the control signal STOP provided in the pipeline register ID/EX is one. Subsequently, the state machine unconditionally changes to S12, S13 and IDLE. When the state of the state machine is S11, the value of the program counter PC in the pipeline register ID/EX is written into the PCKEEP. When the state is S12, the value of the PCKEEP is written into the program counter PC. The thus written value designates the address of the stop instruction.

FIG. 58 shows the suspending operations when the programmable controller is suspended according to the interrupt request signal. Assume that an instruction having a stop mark is stored in the instruction memory at address 3, and that an interrupt request signal INT_RQ is issued before this instruction is executed. The respective signals shown in FIG. 58 are the same as those shown in FIG. 57. When the interrupt request signal INT_RQ is input, the state machine for start/stop control purposes changes from S0 to S21, whereby the programmable controller awaits execution of the instruction having the stop mark. To execute the instruction having the stop mark, the instruction is decoded, and one is written into the control signal END on the pipeline register END which shows that the corresponding instruction is provided with the stop mark. The state machine for start/stop control purposes changes from S21 to S22 when the value of the control signal END in the pipeline register ID/EX is one. Subsequently, the state machine unconditionally changes to S23, S24, S25, and IDLE. When the state of the state machine is S23, the value, made by adding one to the value of the program counter PC in the pipeline register EX/MEM, is written into the PCKEEP.

When the state of the state machine is S24, the value of the PCKEEP is written into the program counter PC. The thus written value represents the address of another instruction following the instruction having the stop mark.

Eighth Embodiment

In a programmable controller, if an instruction code of an input program is a sequence instruction, an operation is performed on an address. The indexing of an object to be calculated means that the sum of data of an index register and an immediate value which is a constant and is described in an instruction code, is used as an address of an object to be operated.

Figure 59:
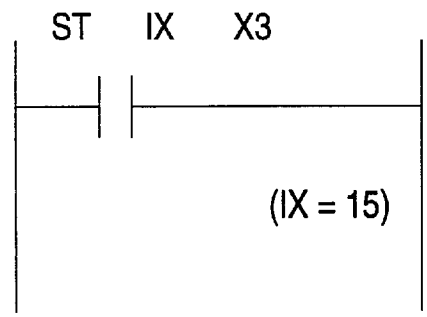
FIGS. 59(a)–59(c) show an example of a sequence instruction and the address of that instruction according to an example of a programmable controller.
Figure 59:
Figure 59:
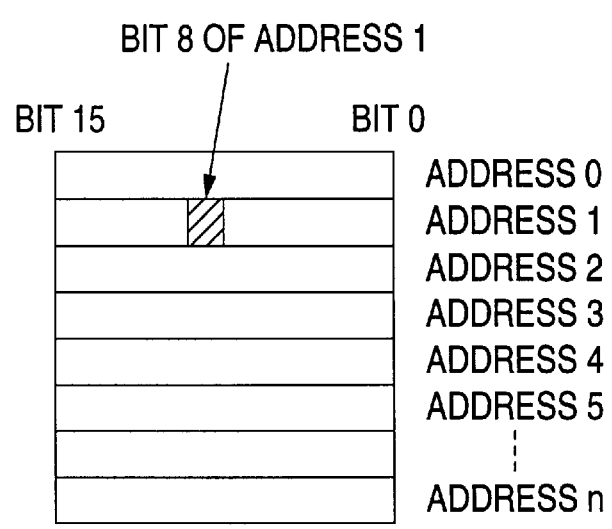

FIGS. 59(a)–(c) show an example of an ST instruction which is one of bit operation instructions and according to which an accumulator (ACC) reads the details of a bit to be operated. Data of an index register (IX) represent fifteen, and an immediate value in an instruction (ode is three. Therefore, a resultant sum of them is eighteen. In the end, an STIXX3 instruction shown in FIG. 59(a) becomes identical with an STX18 instruction shown in FIG. 59(b). A bit 8 in the word data at an address 1 of memory shown in FIG. 59(c) is subjected to operation according to the STX 18 instruction. The accumulator ACC of the hardware reads the details of the bit 8.

Figure 60:
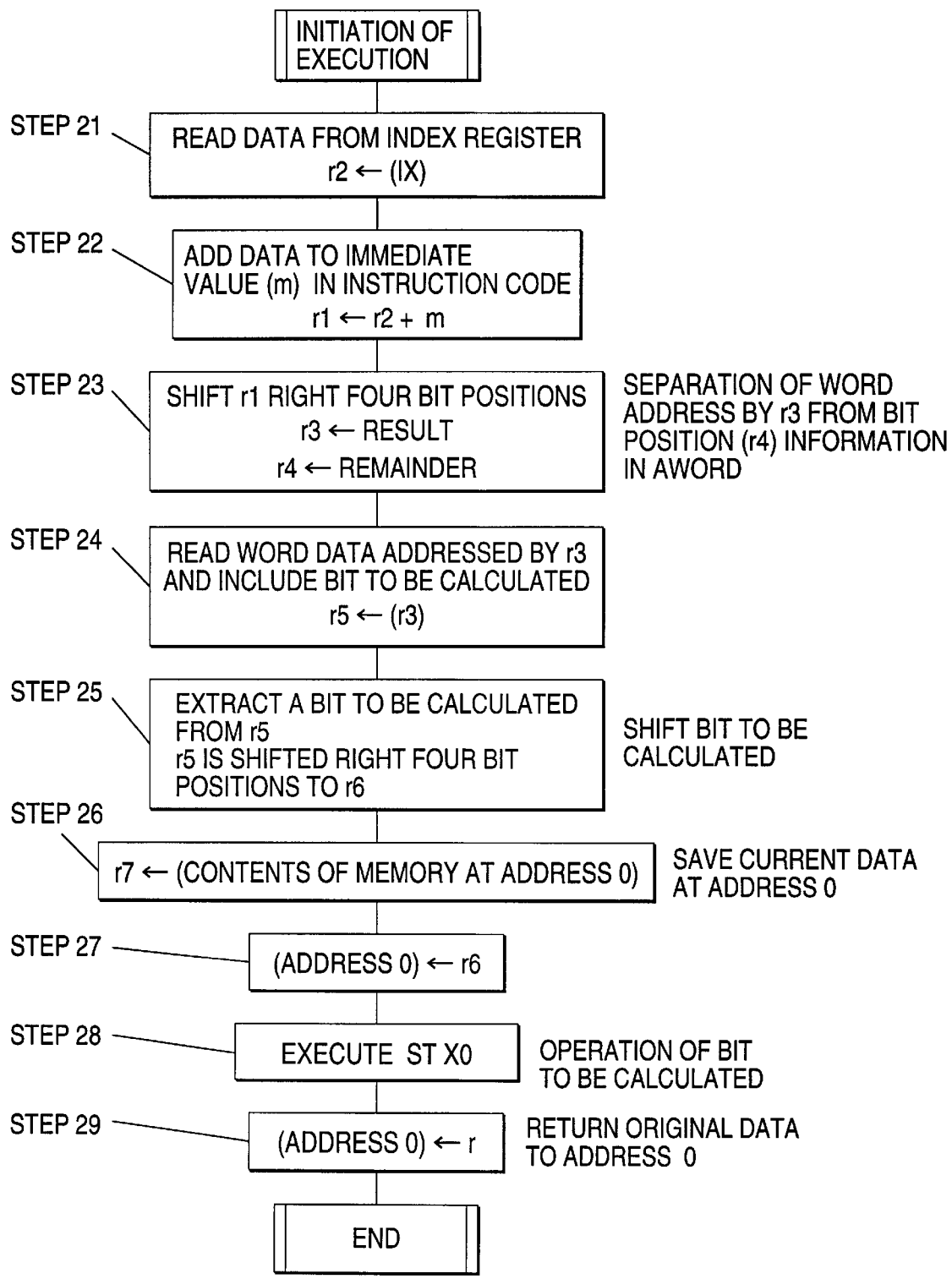
FIG. 60 is a flowchart showing the operation of the sequence instruction shown in FIG. 7.

A processor performs an operation only on data in the memory at the address previously described in the instruction code by the immediate value. As a result, the bit processing can be executed with the hardware. If an indexed instruction is executed by use of such a processor, such an execution sequence as shown in FIG. 60 becomes necessary.

To begin with, data (IX) are read from the index register in step 21, and the thus read data (IX) are input to r2 of general-purpose registers in a register section. Data (r2) of the index register are added to an immediate value (m) of the instruction code, and the resultant sum is input to r1 of the general-purpose registers in step 22. r1 is shifted right four bit positions in order to separate a word address from the bit position in the word in step S23. A "result" which represents a word address and a "remainder" which represents a bit position in the word are input into r3 and r4 of the general-purpose registers, respectively.

Word data including a bit to be operated which is addressed by r3 are read in step 24. The thus read word data are input to r5 of the general registers. The bit to be operated is shifted to bit 0 by shifting the word data of r5 right four bit positions in step 25. The bit to be operated included in r5 is extracted, and the thus extracted bit is input to r6 of the general-purpose registers. In the present example, the extracted bit is transferred to bit 0.

It is necessary to save the original data in step 26, and the current data at address 0 is temporarily transferred to r7. The data of r6 having the bit to be operated transferred to bit 0 is transferred to predetermined address 0 of the memory in step 27. The arrangement for practical bit processing operations is made at last.

STX0 which is a bit processing instruction with regard to bit 0 at address 0 is executed in step 28. Finally, the original data r7 at address 0 are returned to address 0 in step 29, and the execution of the indexed instruction is now completed.

Figure 61:
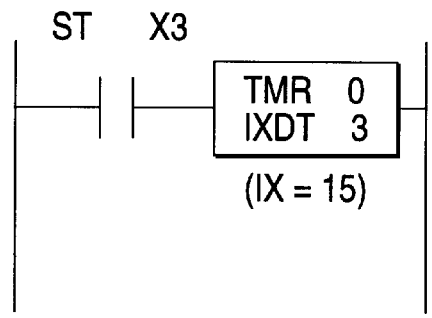
FIGS. 61(a)–61(c) show an example of a timer or counter instruction and the address of that instruction in a preset data area of the programmable controller shown in FIG. 59.
Figure 61:
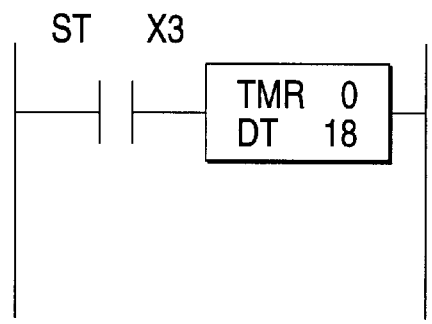
Figure 61:
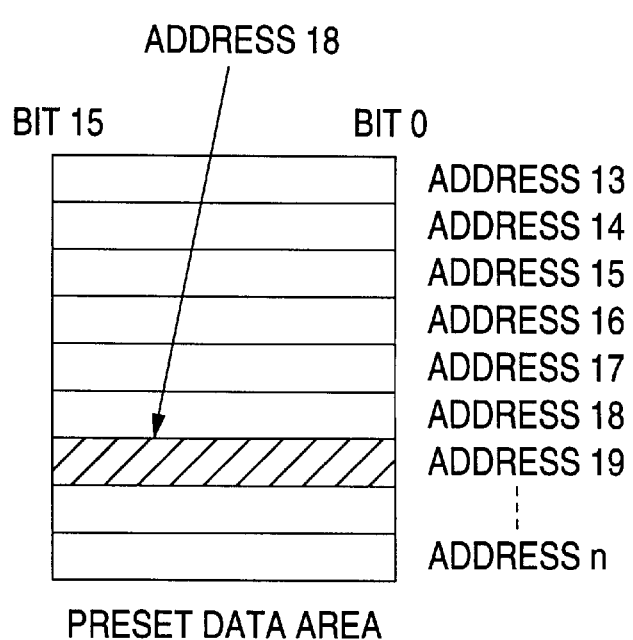

If the instruction code of the input program is a timer or counter instruction, the object to be operated becomes preset data. The indexing of the preset data means that the sum of a value of the index register and an immediate value which is described in the instruction code and is a constant value, is used as an address in a preset value data area. FIG. 61(*a*)–61(*c*) show an example of an TMR instruction. In other words, when input conditions become on, time is counted until the input conditions become off while a value of the designated preset data is used as the initial value of an elapsed value. When the elapsed value becomes 0, a contact point: of the timer is turned on. Here, the index register (IX) is fifteen, and the immediate value in the instruction code is three. Therefore, TMR0 and IXDT3 instructions shown in FIG. 61(*a*) become identical with the TMR0 and DT18 instructions. The TMR instruction is calculated by using word data of the memory address 18 as preset data, and by reading the contents of that word data by means of the hardware, as shown in FIG. 61(*c*).

Figure 62:
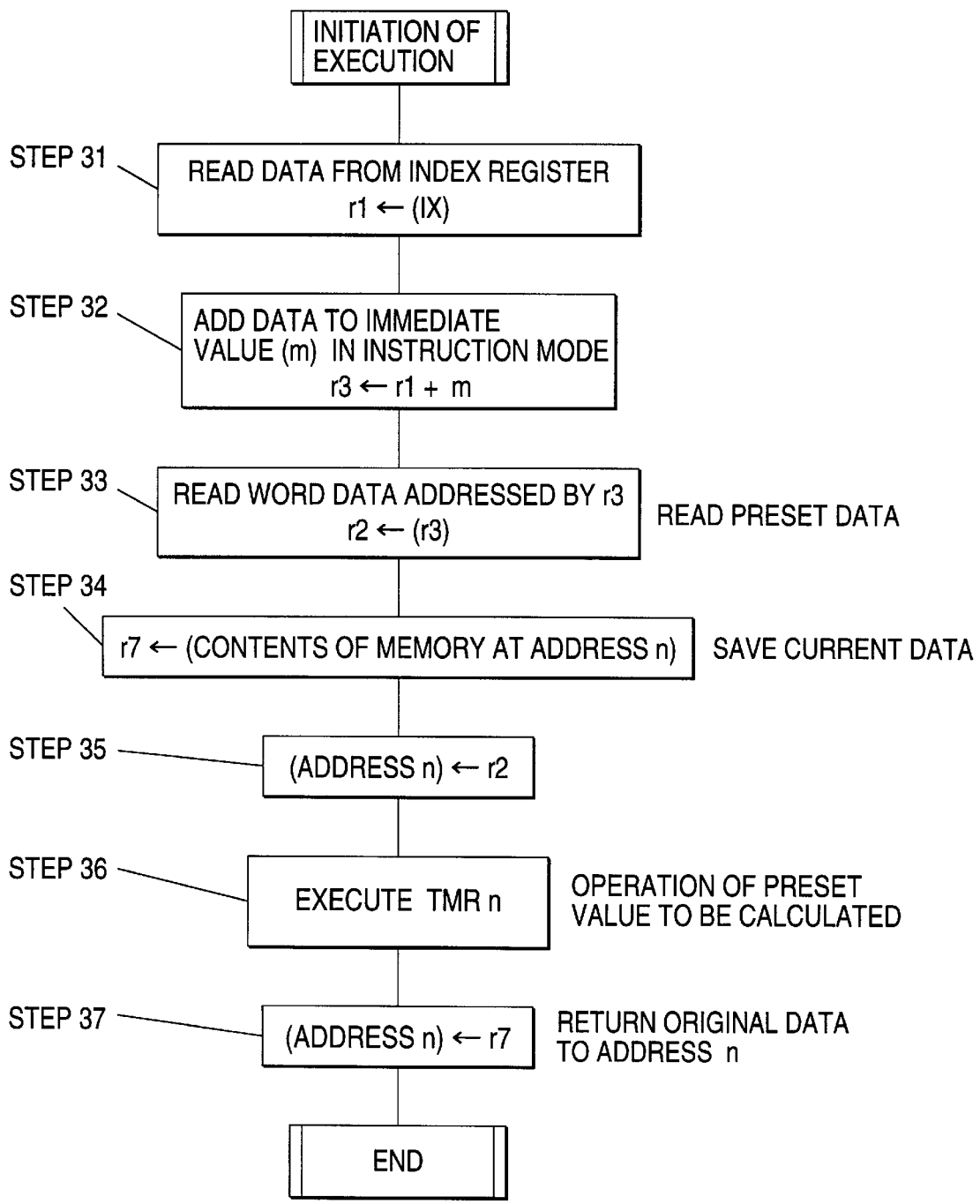
FIG. 62 is a flowchart of the operation of the timer or counter instruction shown in FIG. 59.

In a processor which executes bit processing operations using hardware, the address of the memory at which the preset data are stored is uniquely determined by a timer number or a counter number as a result of execution of the timer or counter instruction. It is possible to calculate only that data as a preset value. If an attempt is made to execute an indexed instruction of the preset data using such a processor, such an execution sequence as shown in FIG. 62 becomes necessary.

To begin with, the data (IX) of the index register are read in step 31, and the thus read data are input to r1 of the general-purpose register provided in the registered section. Data (r1) of the index register and the immediate value (m) in the instruction code are added to each other in step 32. In other words, a memory address in a preset data area which is to be actually operated is calculated, and the calculation result is input to r3 of the general-purpose register. Word data addressed by r3, that is, the preset data, are read in step 33, and the thus read word data are input to r2 of the general-purpose register.

It is necessary to save the original data in step 34, and the preset data at the current address "n" are temporarily transferred to r7. The word data in r2 are temporarily transferred to the address "n" uniquely determined by the timer number or the counter number in step 35. As a result, the arrangement for practical timer or counter instruction is made at last.

In step 36, TMRn which is an operation instruction with respect to the preset value to be operated is executed. Finally, the original data r7 that have been saved are returned to address "n" in step 37. As a result, the execution of the indexed instruction is now completed.

In the above-described conventional programmable controller, when the indexed instruction is executed together with the sequence instruction and the timer or counter instruction, it is possible to obtain a correct result if the indexing instruction is divided into several pieces of instruction, and if the flow of the instructions is executed sequentially.

However, this method requires an increase in the program memory, which in turn results in a slower execution rate.

Figure 63:
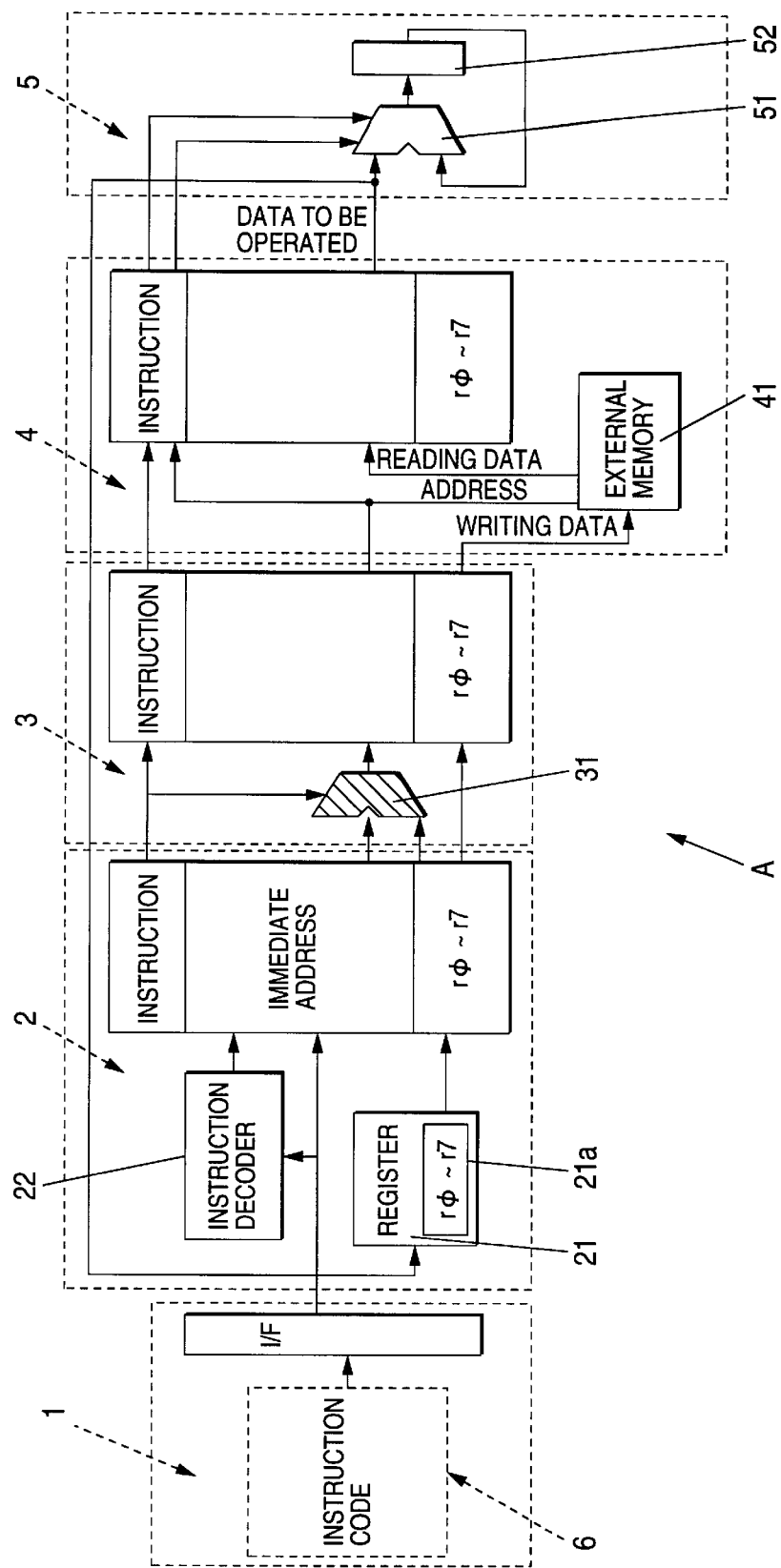
FIG. 63 is a circuit diagram of a programmable controller according to a eighth embodiment of the present invention.
Figure 64:
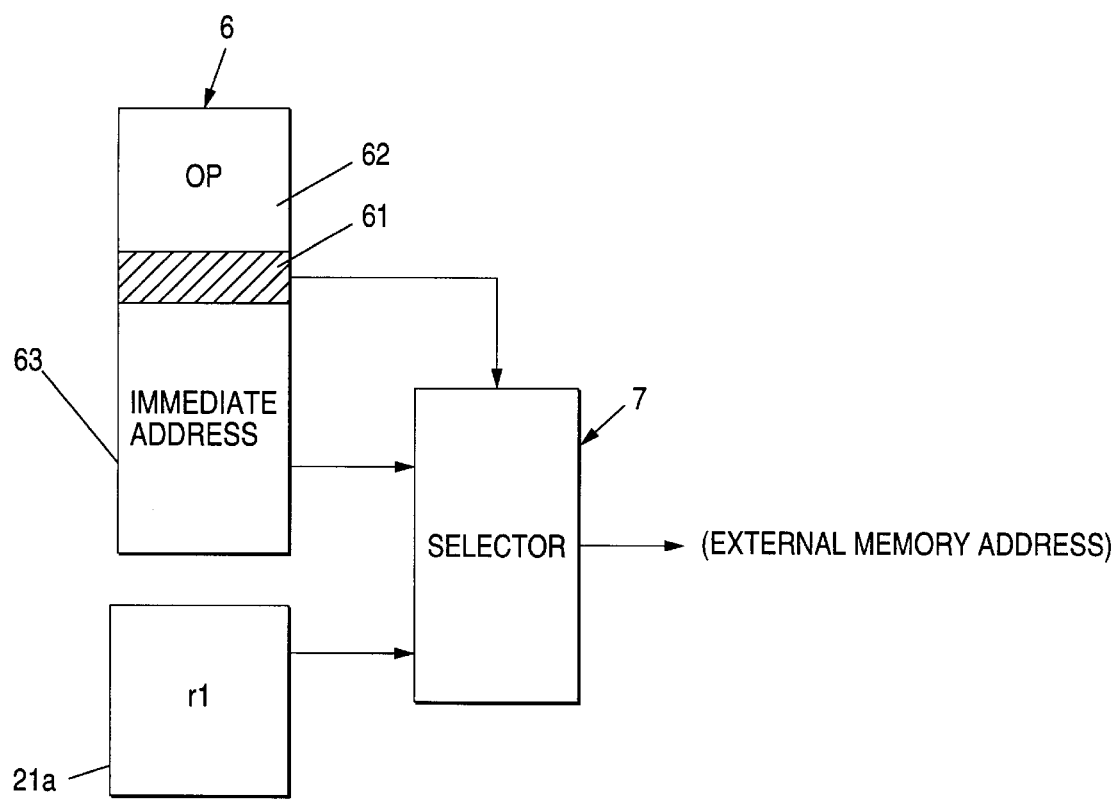
FIG. 64 is a block diagram showing the connection of a selector of the programmable controller shown in FIG. 63.
Figure 65:
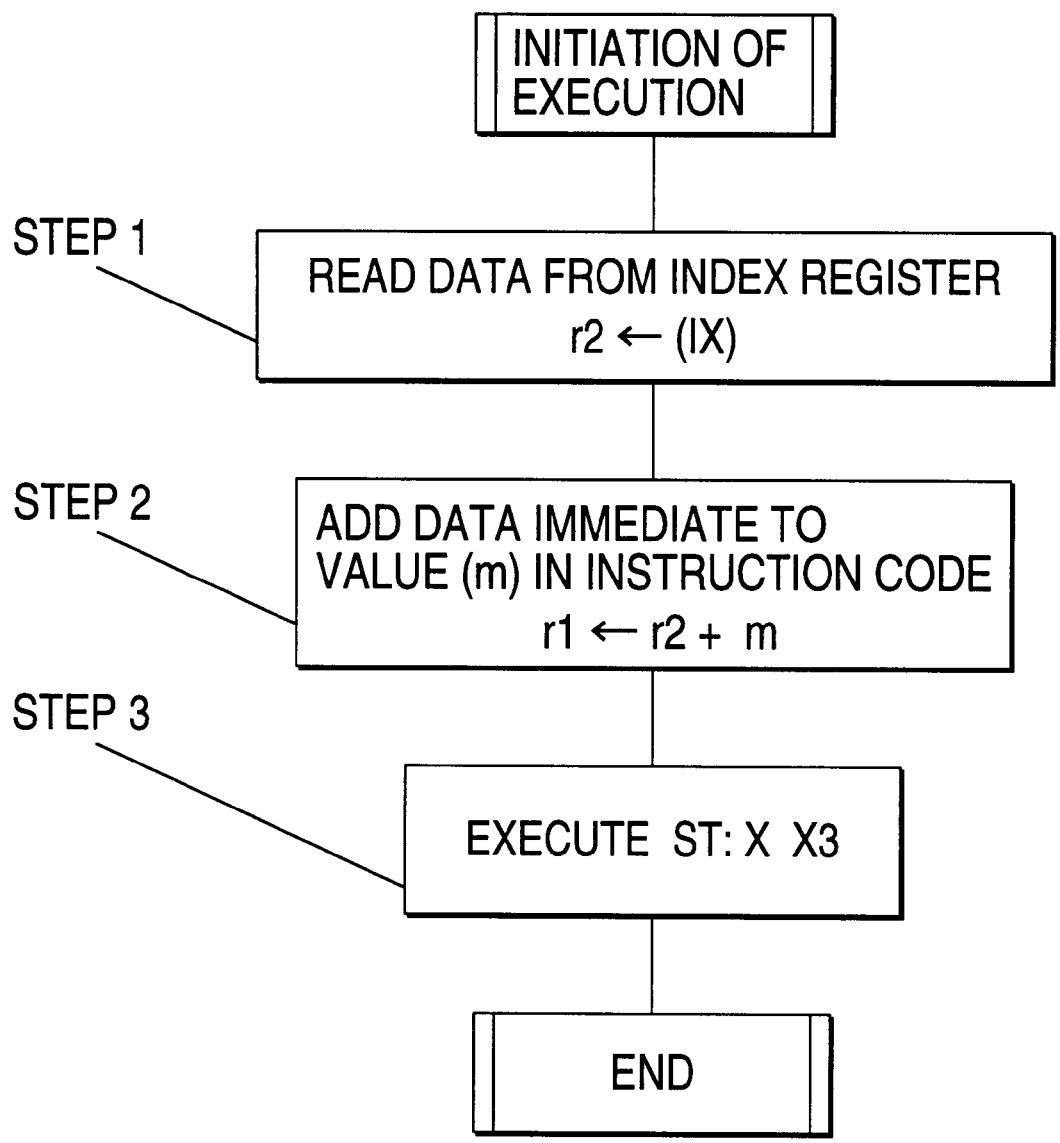
FIG. 65 is a flowchart showing the operation of the programmable controller shown in FIG. 63.

With reference to FIGS. 63 through 65, a programmable controller according to an eighth embodiment of the present invention will be described.

In the drawings, A designates a processor comprising five sections. An instruction code 6 which will be described later executes a sequence instruction addressed by an operation to be executed. Reference numeral 1 designates an instruction fetching section, and the instruction code 6 is input to this instruction fetching section. Reference numeral 2 designates an instruction decoding section which comprises r0 through r7. The instruction decoding section 2 is provided a register group 21 which comprises a general-purpose register 21*a* for reading and writing data and an instruction decoder 22. The instruction decoding section 2 decodes the instruction code 6 input from the instruction fetching section 1 and executes the thus decoded instruction.

Reference numeral 3 designates an address calculation section which is provided with an operating unit (ALU) 31 consisting of a CPU or the like. The address calculation section 3 calculates the address of an instruction to be executed, on the basis of the instruction code 6 decoded by the instruction decoding section 2. The ALU 31 is provided with a selector 8 for outputting an address if the instruction is an indexed instruction. This selector 7 will be described later in detail.

Reference numeral 4 designates a memory access section which is provided with external memory 41. An address is input to the external memory 41 from the ALU 31, and data are also written into the external memory 41 from the general purpose register 21*a*. The data are read and output from the external memory 41.

Reference numeral 5 designates an operating section which is provided with an operating unit (ALU) 51 consisting of a CPU or the like and a bit accumulator (BACC) 52. The data to be operated are input to the operating section 5 from the memory access section 4 and carries out the writing of data into the general-purpose register 21*a* and bit operations.

The operation of the processor A will now be described. The instruction code 6 is provided with a display flag 61 consisting of one bit, an instruction 62, and an immediate value address 63. The display flag 6 displays the presence or absence of an indexed instruction for indirectly specifying an object to be calculated. When the instruction code 6 is input, an immediate value included in the instruction code 6 is directly output to the external memory 41 via the address calculation section 3 if the instruction is not indexed. The data output from the external memory 41 are input to the ALU 51 of the operating section. A designated operation is executed with respect to a bit to be calculated together with bit position specification data included in the instruction code 6.

In the case where the instruction is indexed, an address calculation sequence will be described with reference to a block diagram shown in FIG. 64. The instruction code 6 is provided with the display flag 61 for displaying whether or not the instruction is the indexed instruction. A flag bit of the display flag 61 and immediate values address data included in the instruction code 6 are input to the selector 7. The selector 7 is connected to the general-purpose register 21*a* provided in the processor. Which of the registers in the general-purpose register 21*a* is connected to the selector 7 is previously determined by the hardware. In this example, an r1 register is connected to the selector 7, and the data of that register are input to the selector 7. If the display flag 61 displays the indexed instruction being included in the instruction code 6, the selector 7 outputs the data of the r1 register to the external memory as an address to be operated. If this is not the case, an immediate value 63 in the instruction code 6 is output. The subsequent operations are the same as the operations of the conventional bit processing instruction.

The sequence of execution of the indexed instruction using hardware will be described on the basis of a flowchart shown in FIG. 65. To begin with, data (IX) of the index register are read in step 1, and the thus read data are input to an r2 register of the general-purpose register 21*a* disposed in the register group 21. The data of the r2 register and the immediate value included in the instruction code 6 are added together in step 2, and an address to be calculated is input to the register r1 of the general-purpose register 21*a*. STIXX3 which is an indexed instruction is executed in step 3.

In this way, the indexed instruction is executed by only reading data from the index register and by setting an operation address calculation value in the register r1 of the general-purpose register 21*a*.

In such a programmable controller according to the eighth embodiment, the display flag 61 which shows the presence or absence of the indexed instruction for indirectly specifying an object to be calculated is provided in the instruction code 6. The selector 7 connected to the general-purpose register 21*a* executes an indexed instruction on the basis of the identification of the display flag 61 using hardware while the contents of the general-purpose register 21*a* are used as the address of the object to be operated. In contrast to the conventional programmable controller which performs operations on an address included in the instruction code 6, the programmable controller of the present embodiment does not require various pre-processing instructions, which in turn results in a smaller program memory size. Therefore, it is possible to speed up processing time required to execute operations of the indexed instruction.

The instruction code 6 is the sequence instruction addressed by the object to be operated, which in turn obviates the necessity of various pre-processing instructions of the bit processing instruction. A sequence instruction having descriptions of logical conditions, which logical conditions include such as indexed contact points or coils, can be executed by speeding up the processing time.

The selector 7 is provided in the address calculation section 3. Therefore, if it turns out as a result of the identification of the display flag 61 that the instruction code 6 includes the indexed instruction, the contents of the general-purpose register 21*a* are output as addresses. If this is not the case, the immediate value of the instruction code 6 is output as an address. It is possible to execute an indexed sequence instruction with a simple construction.

The structure of the processor A comprising the general-purpose register 21*a*, the address (calculation section 3, and the memory access section 4, the structure of the instruction code 6 having the display flag 61, which display flag is made up of one bit, and the contents of the bit instructions are not limited to those disclosed in the eighth embodiment.

Ninth Embodiment

Figure 66:
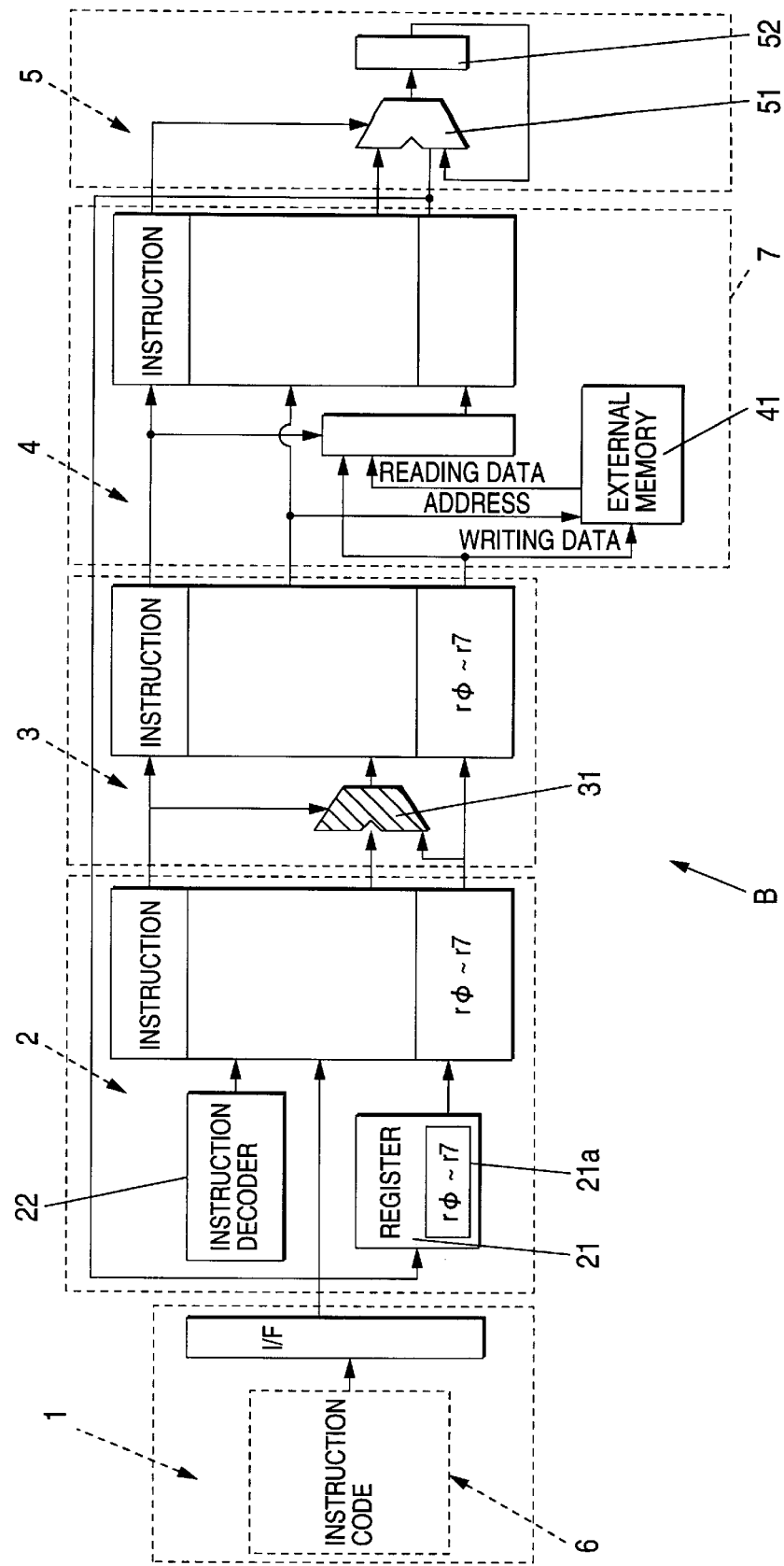
FIG. 66 is a circuit diagram of a programmable controller according to a ninth embodiment of the present invention.

A programmable controller according to a ninth embodiment of the present invention will now be described with reference to FIGS. 66 through 68. The features of the programmable controller which are different from those of the programmable controller of the eighth embodiment will be described in the ninth embodiment. The elements having substantially the same features as the elements of the first element are assigned the same reference numerals.

Reference symbol B designates a processor comprising five sections. The instruction code 6 performs operations of the timer or counter instruction while an object to be operated is used as preset data. The selector 7 is provided in the memory access section and is connected to a read data path of the external memory 41, whereby data are read from the external memory.

The operation of the processor B will now be described. Upon receipt of an input of the instruction code 6, a preset address uniquely determined by the timer or counter number included in the instruction code 6 is output to the external memory 41 via the address calculation section 3 if the instruction is not indexed. The data output from the external memory 41 are input to the ALU 51 of the processing section via the selector 7. The ALU 51 processes that data as a preset value.

Figure 67:
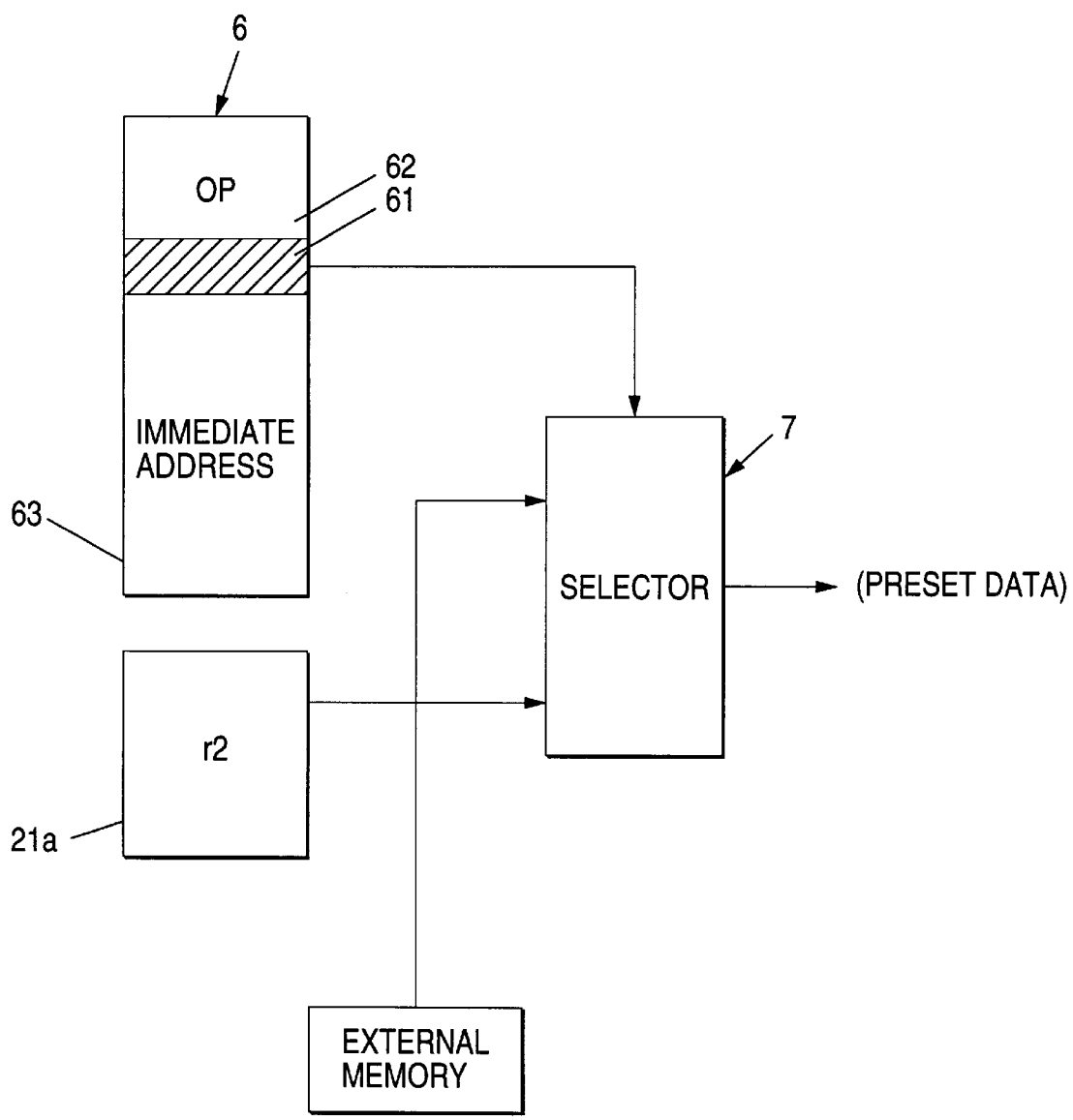
FIG. 67 is a block diagram showing the connection of the selector of the programmable controller shown in FIG. 66.
Figure 68:
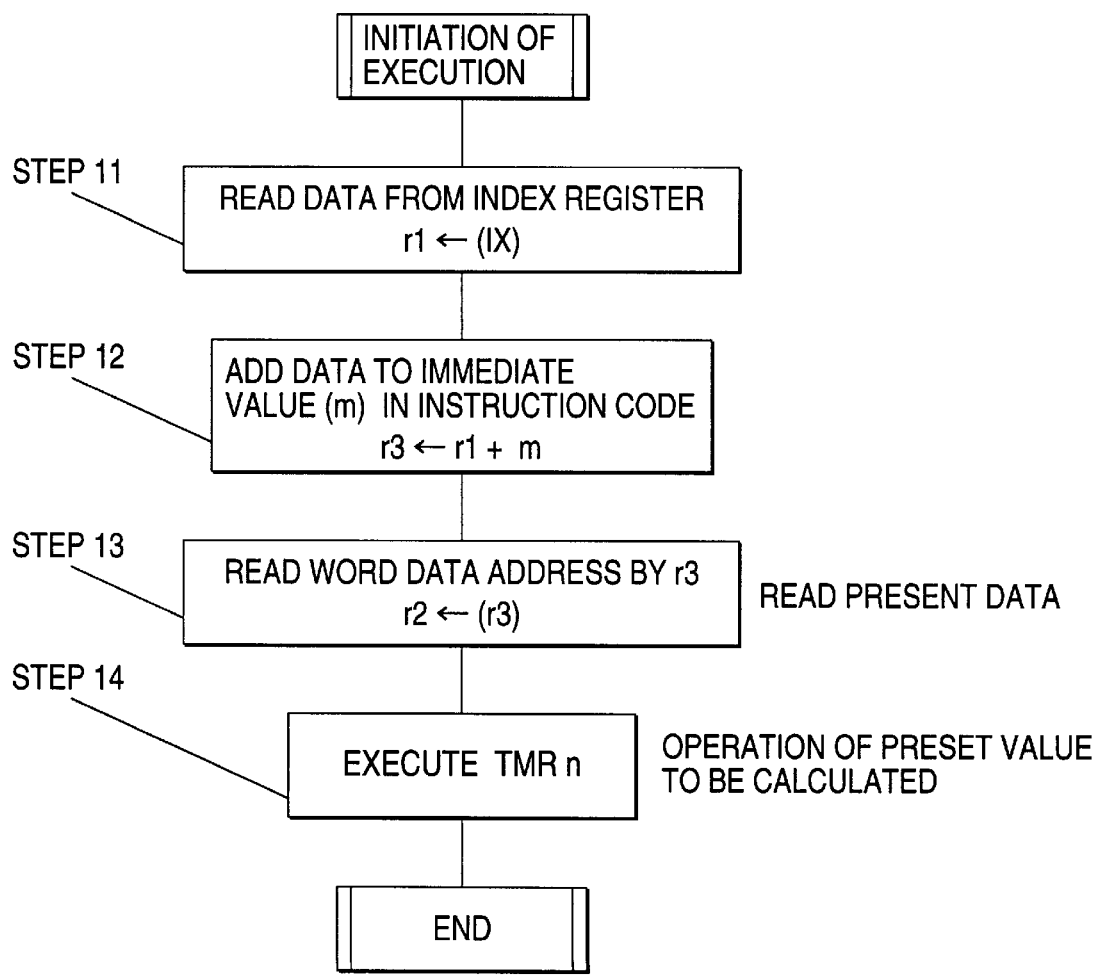
FIG. 68 is a flowchart showing the operation of the programmable controller shown in FIG. 66.

In the case where the instruction is indexed, the instruction code 6 is provided with the display flag 61 for displaying whether or not the instruction is the indexed instruction, as shown in a block diagram in FIG. 67. A flag bit of the display flag 61 is input to the selector 7.

The selector 7 is connected to the general-purpose register 21*a* provided in the processor B. Which of the registers in the general-purpose register 21*a* is connected to the selector 7 is previously determined by the hardware. In this example, an r2 register is connected to the selector 7. Data read from the external memory 41 using an address uniquely determined from the timer or counter number included in the instruction code 6, and the data of the r2 register are input to the selector 7.

If the display flag 61 displays the indexed instruction being included in the instruction code 6, the selector 7 outputs data read from the register r2 or the external memory 41. The subsequent operations of the programmable controller of the ninth embodiment are the same as operations of the conventional timer or counter instruction.

The sequence of execution of an instruction for indexing a preset value of the timer or counter instruction using hardware will be described on the basis of a flowchart shown in FIG. 68. To begin with, the data (IX) of the index register are read in step 11, and the thus read data are input to the r1 register of the general-purpose register 21*a* disposed in the register group 21. The data of the r1 register and the immediate value included in the instruction code 6 are added together in step 12, and a result of the addition is input to an register r3 of the general-purpose register 21*a*. The word data addressed by the register r3, that is, preset data, are read in step 13, and the thus read data are input to the register r2.

Subsequently, a TMRn instruction which is an operation with respect to the preset data to be operated is executed in step 14.

In this way, the timer or counter instruction modified by the indexed instruction is executed by only reading data from the index register and by setting the preset value data in the register r2.

In such a programmable controller according to the ninth embodiment, the display flag 61 which shows the presence or absence of the indexed instruction for indirectly specifying an object to be calculated is provided in the instruction code 6. The selector 7 connected to the general-purpose register 21a executes an indexed instruction on the basis of the identification of the display flag 61 using hardware while the contents of the general-purpose register 21a are used as the preset value data to be operated. In contrast to the conventional programmable controller which calculates preset data uniquely determined by the timer or counter number included in the instruction code 6, the programmable controller of the present embodiment does not require various preprocessing instructions, which in turn results in a smaller program memory size. Therefore, it is possible to speed up processing time required to execute operations of the indexed instruction.

The instruction code 6 is the timer or counter instruction which uses the object to be operated as preset data, which in turn obviates the necessity of various preprocessing instructions of the bit processing instruction. As a result, the timer or counter instruction having descriptions of control conditions, which control conditions include such an indexed timer or counter, can be executed by speeding up the processing time.

The selector 7 is provided in the data path for reading data from the external memory. Therefore, if it turns out as a result of the identification of the display flag 61 that the instruction code 6 includes the indexed instruction, the contents of the general-purpose register 21a are output as addresses. If this is not the case, the data read from the external memory 41 are output. It is possible to execute an indexed timer or counter instruction with a simple construction.

The structure of the processor A comprising the general-purpose register 21a, the address calculation section 3, and the memory access section 4, the structure of the instruction code 6 having the display flag 61, which display flag is made up of one bit, and the contents of the instructions are not limited to those disclosed in the ninth embodiment.

The structure of the specifically designed hardware, the instruction set, the instruction structure, and the configuration of the operation code section are not limited to those disclosed in the embodiment.

The programmable controller of the present invention is provided with a unified instruction structure and specifically designed hardware so as to correspond to that unified instruction structure. The specifically designed hardware and its control are simplified. As a result, the complication of the specifically designed hardware (a processor) and its control due to formation of the instruction execution stage of the specifically designed hardware (a processor) into multiple stages is mitigated. Since it becomes easy to form the instruction execution stage into multiple stages, the speed of processing of the overall programmable controller can be improved.

The programmable controller of the present invention is designed so as to be able to modify the execution specification information of each instruction execution stage to a predetermined value on the basis of a result of the bit operation instruction which is one of the basic processing operations of the programmable controller. As a result, a control operation for invalidating (i.e., preventing execution of) a following application instruction can be executed by means of bit operation processing particular to the programmable controller without interrupting the pipeline processing.

In the programmable controller of the present invention, the execution specification information of the instruction is transferred by shifting EX, M, and W13 stages of the pipeline register ID/EX to a subsequent stage for each clock. Simple but efficient execution control. can be implemented.

The programmable controller of the present invention is arranged so as to carry out unified processing, that is, the retaining of the data processed in each stage into a pipeline register in the subsequent stage after the completion of the processing in that stage. The data bus of the specifically designed hardware can be made simple and efficient.

The programmable controllers of the present invention do not require insertion of NOP instructions for solving a pipeline hazard occurring as a result of a general-purpose register being read. As a result, it is possible to reduce a program size and an execution rate compared with a programmable control which requires the insertion of the NOP instructions.

The programmable controller of the present invention does not require the insertion of the NOP instructions for solving the pipeline hazard occurring when a general-purpose register that will have been updated by a LOAD instruction is read according to the instruction following that LOAD instruction. As a result, it is possible to reduce the program size.

The programmable controller of the present invention does not require suspension of a STORE instruction if the instruction following the LOAD instruction is the STORE instruction for reading the general-purpose register that will have been updated by the LOAD instruction. Therefore, it is possible to speed up the processing of the programmable controller.

The programmable controller of the present invention does not require suspension of a STORE instruction if the instruction following next but one after the LOAD instruction is the STORE instruction for reading the general-purpose register that will have been updated by the LOAD instruction. Therefore, it is possible to speed up the processing of the programmable controller.

The programmable controllers of the present invention do not require the insertion of the NOP instructions for solving the pipeline hazard in which invalid instructions will be executed if a branch condition is satisfied. Therefore, it is possible to reduce the program size.

According to the programmable controller having the five-stage pipeline structure, an interval between the timing at which the clock signal for actuating the program counter changes and the timing at which the clock signal for actuating the instruction register changes is small. Even if memory which is faster than required when compared with the instruction memory must be used for the instruction memory, it becomes possible to extend the time between the determination of the address of the instruction memory and the reading of a value from the instruction memory. Therefore, slower memory can be used, which in turn contributes to cost reductions.

According to the programmable controller of the present invention, it becomes possible for the programmable controller to correctly execute a branch instruction for updating the program counter.

According to the programmable controller of the present invention, it becomes possible for the programmable controller to correctly execute a differential instruction for updating the program counter.

According to the programmable controller of the present invention, it becomes possible for the programmable controller to correctly fetch an instruction immediately after having started up.

According to the programmable controller having the five-stage pipeline structure of the present invention, in the case where the instruction whose operations are difficult to be completed within the time period of one pipeline stage, it becomes possible to easily execute the instruction by suspending the operation of the pipeline for as long a period of time as required.

According to the programmable controller having the five-stage pipeline structure of the present invention, even when the execution conditions of the instruction whose operations are difficult to be completed within the time period of one pipeline stage are not satisfied, it is possible to prevent the wasteful suspension of the pipeline.

According to the programmable controller having the five-stage pipeline structure of the present invention, it becomes unnecessary to redesign the operation block according to the pipeline structure, and the past design resources can be effectively utilized.

According to the programmable controller having the five-stage pipeline structure of the present invention, it becomes possible to execute an instruction that requires a plurality of rewriting operations which do not result from ordinary pipeline operations.

According to the programmable controller having the five-stage pipeline structure of the present invention, it becomes possible to retain the argument of an operation in the pipeline register, which in turn makes it possible to reduce the size of an operation block.

According to the present invention, in the case where one bit of an instruction is updated, or an instruction called a bit processing instruction which requires the reading and writing of a plurality of words from and to memory at the time of execution of the instruction is executed, by means of a programmable controller having a five-stage pipeline structure, it becomes possible to efficiently execute the instruction without wasting a pipeline cycle by adoption of the address calculation method and the memory access methods of the present invention. Further, as a result of the adoption of the control methods of the present invention, it becomes possible to consistently execute an instruction following the bit processing instruction without insertion of an NOP instruction into instruction memory. In the programmable controller having a five-stage pipeline structure capable of processing operations at a higher speed than a conventional programmable controller having a three stage pipeline structure does, a differential instruction which is the same as a conventional differential instruction can be executed as a result of adoption of the memory. As a result, it is possible to reduce the number of signal lines for address bus purposes. If a memory rewrite address for use with a differential instruction is handled in the manner, it becomes very easy to carry out a control operation at the time of execution of the differential instruction. It is possible to prevent the faulty operation of the programmable controller while the differential instruction is written back into the memory without insertion of the NOP instruction into the instruction memory as a result of the adoption of the control methods. Further, as a result of the execution of the control, it is possible to consistently execute an instruction even if the processing and the processing is carried out.

According to the present invention, a programmable controller having a five-stage pipeline structure determines instruction execution conditions comprising a plurality of flags, and executes a specific instruction only when the instruction execution conditions are satisfied in an instruction execution stage. As a result, it becomes possible to control a determination as to whether the instruction is executed or invalidated.

After the instruction execution conditions have been updated by means of a flag set instruction for updating flags which constitute the instruction execution conditions or instructions such as an arithmetic operation instruction, an immediately following instruction is executed. As a result, it becomes possible to consistently control a determination as to whether the instruction is executed or invalidated.

If a bit accumulator which is updated by the last portion of the pipeline stage of the bit processing instruction is included in the flags constituting the instruction execution conditions, it becomes possible to consistently control a determination as to whether or not an instruction is executed or invalidated by suspending the execution of the instruction which is executed or invalidated depending on the instruction execution conditions until the instruction execution conditions are determined without inserting an NOP instruction into the instruction memory.

According to a programmable controller having a five-state pipeline structure, it becomes possible to cope with complicated requirements by controlling the start/stop operations of the programmable controller using the state machine for start/stop control purposes, if various stop conditions and specifications about the state of programmable controller after it has been suspended must be satisfied. As previously described, the value of the program counter obtained when an instruction is fetched is transferred through the pipeline register, and the value of the program counter when the programmable controller is in suspend mode is set on the basis of the transferred value. As a result, it is possible to easily effect suspending operations according to specifications. As a result of the adoption of the structure which makes it possible to invalidate the instruction, it becomes possible to prevent an invalid instruction from being executed after the initiation of the suspending operations.

In the programmable controller of the present invention, the display flag which displays the presence or absence of an indexed instruction for indirectly specifying an object to be operated is provided in an instruction code. A selector connected to a general-purpose register executes the indexed instruction with hardware on the basis of the result of identification of the display flag while the contents of the general-purpose register are used as the object to be calculated. As a result, various pre-processing instructions become unnecessary, and a program size is reduced, which in turn makes it possible to speed up the time required to perform operations on the indexing instruction.

In addition to the effects obtained by the programmable controller, the programmable controller comprises an instruction code which is a sequence instruction addressed by the object to be operated. In contrast to the conventional programmable controller which performs operations on an address included in the instruction code, the programmable controller of the present invention enables execution of a sequence instruction having descriptions, which include logical conditions include such as indexed contact points or coils, by speeding up processing time.

In addition to the effects obtained by the programmable controller comprises a selector provided in the address calculation section. If it turns out from identification of the display flag that the instruction code includes an indexed instruction, the contents of the general-purpose register are output as an address. If this is not true, an immediate value included in the instruction code is output as an address, and it becomes possible to execute an indexed sequence instruction with a simple configuration.

In addition to the effects obtained by the programmable controller comprises an instruction code which is a timer or counter instruction. That timer or counter instruction uses preset data as an object to be operated. In contrast to the conventional programmable controller which calculates preset data uniquely determined by the timer or counter number included in the instruction code, the programmable controller of the present invention obviates various pre-processing instructions. It is possible to execute the timer or counter instruction having descriptions which include control conditions such as an indexed timer or counter, by speeding up processing time.

In addition to the effects obtained by the programmable controller comprises a selector which is disposed in a data path for reading data from external memory. The selector outputs the contents of the general-purpose register if it turns out as a result of identification of a display flag that an instruction code includes an indexed instruction. If this is not the case, the selector outputs the data read from the external memory. It is possible to execute an indexed timer or counter instruction with a simple configuration.

What is claimed is:

1. A programmable controller comprising:
    an instruction execution stage including:
        a first stage for executing instruction fetching operation in order to fetch an instruction from instruction memory;
        a second stage for decoding the instruction and for fetching a value from a general-purpose register;
        a third stage for executing arithmetic or logical instructions, data address calculations, or calculation of the effective address of a target branch;
        a fourth stage for accessing to data memory; and
        a fifth stage for executing one of bit operations, writing operation with respect to the general-purpose register, and branching operation;
        wherein the programmable controller executes basic bit processing operations and application processing including a plurality of bits, the first stage to fifth stage are executed in a pipelined manner, and an execution specification information of each instruction execution stage is changed to a predetermined value on the basis the result of a bit processing instruction, and a subsequent instruction following the bit processing instruction is determined to be made one of invalid and valid on the basis the result of the bit processing instruction.

2. A programmable controller as claimed in claim 1, wherein the execution of an instruction following a LOAD instruction is suspended until data acquired according to the LOAD instruction are written into the general-purpose register if that data are necessary for the instruction following the LOAD instruction.

3. A programmable controller as claimed in claim 2, wherein if an instruction following afterward the LOAD instruction is a STORE instruction, and if the general purpose resister which holds a value required by the STORE instruction is updated by the LOAD instruction, the data which are stored in the general purpose resister in the fifth stage according to the LOAD instruction are taken in one of the third stage and forth stage of the STORE instruction and are written into the data memory.

4. A programmable controller as claimed in claim 1, further comprising:
    selecting means, provided in the second stage, for selecting one of the inputs of an ALU of the third stage from among an output of the general purpose resister, an output of the ALU of the third stage, and the output of the ALU supplied to the forth stage.

5. A programmable controller as claimed in claim 1, further comprising:
    selecting means, provided in the third stage, for selecting one of the inputs of an ALU of the third stage from among a value output from the second stage to one of the inputs of a ALU, an output of the ALU supplied to the fourth stage, and an output of the ALU supplied to the fifth stage.

6. A programmable controller as claimed in claim 1, wherein the third stage executes a determination of a branch conditions, the fifth stage executes a branching operation, and the execution of an invalid instruction already included in the pipeline is inhibited when the branch conditions are satisfied.

7. A programmable controller as claimed in claim 1, further comprising:
    an operation block for executing the instruction when the instruction's operations cannot be completed within the time period of one pipeline stage,
    wherein when the instruction whose operations cannot be completed within the time period of one pipeline stage is executed, the pipeline is suspended by interrupting the increment of a program counter during only the period of time required to complete the operations of the instruction, and invalidating control signals including a signal for writing a value back into a register and a signal for writing date into data memory, whereby the instruction is executed.

8. A programmable controller as claimed in claim 7, when the instruction whose operations cannot be completed within the time period of one pipeline stage is executed, the pipeline is suspended until an operation complete signal is received from the operation block which executes the instruction by interrupting the increment of a program counter, and invalidating control signals including a signal for writing a value back into a register or a signal for writing data into data memory, whereby the instruction is executed.

9. A programmable controller as claimed in claim 8, wherein when a plurality of the instructions are executed, the pipeline is suspended until an operation complete signal is received from an operation block which executes the instruction whose operations cannot be completed within the time period of one pipeline stage by interrupting the increment of a program counter, and invalidating control signals including a signal for writing a value back into a register or a signal for writing data into data memory, whereby the instruction is executed.

10. A programmable controller as claimed in claim 9, wherein the operation block is arranged so as to be able to cope with operations of the width of a plurality types of data, as well as being arranged so as to receive an input having a value set in a predetermined bit position and to clear the value at an unused bit position as required.

11. A programmable controller as claimed in claim 8, wherein the operation block is arranged so as to be able to cope with operations of the width of a plurality types of data, as well as being arranged so as to receive an input having a value set in a predetermined bit position and to clear the value at an unused bit position as required.

12. A programmable controller as claimed in claim 7, wherein when a plurality of the instructions are executed, the pipeline is suspended until an operation complete signal is received from an operation block which executes the instruction whose operations cannot be completed within the time period of one pipeline stage by interrupting the increment of a program counter, and invalidating control signals including a signal for writing a value back into a register or a signal for writing data into data memory, whereby the instruction is executed.

13. A programmable controller as claimed in claim 12, wherein the operation block is arranged so as to be able to cope with operations of the width of a plurality types of data, as well as being arranged so as to receive an input having a value set in a predetermined bit position and to clear the value at an unused bit position as required.

14. A programmable controller as claimed in claim 7, wherein the operation block is arranged so as to be able to cope with operations of the width of a plurality types of data, as well as being arranged so as to receive an input having a value set in a predetermined bit position and to clear the value at an unused bit position as required.

15. A programmable controller as claimed in claim 7, wherein when the instruction whose operations cannot be executed within the time period of one pipeline stage is executed, predetermined information is retained until operations for writing an operation result back into a plurality of general-purpose registers are all completed if the instruction stores the operation result to the registers.

16. A programmable controller as claimed in claim 7, wherein when the instruction whose operations cannot be executed within the time period of one pipeline stage is executed, one of an argument and a control signal of the instruction in a pipeline register provided between a stage of decoding the instruction and a stage for executing that instruction is retained for as long a period of time as required.

17. A programmable controller as claimed in claim 1, further comprising:
a memory address calculation block for specifically using the bit processing instruction aside from a memory access instruction including a load instruction and a store instruction.

18. A programmable controller as claimed in claim 17, wherein the memory address calculation block specifically designed for use with the bit processing instruction carry out accesses to the data memory in a plurality of contiguous pipeline stages by calculating the address of the data memory over a plurality of pipeline cycles, and issuing a memory access request signal.

19. A programmable controller as claimed in claim 18, wherein a control signal showing that the previous instruction is a bit processing instruction is provided in the pipeline register, and the programmable controller suspends the increment of the program counter if it is necessary to suspend the execution of an instruction following the bit processing instruction, and the instruction following the bit processing instruction is suspended by further rewriting the result of decoding of the instruction even if it is impossible to suspend the execution of the instruction by only suspending the increment of the program counter.

20. A programmable controller as claimed in claim 17, wherein a control signal showing that the previous instruction is a bit processing instruction is provided in the pipeline register, and the programmable controller suspends the increment of the program counter if it is necessary to suspend the execution of an instruction following the bit processing instruction, and the instruction following the bit processing instruction is suspended by further rewriting the result of decoding of the instruction even if it is impossible to suspend the execution of the instruction by only suspending the increment of the program counter.

21. A programmable controller as claimed in claim 20, wherein the circuit block outputs the control signal.

22. A programmable controller as claimed in claim 1, further comprising:
a circuit block for specifically executing the bit processing instruction,
wherein the circuit block outputs a memory address and at least one of memory write data and a memory write request signal to write data into the data memory or to read data from the data memory.

23. A programmable controller as claimed in claim 22, wherein a control signal showing that the previous instruction is a bit processing instruction is provided in the pipeline register, and the programmable controller suspends the increment of the program counter if it is necessary to suspend the execution of an instruction following the bit processing instruction, and the instruction following the bit processing instruction is suspended by further rewriting the result of decoding of the instruction even if it is impossible to suspend the execution of the instruction by only suspending the increment of the program counter.

24. A programmable controller as claimed in claim 1, further comprising:
a data memory for specifically using a differential instruction to be executed only when an input changes,
wherein an address bus is shared between the data memory and the instruction memory of the programmable controller.

25. A programmable controller as claimed in claim 1, further comprising:
a memory address calculation block for specifically using the bit processing instruction,
a circuit block for specifically executing the bit processing instruction,
a data memory for specifically using a differential instruction to be executed only when an input changes,
wherein the fetching of an instruction is ensured by suspending an instruction as required when the bit processing instruction and the differential instruction.

26. A programmable controller as claimed in claim 1, wherein a flag for indicating the presence or absence of an indexed instruction is provided in an instruction code of the bit processing instruction, when the indexed instruction exists, a predetermined value is read from a general purpose register and the predetermined data is used, instead of an address provided by an immediate value in the instruction code of the bit processing instruction, for an address to read data from a data memory so as to execute a bit processing.

27. A programmable controller as claimed in claim 1, wherein when an instruction is fetched, a value of a program counter is transferred to a pipeline register, and the value of the program counter transferred through the pipeline register is used for calculating a value of the program counter when the programmable controller is suspended.

28. A programmable controller as claimed in claim 1, wherein instruction execution conditions including a plurality of flag values are determined, and a specific instruction is executed only when the instruction execution conditions of the third stage are satisfied.

29. A programmable controller as claimed in claim 28, wherein a flag set instruction for updating flags including the instruction execution condition is finished to update flags when an instruction execution stage for a subsequent instruction immediately after the flag set instruction is initiated, and the instruction is executed while consistently controlling a determination as to whether the instruction is executed or invalidated.

30. A programmable controller as claimed in claim 28, wherein various types of arithmetic operation instructions for updating flags including the instruction execution condition is finished to update flags when an instruction execution stage for a subsequent instruction immediately after the arithmetic operation instruction is initiated, and the instruction is executed while consistently controlling a determination as to whether the instruction is executed or invalidated.

31. A programmable controller comprising:
   an instruction execution stage including:
      a first stage for executing instruction fetching operation in order to fetch an instruction from instruction memory,
      a second stage for decoding the instruction and for fetching a value from a general-purpose register,
      a third stage for executing arithmetic or logical instructions, data address calculations, or calculation of the effective address of a target branch,
      a fourth stage for accessing to data memory, and
      a fifth stage for executing one of bit operations, writing operation with respect to the general-purpose register, and branching operation,
      wherein the programmable controller executes basic bit processing operations and application processing including a plurality of bits, the first stage to fifth stare are executed in a pipelined manner, and an execution specification information of each instruction execution stage is changed to a predetermined value on the basis the result of a bit processing instruction, and a subsequent instruction following the bit processing instruction is determined to be made one of invalid and valid on the basis the result of the bit processing instruction,
   a data memory for specifically using a differential instruction to be executed only when an input changes,
   wherein an address bus is shared between the data memory and the instruction memory of the programmable controller,
   a circuit block for specifically executing the bit processing instruction,
   wherein the address of the instruction memory when the instruction is fetched is taken into a pipeline register, and the fetched address is sequentially transferred to the circuit block specifically designed for use with the bit processing instruction through the pipeline register, and
   wherein when the result of the differential instruction is written back into the data memory, the transferred address of the instruction memory is used as an address for use in writing data into the data memory.

32. A programmable controller comprising:
   an instruction execution stage including:
      a first stage for executing instruction fetching operation in order to fetch an instruction from instruction memory,
      a second stage for decoding the instruction and for fetching a value from a general-purpose register,
      a third stare for executing arithmetic or logical instructions, data address calculations, or calculation of the effective address of a target branch,
      a fourth stage for accessing to data memory, and
      a fifth stare for executing one of bit operations, writing operation with respect to the general-purpose register, and branching operation,
      wherein the programmable controller executes basic bit processing operations and application processing including a plurality of bits, the first stage to fifth stage are executed in a pipelined manner, and an execution specification information of each instruction execution stage is changed to a predetermined value on the basis the result of a bit processing instruction, and a subsequent instruction following the bit processing instruction is determined to be made one of invalid and valid on the basis the result of the bit processing instructions,
   a data memory for specifically using a differential instruction to be executed only when an input changes,
   wherein an address bus is shared between the data memory and the instruction memory of the programmable controller, and
   wherein when the result of the differential instruction is written back into the data memory, one of the increment of the program counter is suspended to ensure the fetching of the instruction and the instruction acquired from the instruction memory is rewritten with an instruction which does not have any influence on the following operations.

33. A programmable controller comprising:
   an instruction execution stage including:
      a first stage for executing instruction fetching operation in order to fetch an instruction from instruction memory;
      a second stage for decoding the instruction and for fetching a value from a general-purpose register;
      a third stage for executing arithmetic or logical instructions, data address calculations, or calculation of the effective address of a target branch;
      a fourth stage for accessing to data memory; and
      a fifth stage for executing one of bit operations; writing operation with respect to the general-purpose register, and branching operation;
      wherein the programmable controller executes basic bit processing operations and application processing including a plurality of bits, the first stage to fifth stage are executed in a pipelined manner, and an execution specification information of each instruction execution stage is changed to a predetermined value on the basis the result of a bit processing instruction, and a subsequent instruction following the bit processing instruction is determined to be made one of invalid and valid on the basis the result of the bit processing instruction;
   wherein a flag for indicating the presence or absence of a preset value modified by an indexed instruction is provided in an instruction code of a timer or counter instruction corresponding to a part of the bit processing instruction, when the preset value is modified by the indexed instruction, a predetermined value is read from a general purpose register and the predetermined data is used, instead of a preset data being read from the data memory of an address provided in the instruction code of the bit processing instruction, for a preset value to execute a timer or counter instruction.

34. A programmable controller comprising:
   an instruction execution stage including:
      a first stage for executing instruction fetching operation in order to fetch an instruction from instruction memory;

a second stage for decoding the instruction and for fetching a value from a general-purpose register;

a third stage for executing arithmetic or logical instructions, data address calculations, or calculation of the effective address of a target branch;

a fourth stage for accessing to data memory; and a fifth stage for executing one of bit operations, writing operation with respect to the general-purpose register, and branching operation;

wherein the programmable controller executes basic bit processing operations and application processing including a plurality of bits, the first stage to fifth stage are executed in a pipelined manner, and an execution specification information of each instruction execution stare is changed to a predetermined value on the basis the result of a bit processing instruction, and a subsequent instruction following the bit processing instruction is determined to be made one of invalid and valid on the basis the result of the bit processing instruction;

a register actuated by a clock signal which changes at faster timing than a clock signal for actuating a program counter;

wherein a value obtained by adding one to a value of the program counter is latched into the register irrespective of a value of a control signal for suspending the increment of the program counter, and the value of the register is used as an address of the instruction memory in lieu of the value of the program counter to fetch an instruction, and if the control signal for suspending the increment of the program counter corresponds to a signal for suspending an increment operation, the value read from the instruction memory is not loaded into the instruction register which fetches an instruction, but a value of that instruction register is retained in itself.

35. A programmable controller as claimed in claim 34, wherein when the programmable controller starts up, an instruction can be fetched from a correct address of the instruction memory on the basis of an initial value of the program counter set from outside before the programmable controller starts up.

36. A programmable controller comprising:

an instruction execution stage including:

a first stage for executing instruction fetching operation in order to fetch an instruction from instruction memory, a second stage for decoding the instruction and for fetching a value from a general-purpose register, a third stage for executing arithmetic or logical instructions, data address calculations, or calculation of the effective address of a target branch, a fourth stare for accessing to data memory, and a fifth stage for executing one of bit operations, writing operation with respect to the general-purpose register, and branching operation, wherein the programmable controller executes basic bit processing operations and application processing including a plurality of bits, the first stage to fifth stage are executed in a pipelined manner, and an execution specification information of each instruction execution stage is changed to a predetermined value on the basis the result of a bit processing instruction, and a subsequent instruction following the bit processing instruction operation is determined to be made one of invalid and valid on the basis the result of the bit processing instruction, a register actuated by a clock signal which changes at faster timing than a clock signal for actuating a program counter, wherein a value obtained by adding one to a value of the program counter is latched into the register irrespective of a value of a control signal for suspending the increment of the program counter, and the value of the register is used as an address of the instruction memory in lieu of the value of the program counter to fetch an instruction, and if the control signal for suspending the increment of the program counter corresponds to a signal for suspending an increment operation, the value read from the instruction memory is not loaded into the instruction register which fetches an instruction, but a value of that instruction register is retained in itself, wherein, if the branching conditions are satisfied when the branch instruction is executed, the address of a target branch calculated during the course of the execution of the branch instruction is used as the address of the instruction memory, which makes it possible to fetch an instruction.

37. A programmable controller comprising:

an instruction execution stage including:

a first stage for executing instruction fetching operation in order to fetch an instruction from instruction memory, a second stage for decoding the instruction and for fetching a value from a general-purpose register, a third stage for executing arithmetic or logical instructions, data address calculations, or calculation of the effective address of a target branch, a fourth stage for accessing to data memory, and a fifth stage for executing one of bit operations, writing operation with respect to the general-purpose register, and branching operation, wherein the programmable controller executes basic bit processing operations and application processing including a plurality of bits, the first stage to fifth stage are executed in a pipelined manner, and an execution specification information of each instruction execution stage is changed to a predetermined value on the basis the result of a bit processing instruction, and a subsequent instruction following the bit processing instruction is determined to be made one of invalid and valid on the basis the result of the bit processing instruction, a register actuated by a clock signal which changes at faster timing than a clock signal for actuating a program counter, wherein a value obtained by adding one to a value of the program counter is latched into the register irrespective of a value of a control signal for suspending the increment of the program counter, and the value of the register is used as an address of the instruction memory in lieu of the value of the program counter to fetch an instruction, and if the control signal for suspending the increment of the program counter corresponds to a signal for suspending an increment operation, the value read from the instruction memory is not loaded into the instruction register which fetches an instruction, but a value of that instruction register is retained in itself, wherein a bit memory can be rewritten by use of the address of the bit memory calculated when a differential instruction is executed.

38. A programmable controller comprising:

an instruction execution stage including:

a first stage for executing instruction fetching operation in order to fetch an instruction from instruction memory;

a second stare for decoding the instruction and for fetching a value from a general-purpose register;

a third stage for executing arithmetic or logical instructions, data address calculations, or calculation of the effective address of a target branch;

a fourth stage for accessing to data memory; and a fifth stage for executing one of bit operations, writing operation with respect to the general-purpose register, and branching operation;

wherein the programmable controller executes basic bit processing operations and application processing including a plurality of bits, the first stage to fifth stage are executed in a pipelined manner, and an execution specification information of each instruction execution stage is changed to a predetermined value on the basis the result of a bit processing instruction, and a subsequent instruction following the bit processing instruction is determined to be made one of invalid and valid on the basis the result of the bit processing instruction;

wherein when an instruction is fetched, a value of a program counter is transferred to a pipeline register, and the value of the program counter transferred through the pipeline register is used for calculating a value of the program counter when the programmable controller is suspended;

a state machine for carrying out start/stop control operations, the state machine reads the value of the program counter provided in the pipeline register, calculates the value of the program counter when the programmable controller is suspended on the basis of the previously obtained value in accordance with the specifications of the suspending operation, and writes the thus calculated value into the program counter before the programmable controller is suspended.

39. A programmable controller as claimed in claim 38, wherein when the stop conditions are satisfied and the suspending operation is star ed, the execution of the instruction which has already been introduced into the pipeline is invalidated to prevent an invalid instruction from being executed.

40. A programmable controller comprising:

an instruction execution stage including:
  a first stage for executing instruction fetching operation in order to fetch an instruction from instruction memory;
  a second stage for decoding the instruction and for fetching a value from a general-purpose register;
  a third stage for executing arithmetic or logical instructions, data address calculations, or calculation of the effective address of a target branch;
  a fourth stage for accessing to data memory; and
  a fifth stage for executing one of bit operations, writing operation with respect to the general-purpose register, and branching operation;
  wherein the programmable controller executes basic bit processing operations and application processing including a plurality of bits, the first stage to fifth stage are executed in a pipelined manner, and an execution specification information of each instruction execution stage is changed to a predetermined value on the basis the result of a bit processing instruction, and a subsequent instruction following the bit processing instruction operation is determined to be made one of invalid and valid on the basis the result of the bit processing instruction;

wherein instruction execution conditions including a plurality of flag values are determined, and a specific fetched instruction is executed only when the instruction execution conditions of the third stare are satisfied;

wherein the instruction execution condition is formed by flags updated by the bit processing instruction for carrying out bit operation processing in the fifth stage, a control signal in the pipeline register is provided, the control signal shows that the current instruction is the bit processing instruction for updating the flags relevant to the instruction execution conditions, the execution of the instruction is suspended on the basis of the control signal while the instruction execution conditions are not determined, and the instruction is executed while consistently controlling a determination as to whether or not the instruction is executed or invalidated.

41. A programmable controller comprising:

an instruction execution stage including:
  a first stage for executing instruction fetching operation in order to fetch an instruction from instruction memory,
  a second stage for decoding the instruction and for fetching a value from a general-purpose register,
  a third stage for executing arithmetic or logical instructions, data address calculations, or calculation of the effective address of a target branch,
  a fourth stage for accessing to data memory, and
  a fifth stage for executing one of bit operations, writing operation with respect to the general-purpose register, and branching operation,
  wherein the programmable controller executes basic bit processing operations and application processing including a plurality of bits, the first stage to fifth stage are executed in a pipelined manner, and an execution specification information of each instruction execution stage is changed to a predetermined value on the basis the result of a bit processing instruction, and a subsequent instruction following the bit processing instruction operation is determined to be made one of invalid and valid on the basis the result of the bit processing instruction, a data memory for specifically using a differential instruction to be executed only when an input changes, wherein an address bus is shared between the data memory and the instruction memory of the programmable controller, a circuit block for specifically executing the bit processing instruction, wherein the address of the instruction memory when the instruction is fetched is taken into a pipeline register, and the fetched address is sequentially transferred to the circuit block specifically designed for use with the bit processing instruction through the pipeline register, wherein when the result of the differential instruction is written back into the data memory, the transferred address of the instruction memory is used as an address for use in writing data into the data memory, and wherein when the result of the differential instruction is written back into the data memory, one of the increment of the program counter is suspended to ensure the fetching of the instruction and the instruction acquired from the instruction memory is rewritten with an instruction which does not have any influence on the following operations.

* * * * *